(12) United States Patent
Brown et al.

(10) Patent No.: US 8,154,554 B1
(45) Date of Patent: *Apr. 10, 2012

(54) UNIFIED ASSEMBLY INSTRUCTION SET FOR GRAPHICS PROCESSING

(75) Inventors: Patrick R. Brown, Raleigh, NC (US); Eric S. Werness, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 11/548,247

(22) Filed: Oct. 10, 2006

Related U.S. Application Data

(60) Provisional application No. 60/833,978, filed on Jul. 28, 2006.

(51) Int. Cl.
G06T 1/00 (2006.01)

(52) U.S. Cl. .................................. 345/522; 345/501

(58) Field of Classification Search .......... 345/501–506, 345/519–522
See application file for complete search history.

(56) References Cited

U.S. PATENT DOCUMENTS

| | | | |
|---|---|---|---|
| 5,005,137 A | 4/1991 | Ernst | |
| 5,812,854 A | 9/1998 | Steinmetz et al. | |
| 5,870,097 A | 2/1999 | Snyder et al. | |
| 5,977,977 A | 11/1999 | Kajiya et al. | |
| 6,044,225 A | 3/2000 | Spencer et al. | |
| 6,839,062 B2* | 1/2005 | Aronson et al. | 345/522 |
| 6,891,544 B2 | 5/2005 | Oka et al. | |
| 6,897,871 B1* | 5/2005 | Morein et al. | 345/501 |
| 6,940,515 B1 | 9/2005 | Moreton et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,909 B1* | 3/2006 | Morgan, III et al. | 345/426 |
| 7,015,915 B1 | 3/2006 | Diard | |
| 2003/0005016 A1* | 1/2003 | Tzeng et al. | 708/628 |
| 2003/0009748 A1* | 1/2003 | Glanville et al. | 717/140 |
| 2003/0020741 A1 | 1/2003 | Boland et al. | |
| 2003/0179220 A1* | 9/2003 | Dietrich et al. | 345/679 |
| 2004/0012596 A1 | 1/2004 | Allen et al. | |
| 2004/0066385 A1* | 4/2004 | Kilgard et al. | 345/506 |
| 2004/0158693 A1 | 8/2004 | Dagan et al. | |
| 2004/0169671 A1 | 9/2004 | Aronson et al. | |
| 2005/0243094 A1* | 11/2005 | Patel et al. | 345/506 |
| 2006/0053189 A1* | 3/2006 | Mantor | 708/490 |

(Continued)

OTHER PUBLICATIONS

Moya et al., Shader Performance Analysis on a Modern GPU Architecture, Proceeedings of the 38th Annual IEEE/ACM International Symposium on Microarchitecture, 2005.*

(Continued)

*Primary Examiner* — Xiao M. Wu
*Assistant Examiner* — Charles Tseng
(74) *Attorney, Agent, or Firm* — Patterson & Sheridan, LLP

(57) ABSTRACT

Systems and methods for providing a unified instruction set allow shader programs of different types to use a common instruction set. The unified instruction set provides easy access for new graphics hardware features and faster compile times for shader programs. Programmers may use the unified instruction set to write fragment, vertex, or geometry programs. Functions that use the unified instruction set can be included in shader, vertex, or geometry programs without modification. Existing shader programs may be compiled to produce shader microcode based on the unified instruction set. The shader microcode may then be executed by processing units designed to support the unified instruction set.

27 Claims, 9 Drawing Sheets

U.S. PATENT DOCUMENTS

2006/0114260 A1    6/2006   Diard
2007/0091088 A1*   4/2007   Jiao et al. ...................... 345/426

OTHER PUBLICATIONS

Fowler, Unified Pixel Shading in the ATI R200, SIGGRAPH Eurographics Hardware Workshop 2001.*

Mark et al., Cg: A System for Programming Graphics Hardware in a C-like Language, International Conference on Computer Graphics and Interactive Techniques, ACM SIGGRAPH 2003.*

Anido et al., Improving the Operation Autonomy of SIMD Processing Elements by Using Guarded Instructions and Pseudo Branches, Proceedings of the Euromicro Symposium on Digital System Design, 2002.*

Matusiak, Extended Precision Radix-4 Fast Fourier Transform Implemented on the TMS320C62x, SPRA297, Nov. 2002.*

Biermann et al., EXT_pixel_buffer_object, http://www.nvidia.com/dev_content/nvopenglspecs/GL_EXT_pixel_buffer_object.txt.*

Brabec et al., Shadow volumes on Programmable Graphics Hardware, EUROGRAPHICS 2003, vol. 22, No. 3, pp. 433-440.*

Mark J. Kilgard, NV_vertex_program, NVIDIA Corporation, Version 1.9, Feb. 24, 2004, pp. 1-49, http://www.nvidia.com/dev_content/nvopenalspecs/GL_NV_vertex program.tx.

Pat Brown et al., NV_Fragment_program, NVIDIA Corporation, Version: Last Modified May 24, 2005, NVIDIA Revision 73, pp. 1-51 http://www.nvidia.com/dev_content/nvopenglspecs/GL_NV_fragment program.tx.

Kurt Akeley et al., ARB_vertex_program, Version: Last Modified May 1, 2003, Revision 42, pp. 1-82, http://www.nvidia.com/dev_content/nvopenglspecs/GL_ARB_vertex program.tx.

Bob Beretta et al., ARB_fragment_program, Version: Last Modified Date Jan. 10, 2003, Revision 24, pp. 1-55, http://www.nvidia.com/dev_content/nvopenglspecs/GL_ARB_fragment program.tx.

Pat Brown et al., NV_vertex_program2, NVIDIA Corporation, Version: Last Modified May 16, 2004, NVIDIA Revision 32, pp. 1-44, http://www.nvidia.com/dev_content/nvopenglspecs/GL_NV_vertex_program2.txt.

Pat Brown, NV vertex program3, NVIDIA Corporation, Version: Last Modified Date May 17, 2004, NVIDIA Revision 1, pp. 1-12 http://www.nvidia.com/dev_content/nvopenglspecs/GL_NV_vertex_program3.tx.

Pat Brown et al., NV_fragment_program2, NVIDIA Corporation, Version: Last Modified May 17, 2004, NVIDIA Revision 6, pp. 1-12, http://www.nvidia.com/dev_content/nvopenglspecs/GL_NV_fragment program2.tx.

Office Action. U.S. Appl. No. 11/565,566, dated Jun. 9, 2009.

* cited by examiner

PRIOR
ART

UNIFIED ASSEMBLY INSTRUCTION SET FOR GRAPHICS PROCESSING

CROSS-REFERENCE TO RELATED APPLICATIONS

This application claims benefit of U.S. provisional patent application titled, "API Extensions for Advanced Graphics Processing Units," filed Jul. 28, 2006, and having Ser. No. 60/833,978, which is herein incorporated by reference.

BACKGROUND OF THE INVENTION

1. Field of the Invention

One or more aspects of the present invention relate generally to instruction sets, and more particularly to a unified instruction set for vertex, fragment, or geometry programs.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, the newest GPUs are now able to perform geometry processing operations; whereas, such operations traditionally had been left to the central processing unit (CPU). One benefit of this shift in responsibilities is that more graphics processing may now be performed on the GPU instead of the CPU, thereby reducing performance bottlenecks in the graphics pipeline.

To fully realize additional processing capabilities of advanced GPUs, as much GPU functionality as possible needs to be exposed to graphics application developers. Among other things, doing so enables graphics application developers to tailor their shader programs to optimize the way GPUs process graphics scenes and images. Exposing new GPU processing capabilities, like geometry processing, to graphics application developers requires that the application programming interface (API) be configured with new calls and libraries that make new features and functionalities directly accessible by developers.

Some graphics APIs expose an interface to graphics application developers that consists of a set of calls written in a high-level programming language. To access the API, graphics application developers have to write their shader programs in the same high-level programming language or have their program code translated into that same high-level programming language. One drawback of this approach is that the shader programs written or translated into the high-level programming language of the API must first be compiled within the API layer into microcode that can then be executed on the GPU. Compiling shader programs is typically performed by the CPU while the application is running. The processing overhead required for the compilation can reduce the application's frame rate. When the compilation is performed offline, the shader program is compiled to produce microcode for a specific GPU, limiting a user's ability to use another GPU for execution of the microcode. Another drawback is that the set of calls to which graphics application developers have access may not reflect the full functionality of the GPU. In a sense, developers are held hostage to the whims of the API architect. For example, if the API architect chooses not to write an API call that exposes one of the salient features of the GPU to the graphics application developer, then the developer has no way to access that GPU feature.

FIG. 1 is a conceptual diagram illustrating the relationships between instruction set architectures, shader programs, microcode assemblers, and processing units in a prior art system. A conventional graphics processor 150 includes a vertex processing unit 155 and a fragment processing unit 160. The vertex processing unit 155 is configured to execute compiled vertex shader programs and the fragment processing unit 160 is configured to execute compiled fragment shader programs. A vertex shader program 115 is constructed using program instructions from a vertex instruction set architecture (ISA) 105. Likewise, a fragment shader program 120 is constructed using program instructions from a fragment ISA 110.

Program instructions included in fragment ISA 110 are designed for execution in the fragment domain and generally may not be executed in the vertex domain. Likewise, program instructions included in vertex ISA 105 are intended for execution in the vertex domain and generally may not be executed in the fragment domain. Due to these differences between fragment ISA 110 and vertex ISA 105, application developers can not be assured that code developed using an ISA for one processing domain can be used without substantial modifications for a different processing domain. Therefore, dedicated microcode assemblers are used to translate the shader programs for each domain. Specifically, a GPU vertex microcode assembler 125 compiles vertex shader program 115 into microcode for execution by vertex processing unit 155. Similarly, a GPU fragment microcode assembler 130 compiles fragment shader program 120 into microcode for execution by fragment processing unit 160. Upon execution of the microcode, graphics processor 150 outputs processed graphics data 170.

As the processing capabilities of graphics processor 150 evolve, instructions are added in vertex ISA 105 and fragment ISA 110 as needed to expose the new processing capabilities. Processing capabilities that are available for both vertex and fragment shaders must be added to both vertex ISA 105 and fragment ISA 110. Additionally, both compilers, GPU vertex microcode assembler and GPU fragment microcode assembler 130, are updated to translate any new instructions into microcode.

As the foregoing illustrates, what is needed in the art is an application programming interface that exposes new processing capabilities of GPUs, while requiring minimal changes to the programming architecture.

SUMMARY OF THE INVENTION

Systems and methods of the present invention provide a unified instruction set that allows shader programs of different types to use a common instruction set. The unified instruction set provides easy access for new graphics hardware features and faster compile times for shader programs written using the unified instruction set compared with shader program written using a high-level programming language. Programmers may use the unified instruction set to write fragment, vertex, or geometry programs. Functions that use the unified instruction set may be included in shader, vertex, or geometry programs without modification. Existing shader programs written in high-level languages may be compiled to produce shader programs that use the unified instruction set. Shader programs written using the unified instruction set are assembled to produce shader microcode for execution by any graphics processors designed to support the unified instruction set.

Various embodiments of the invention include a computer device comprising a processing unit and a software program. The processing unit has a vertex execution unit that is configured to execute vertex shader microcode and a fragment execution unit that is configured to execute fragment shader microcode. The software program is configured to receive a shader program from an application, determine a target execution unit of the processing unit that is specified by the shader program, and convert the shader program into shader microcode for execution by the target unit of the processing unit. The shader program is comprised of assembly instructions and includes a set of assembly instructions from a unified shader program assembly instruction set that can be executed by both the vertex execution unit of the processing unit and the fragment execution unit of the processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for providing a unified instruction set allow shader programs of different types to use a common instruction set. The unified instruction set provides easy access for new graphics hardware features and faster compile times for shader programs. Programmers may use the unified instruction set to write fragment, vertex, or geometry programs. Existing high-level shader programs and assembly level shader programs using conventional instruction sets may be compiled to produce shader microcode based on the unified instruction set. The shader microcode may then be executed by graphics processors designed to support the unified instruction set.

Importantly, the unified instruction set allows a programmer to access new features of graphics processors. In particular, the unified instruction set provides fully capable signed and unsigned integer data types, along with a set of arithmetic, logical, and data type conversion instructions capable of operating on integers. A uniform set of structured branching constructs, e.g., if tests, loops, subroutines, and the like, is provided that fully support runtime condition testing. Several new texture mapping capabilities of graphics processors are also exposed. For example, shadow cube maps are supported, where cube map faces can encode depth values. Assembly texture lookup instructions can include an immediate texel offset, which can assist in advanced texture filtering and querying. New assembly instructions are provided for fetching a single texel by address in a texture map and querying the size of a specified texture level.

Figure 1:
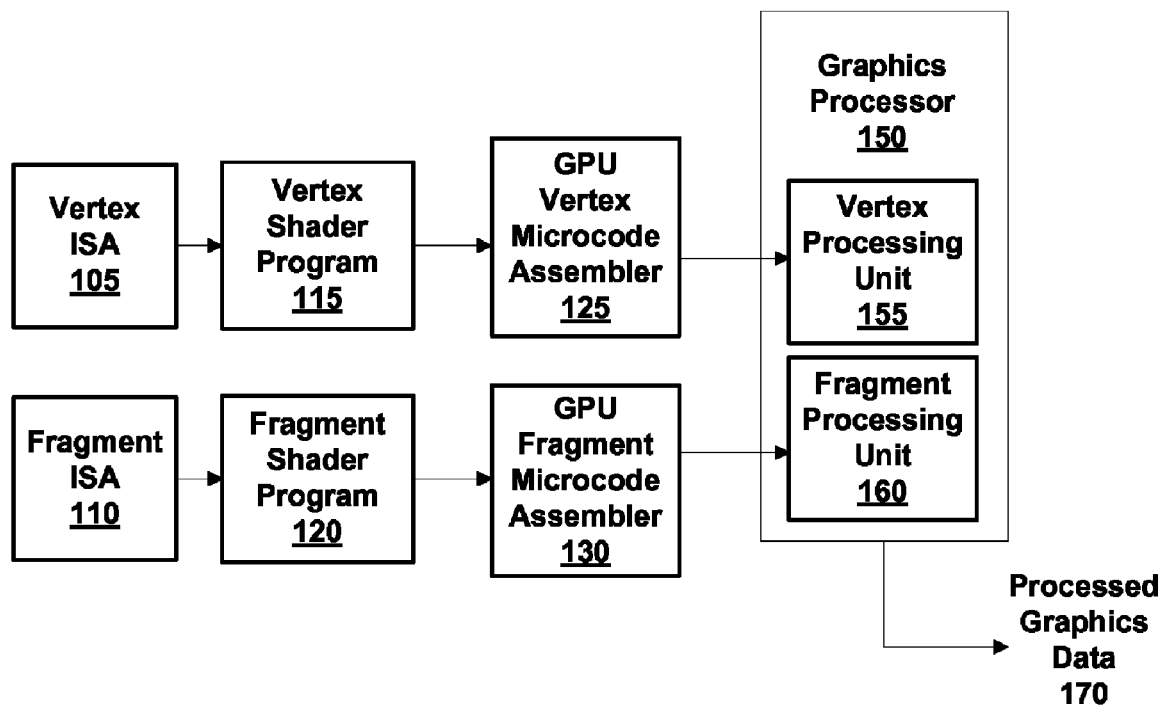
FIG. 1 is a conceptual diagram illustrating the relationships between instruction set architectures, shader programs, microcode assemblers, and processing units in a prior art system.
Figure 2A:
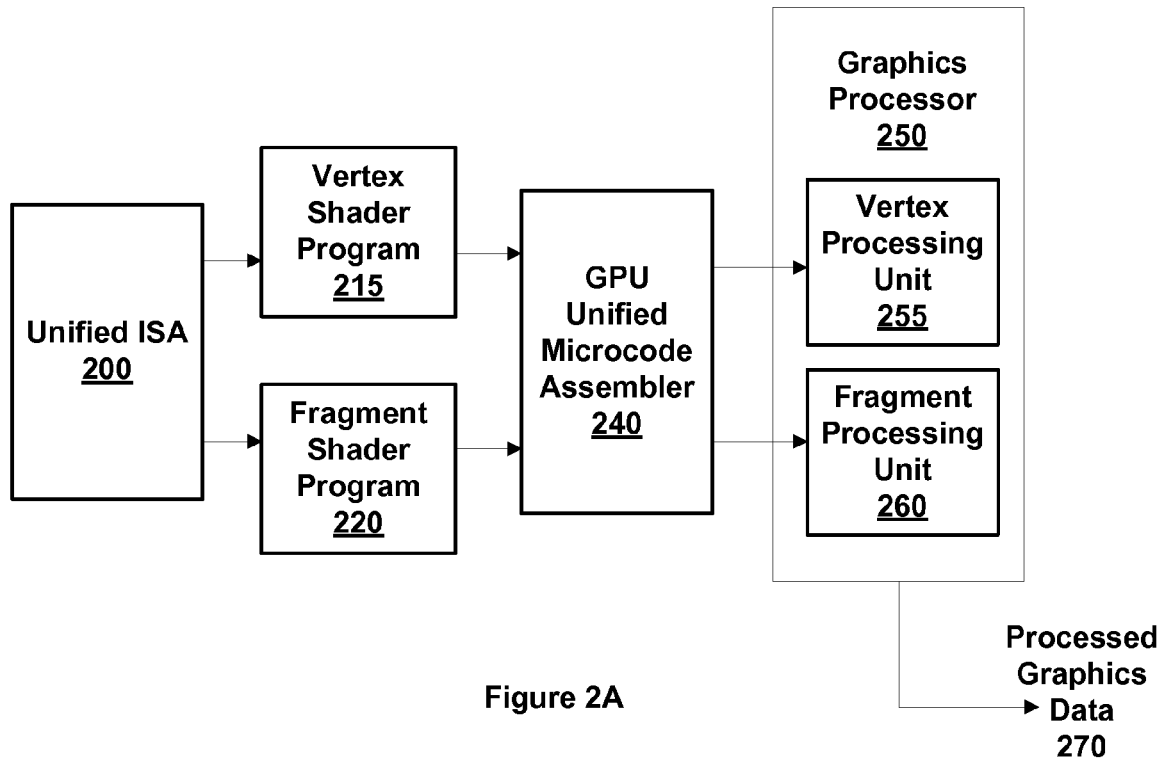
FIG. 2A is a conceptual diagram illustrating the relationships between a unified instruction set architecture, shader programs, a unified microcode assembler, and processing units in accordance with one or more aspects of the present invention.

FIG. 2A is a conceptual diagram illustrating the relationships between a unified instruction set architecture (ISA) 200, shader programs, a graphics processing unit (GPU) unified microcode assembler 240, and processing units in accordance with one or more aspects of the present invention. Unified ISA 200 includes shader program assembly instructions that are used to compose shader programs such as vertex shader program 215 and fragment shader program 220. Importantly, the shader program assembly instructions in unified ISA 200 are used for vertex and fragment shader programs, unlike conventional assembly instruction sets which are specific to the type of shader program, vertex or fragment. Unified ISA 200 may be embodied as an extension to OpenGL or OpenGL ES applications programming interface (API), as described in conjunction with FIG. 2C.

Unified microcode assembler 240 converts the shader program assembly instructions in vertex shader program 215 and fragment shader program 220 into microcode for execution by vertex processing unit 255 and fragment processing unit 260, respectively. GPU unified microcode assembler 240 is configured to operate in a runtime mode in order to output the shader microcode to the appropriate execution unit within graphics processor 250 as the shader microcode is generated. GPU unified microcode assembler 240 determines which of the execution units within graphics processor 250, e.g., vertex processing unit 255 and fragment processing unit 260, a shader program targets and includes domain specific interfaces corresponding to the inputs and outputs of the target execution unit. In some embodiments of the present invention, the target execution unit is identified by a header or tag in the shader program, e.g., vertex shader program 215 and fragment shader program 220. Vertex processing unit 255 and fragment processing unit 260 execute the shader microcode produced by GPU unified microcode assembler 240 and graphics processor 250 outputs processed graphics data 270.

Figure 2B:
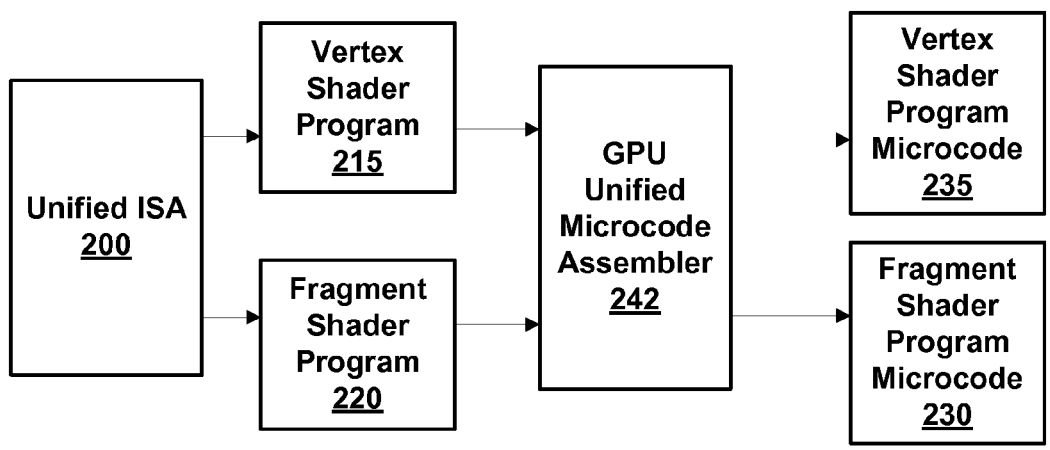
FIG. 2B is a conceptual diagram illustrating the relationships between a unified instruction set architecture, shader programs, a unified microcode assembler, and shader program microcode in accordance with one or more aspects of the present invention.

FIG. 2B is a conceptual diagram illustrating the relationships between unified ISA 200, shader programs, another GPU unified microcode assembler, and shader program microcode, in accordance with one or more aspects of the present invention. In this embodiment of the present invention, GPU unified microcode assembler 242 is also configured to convert the shader program assembly instructions in vertex shader program 215 and fragment shader program 220 into microcode for execution by vertex processing unit 255 and fragment processing unit 260, respectively. However, GPU unified microcode assembler 242 is configured to operate in an off-line mode and produce an executable file that is stored. Therefore, GPU unified microcode assembler 242 outputs executable files, vertex shader program microcode 235 and fragment shader program microcode 230, corresponding to vertex shader program 215 and fragment shader program 220, respectively. Vertex shader program microcode 235 and fragment shader program microcode 230 are stored for execution by graphics processor 250 or another graphics processor, at a later time. GPU unified microcode assembler 242 may be executed by a CPU that is in a different computing system than the graphics processor that will execute vertex shader program microcode 235 or fragment shader program microcode 230.

GPU unified microcode assembler 240 and 242 may be included within a device driver to convert shader programs based on specific capabilities of graphics processor 250 and other graphics processors. Therefore, vertex shader program 215 and fragment shader program 220 may be executed on other graphics processors, including new graphics processors, as long as the shader programs are written using assembly shader program instructions included in unified ISA 200. In other embodiments of the present invention, graphics processor 250 may be a general purpose processor that is configured to execute shader programs.

Figure 2C:
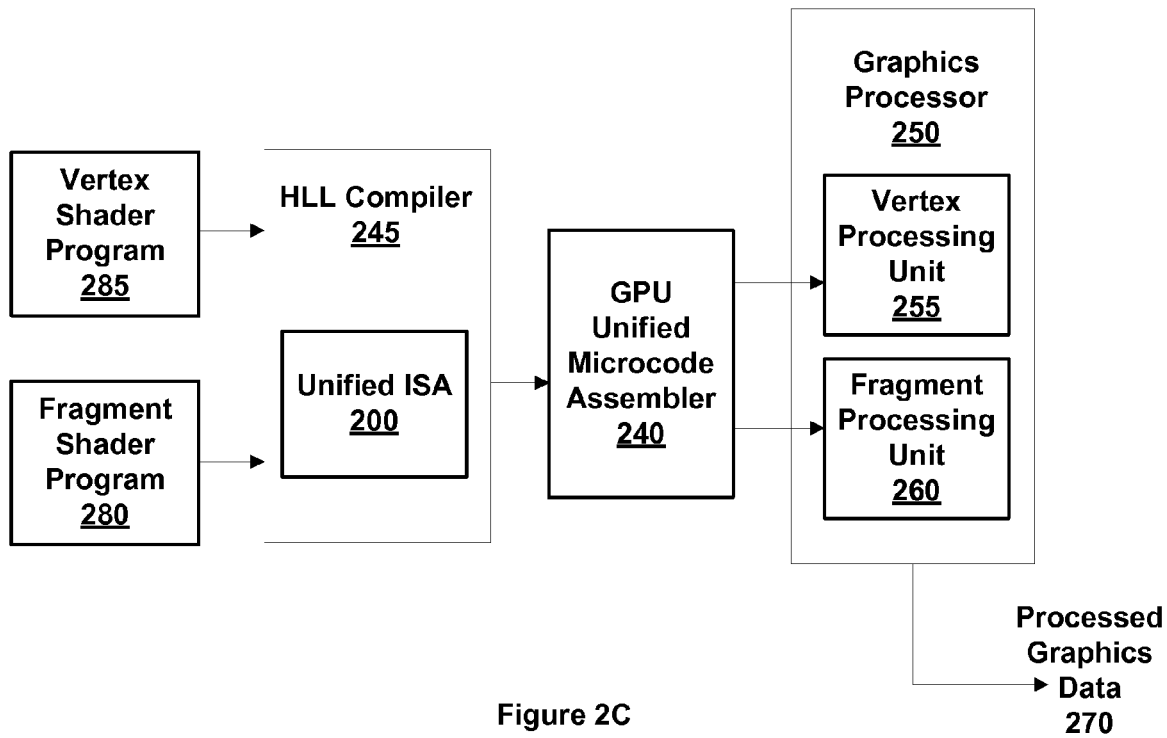
FIG. 2C is a conceptual diagram illustrating the relationships between high-level language (HLL) programs, unified instruction set architecture, and a unified microcode assembler in accordance with one or more aspects of the present invention.

FIG. 2C is a conceptual diagram illustrating the relationships between HLL programs, unified ISA 200, and GPU unified microcode assembler 240, in accordance with one or more aspects of the present invention. A vertex shader program 285 and a fragment shader program 280 are each expressed using a HLL, such as OpenGL's GLSL, Microsoft's HLSL (high-level shading language) for Direct3D, and NVIDIA's Cg (C for graphics), which are similar to the C programming language. HLL programs, vertex shader program 285 and fragment shader program 280, are input to an HLL compiler 245 to convert the HLL instructions into new shader program text including assembly instructions from unified ISA 200. In some embodiments of the present invention, HLL compiler 245 is included within a device driver and GPU unified microcode assembler 240 is omitted. In those embodiments, HLL compiler 245 compiles the HLL instructions into shader program microcode. Furthermore, HLL compiler 245 may be configured to operate in a runtime mode or to operate in an off-line mode and generate an executable file for storage. HLL compiler 245 may be executed by a CPU that is in a different computing system than graphics processor 250.

HLLs provide programmers with a familiar programming language, allowing complex graphics shader programs to be written quickly and with fewer errors compared with writing the same shader programs using assembly instructions. When a programmer uses a proprietary language to compose a shader program, a corresponding compiler may be used to translate the proprietary language instructions into shader assembly instructions from unified ISA 200. However, disadvantages of using an HLL instead of assembly shader instructions are that HLLs may not expose new hardware capabilities and shader programs written using assembly shader instructions may provide faster compile times and better graphics processing performance when executed by a graphics processor.

The new shader program text corresponding to vertex shader program 285 and fragment shader program 280 is converted into shader microcode by GPU unified microcode assembler 240 for execution by vertex processing unit 255 and fragment processing unit 260, respectively. When the shader microcode is executed by vertex processing unit 255 and fragment processing unit 260, graphics processor 250 outputs processed graphics data.

Figure 2D:
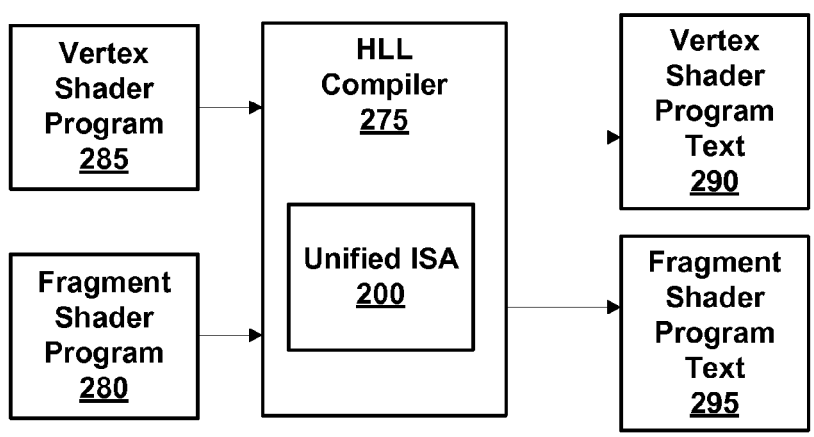
FIG. 2D is a conceptual diagram illustrating the relationships between high-level language (HLL) programs, unified instruction set architecture, a unified microcode assembler, and shader program assembly code in accordance with one or more aspects of the present invention.

FIG. 2D is a conceptual diagram illustrating the relationships between high-level language (HLL) programs, unified instruction set architecture, a unified microcode assembler, and shader program assembly code in accordance with one or more aspects of the present invention. In this embodiment of the present invention, HLL compiler 275 is configured to operate in an off-line mode and the new shader text produced by HLL compiler 275 is stored and processed by GPU unified microcode assembler 240 at a later time. HLL programs, vertex shader program 285 and fragment shader program 280, are input to an HLL compiler 275 to convert the HLL instructions into new shader program text including assembly instructions from unified ISA 200, e.g., vertex shader program text 290 and fragment shader program text 295. HLL compiler 245 may be executed by a CPU that is in a different computing system than the GPU unified microcode assembler that will assemble vertex shader program text 290 and fragment shader program text 295. HLL compiler 245 may be included within a device driver or HLL compiler 245 may be separate from the device driver.

Figure 3A:
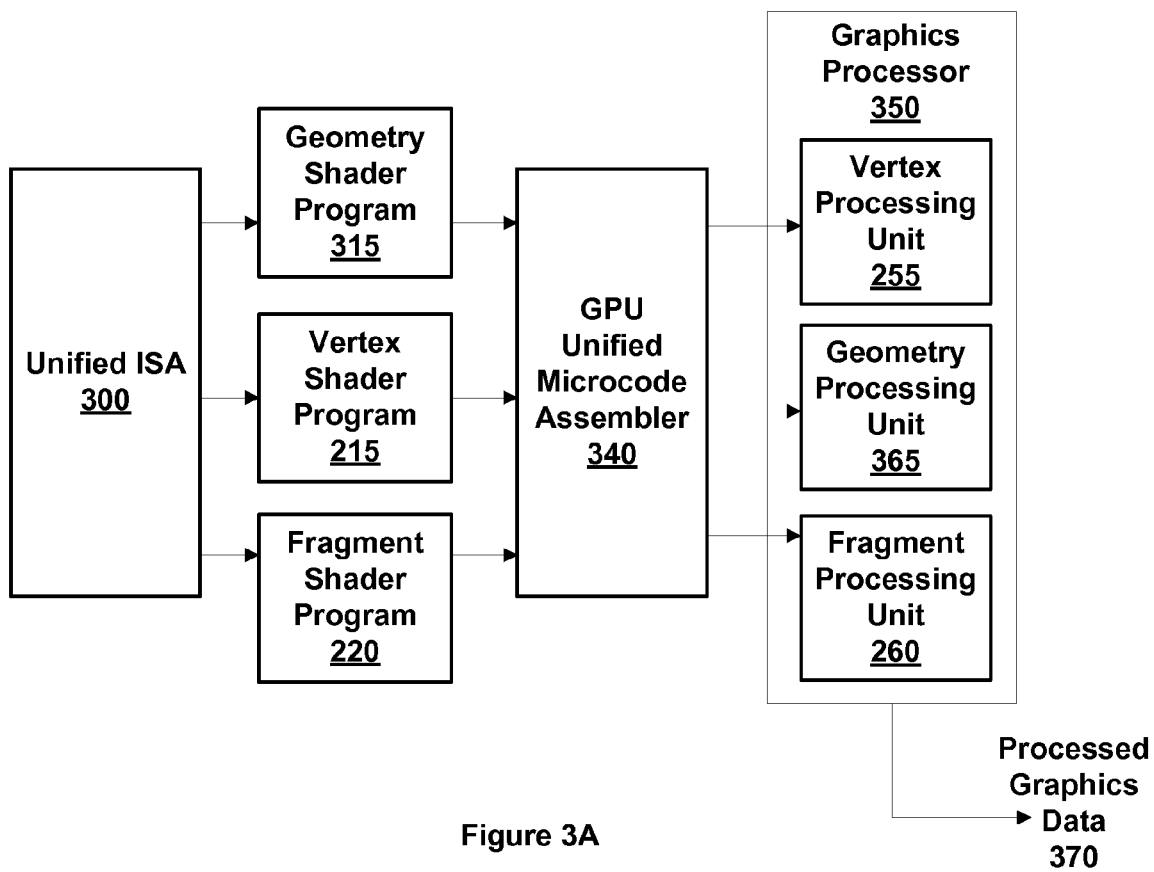
FIG. 3A is another conceptual diagram illustrating the relationships between a unified instruction set architecture, shader programs, a unified microcode assembler, and processing units in accordance with one or more aspects of the present invention.

FIG. 3A is another conceptual diagram illustrating the relationships between a unified ISA 300, shader programs, a GPU unified microcode assembler 340, and processing units, in accordance with one or more aspects of the present invention. In addition to vertex processing unit 255 and fragment processing unit 260 shown in FIG. 2A, a graphics processor 350 also includes a geometry processing unit 365 that is configured to execute geometry shader programs, such as geometry shader program 315. Geometry shader programs may be used to transform the vertices of an input graphics primitive into one or more new graphics primitives. For example, a geometry shader program may be used to subdivide graphics primitives into smaller graphics primitives.

Unified ISA 300 includes assembly shader program instructions that may be executed by geometry processing unit 365, vertex processing unit 255, and fragment processing unit 260. In some embodiments of the present invention unified ISA 200 is the same as unified ISA 300. GPU unified microcode assembler 340 is configured to convert the shader program assembly instructions in vertex shader program 215, fragment shader program 220, and geometry shader program 315, into microcode for execution by vertex processing unit 255, fragment processing unit 260, and geometry processing unit 365, respectively. GPU unified microcode assembler 340 is configured to operate in a runtime mode in order to output the shader microcode to the appropriate execution unit within graphics processor 350 as the shader microcode is generated.

GPU unified microcode assembler 340 determines which of the execution units within graphics processor 350, e.g., geometry processing unit 365, vertex processing unit 255, and fragment processing unit 260, a shader program targets and includes domain specific interfaces corresponding to the inputs and outputs of the target execution unit. Geometry processing unit 365, vertex processing unit 255, and fragment processing unit 260 execute the shader microcode produced by GPU unified microcode assembler 340 and graphics processor 350 outputs processed graphics data 370.

Figure 3B:
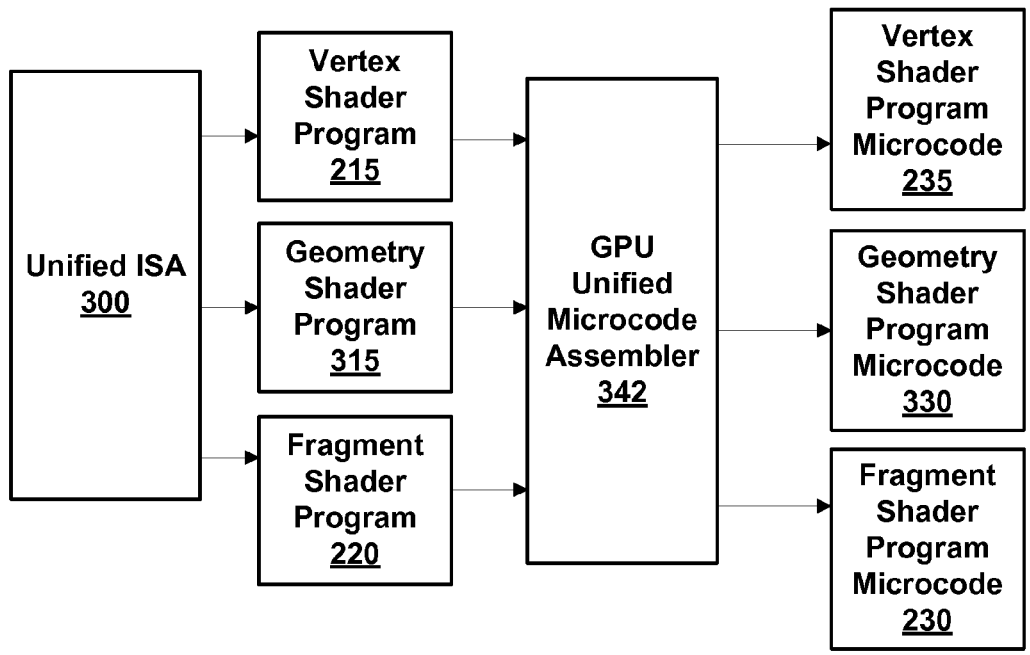
FIG. 3B is another conceptual diagram illustrating the relationships between a unified instruction set architecture, shader programs, a unified microcode assembler, and shader program microcode in accordance with one or more aspects of the present invention.

FIG. 3B is another conceptual diagram illustrating the relationships between unified ISA 300, shader programs, a GPU unified microcode assembler 342, and shader program microcode, in accordance with one or more aspects of the present invention. In this embodiment of the present invention, GPU unified microcode assembler 342 is also configured to convert the shader program assembly instructions in vertex shader program 215, fragment shader program 220, and geometry shader program 315 into microcode for execution by vertex processing unit 255 and fragment processing unit 260, and geometry processing unit 365, respectively. However, like GPU unified microcode assembler 242, GPU unified microcode assembler 342 is configured to operate in an off-line mode and produce an executable file that is stored. Therefore, GPU unified microcode assembler 342 outputs executable files, geometry shader program microcode 330, vertex shader program microcode 235 and fragment shader program microcode 230, corresponding to geometry shader program 315, vertex shader program 215, and fragment shader program 220, respectively. Geometry shader program microcode 330, vertex shader program microcode 235, and fragment shader program microcode 230 are stored for execution by graphics processor 350 or another graphics processor, at a later time. GPU unified microcode assembler 342 may be executed by a CPU that is in a different computing system than the graphics processor that will execute geometry shader program microcode 330, vertex shader program microcode 235, and fragment shader program microcode 230.

Figure 3C:
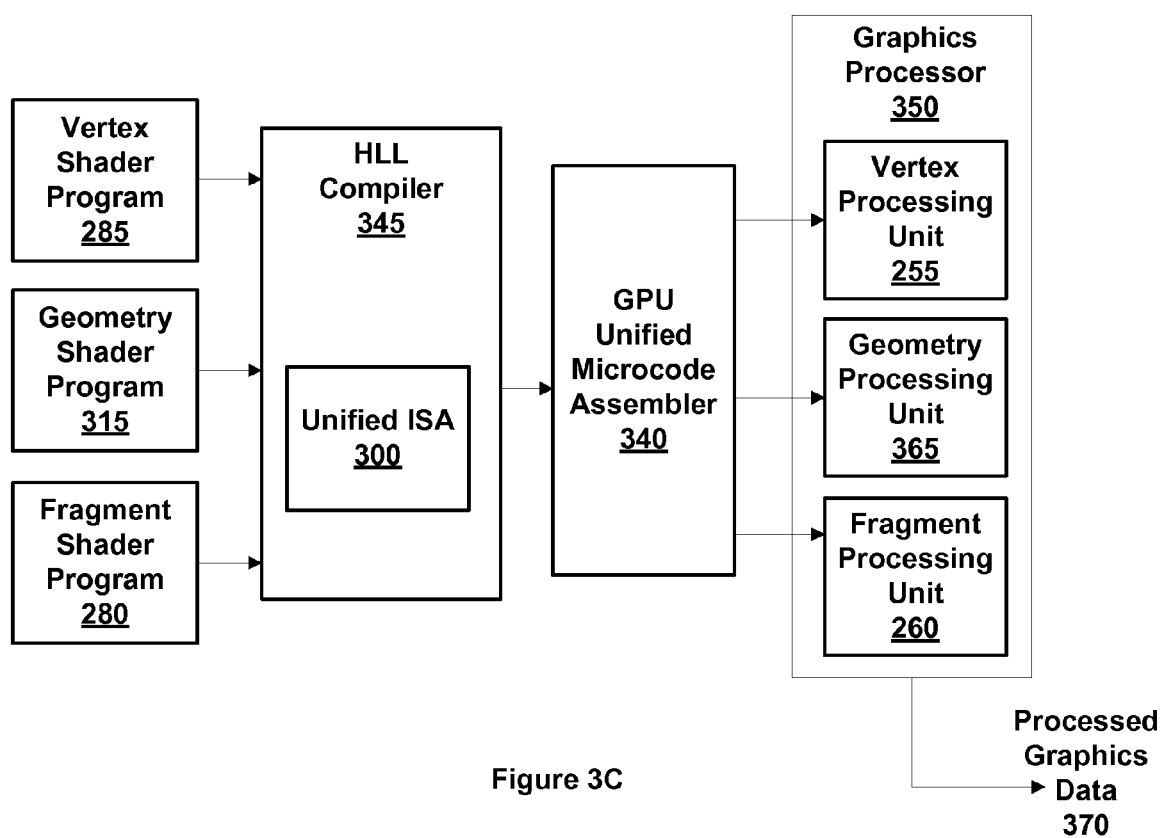
FIG. 3C is another conceptual diagram illustrating the relationships between a HLL shader programs, unified instruction set architecture, a unified microcode assembler, and shader program microcode in accordance with one or more aspects of the present invention.

FIG. 3C is another conceptual diagram illustrating the relationships between HLL shader programs, unified ISA 300, GPU unified microcode assembler 340, and shader program microcode, in accordance with one or more aspects of the present invention. A geometry shader program 315, vertex shader program 285, and fragment shader program 280 are each expressed using a HLL. HLL programs, geometry shader program 315, vertex shader program 285 and fragment shader program 280, are input to an HLL compiler 345 to convert the HLL instructions into new shader program text including assembly instructions from unified ISA 300.

The new shader program text corresponding to geometry shader program 315, vertex shader program 285, and fragment shader program 280 is converted into shader microcode by GPU unified microcode assembler 340 for execution by geometry processing unit 365, vertex processing unit 255, and fragment processing unit 260, respectively. When the shader microcode is executed by geometry processing unit 365, vertex processing unit 255, and fragment processing unit 260, graphics processor 350 outputs processed graphics data.

In some embodiments of the present invention, the new shader text produced by HLL compiler 345 is stored and processed by GPU unified microcode assembler 340 at a later time. Furthermore, GPU unified microcode assembler 340 may be replaced with GPU unified microcode assembler 342. HLL compiler 345 may be included within a device driver or HLL compiler 345 may be separate from the device driver. HLL compiler 345 may also be configured to operate in a runtime mode or to operate in an off-line mode and generate an executable file for storage. HLL compiler 345 may be executed by a CPU that is in a different computing system than graphics processor 350. Furthermore, GPU unified microcode assembler 342 may be omitted and HLL compiler 345 may be included within a device driver and configured to convert geometry shader program 315, vertex shader program 285, and fragment shader program 280 into shader microcode for execution by geometry processing unit 365, vertex processing unit 255, and fragment processing unit 260, respectively.

Figure 4A:
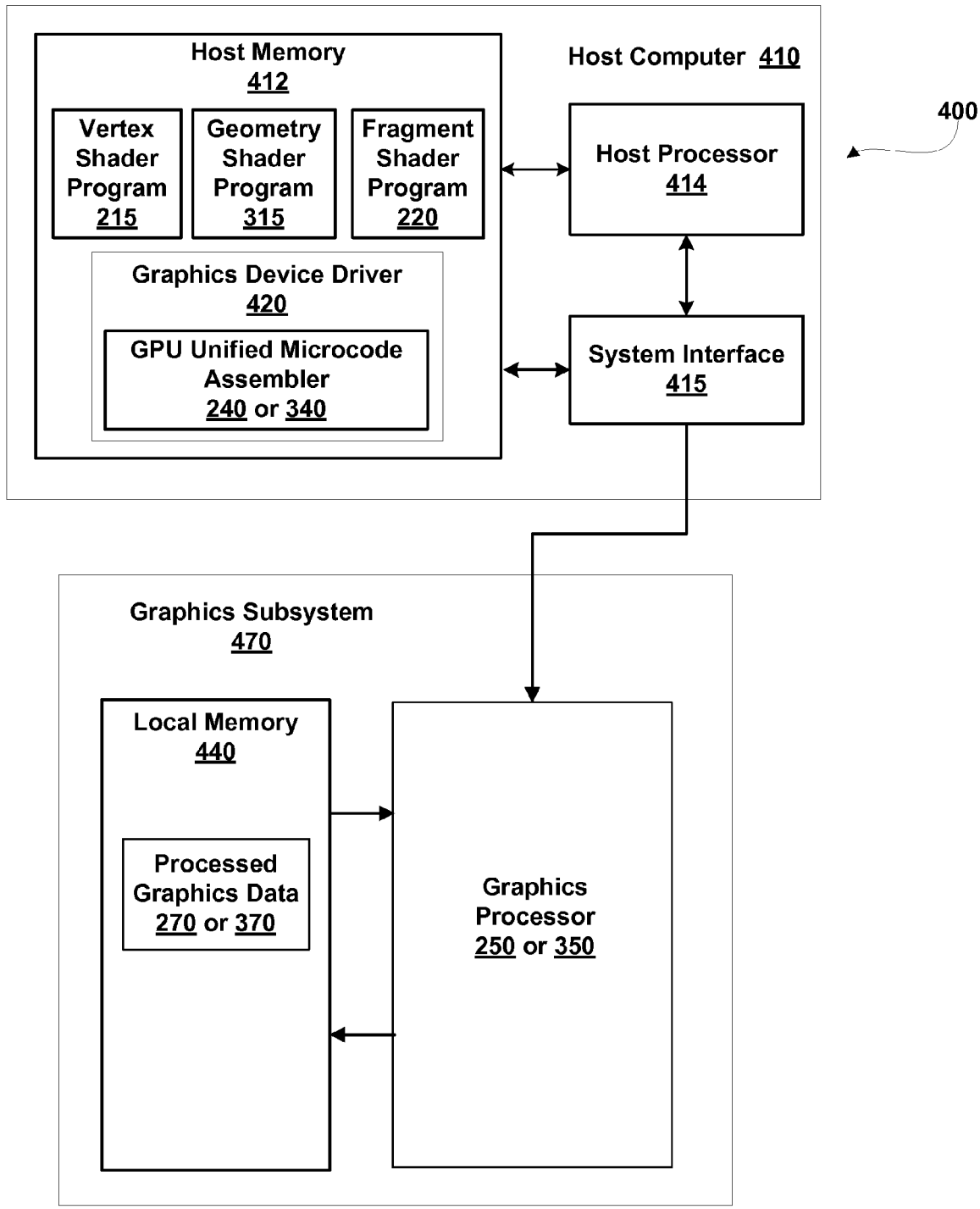
FIG. 4A illustrates one embodiment of a computing system including a host computer and a graphics subsystem in accordance with one or more aspects of the present invention.

FIG. 4A illustrates one embodiment of a computing system 400 including a host computer 410 and a graphics subsystem 470, in accordance with one or more aspects of the present invention. Computing system 400 may be a desktop computer, server, laptop computer, palm-sized computer, tablet computer, game console, cellular telephone, computer based simulator, or the like. Host computer 410 includes host processor 414 that may include a system memory controller to interface directly to host memory 412 or may communicate with host memory 412 through a system interface 415. System interface 415 may be an I/O (input/output) interface or a bridge device including the system memory controller to interface directly to host memory 412.

GPU unified microcode assembler 240 or 340 may be stored in host memory 412 for execution by host processor 414 to produce shader microcode for execution by graphics processor 250 or 350. In particular, GPU unified microcode assembler 240, or 340 produces microcode based on the specific capabilities of the graphics processor that will execute the microcode. For example, when geometry processing unit 365 is included in graphics processor 350 the shader microcode may include microcode corresponding to a geometry shader program. Although computing system 400 includes GPU unified microcode assembler 240 or 340 and graphics subsystem 470, in other embodiments of the present invention, GPU unified microcode assembler 240 or 340 may be executed in a computing system that does not include graphics subsystem 470.

Host computer 410 communicates with graphics subsystem 470 via system interface 415. Data received by graphics processor 250 or 350 can be processed by a graphics pipeline within graphics processor 250 or 350 or written to a local memory 440. Graphics processor 405 uses graphics memory to store graphics data and program instructions, where graphics data is any data that is input to or output from components within graphics processor 250 or 350. Graphics memory can include portions of host memory 412, local memory 440, register files coupled to the components within graphics processor 250 or 350, and the like. Graphics processor 250 or 350 includes one or more processing units that may each read and/or write graphics memory. Details of graphics processor 250 or 350 are described in conjunction with FIG. 4C.

In a typical implementation graphics processor 250 or 350 performs geometry computations, rasterization, pixel computations and raster operations. When the data received by graphics subsystem 470 has been completely processed by graphics processor 250 or 350 outputs processed graphics data 270 or 370 to graphics memory. In some embodiments of the present invention, graphics processor 250 or 350 is optionally configured to deliver data to a display device, network, electronic control system, other computing system 400, other graphics subsystem 470, or the like. Alternatively, data is output to a film recording device or written to a peripheral device, e.g., disk drive, tape, compact disk, or the like. Host processor 400 may also be configured to read processed graphics data 270 or 370 from graphics memory.

Vertex shader program 215, geometry shader program 315, and fragment shader program 220 are stored in host memory 412. A graphics device driver 420 is also stored in host memory 412. GPU unified microcode assembler 240 or 340 may be included within graphics device driver 420. Graphics device driver 420 may be configured to determine the capabilities of graphics processor 350 or 450 and convert the assembly shader instructions of vertex shader program 215, geometry shader program 305, and fragment shader program 220 for execution by execution units within graphics processor 350 or 450, or other graphics processors based on the specific capabilities of each graphics processor.

Figure 4B:
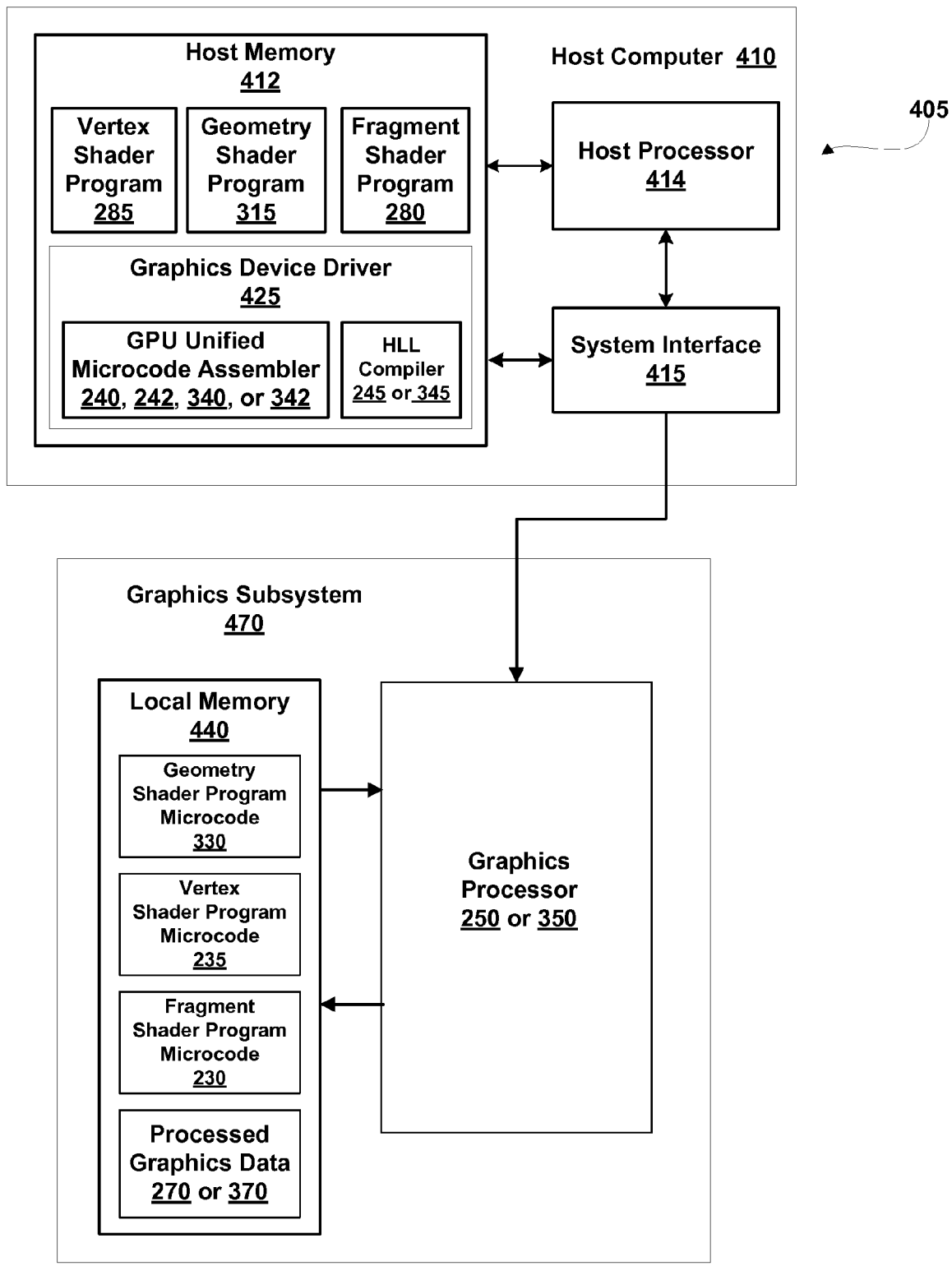
FIG. 4B illustrates another embodiment of a computing system including a host computer and a graphics subsystem in accordance with one or more aspects of the present invention.

FIG. 4B illustrates another embodiment of a computing system 405 including host computer 410 and a graphics subsystem 470, in accordance with one or more aspects of the present invention. Computing system 405 includes several of the elements shown in FIG. 4A. A graphics device driver 425 includes GPU unified microcode assembler 240, 242, 340, or 342 and HLL compiler 245 or 345. In other embodiments of the present invention, GPU unified microcode assembler 240, 242, 340, or 342 and/or HLL compiler 245 or 345 are not included within graphics device driver 425. HLL shader programs vertex shader program 285, fragment shader program 280, and geometry shader program 315 are stored in host memory 312 and the HLL instructions in those shader programs are converted into new shader program text that includes assembly instructions from unified ISA 300 by HLL compiler 245 or 345. As shown in FIGS. 2C, 2D, and 3C, HLL compilers 245 and 345 include unified ISA 300. In some embodiments of the present invention, GPU unified microcode assembler 240, 242, 340, or 342 is omitted and HLL compiler 245 or 345 produces geometry shader program microcode 330, vertex shader program microcode 235, and fragment shader program microcode 230.

When operating in an off-line mode, GPU unified microcode assembler 242 or 342 produces geometry shader program microcode 330, vertex shader program microcode 235, and fragment shader program microcode 230 for execution by graphics processor 350. Graphics processor 250 or 350 executes the shader program microcode to produce processed graphics data 270 or 370 that is stored in local memory 340. In some embodiments of the present invention, geometry shader program microcode 330, vertex shader program microcode 235, and fragment shader program microcode 230 may be produced by a GPU unified microcode assembler 240, 242, 340, or 342 and/or HLL compiler 245 or 345 executed on a CPU that is not included within host computer 410.

The unified instruction set allows a programmer to access new features of graphics processors and use a common instruction set to program different types of shaders. In particular, the unified instruction set provides assembly instructions for execution by a programmable geometry processing unit. Shader code written using unified ISA 200 and 300 may be leveraged for use in different types of shader programs. Additionally, conventional fragment shader code and vertex shader code can be translated to use unified ISA 200 and 300 for execution on newer graphics processors.

Figure 4C:
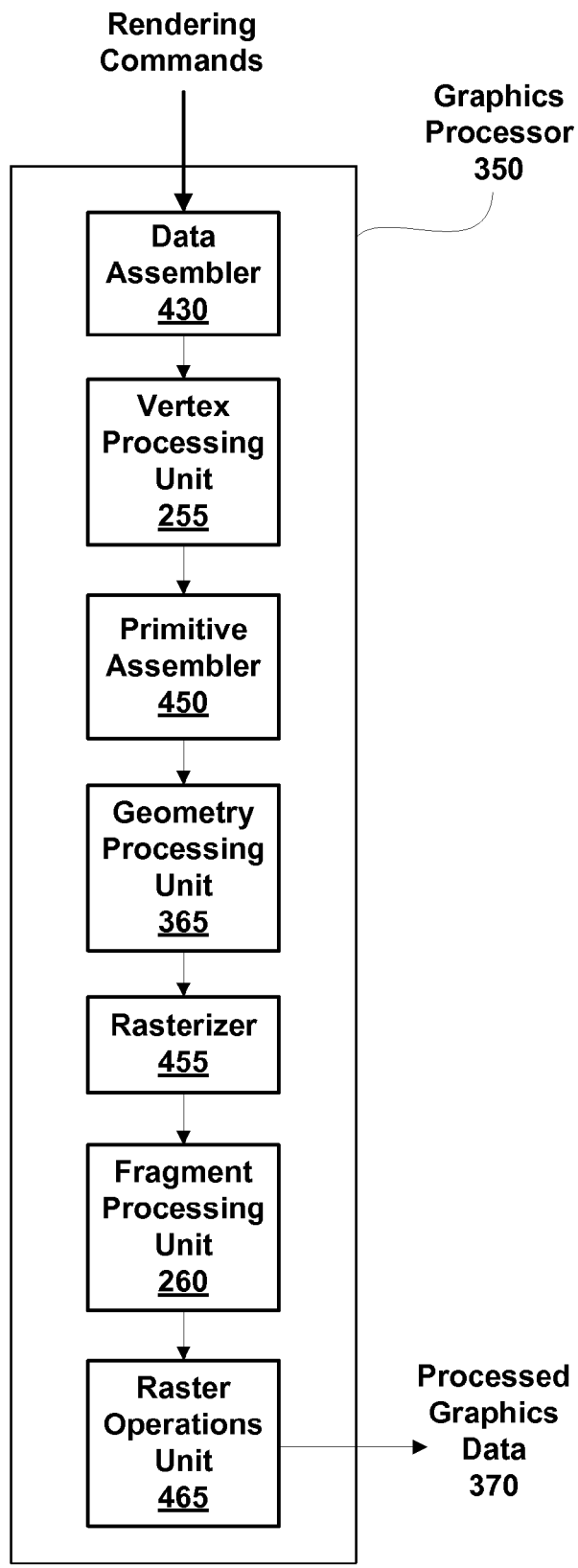
FIG. 4C illustrates the graphics processor of FIGS. 4A and 4B in accordance with one or more aspects of the present invention.

FIG. 4C illustrates the graphics processor 350 of FIGS. 3A, 3C, 4A, and 4B, in accordance with one or more aspects of the present invention. Graphics processor 350 includes a data assembler 430, vertex processing unit 255, a primitive assembler 450, geometry processing unit 365, a rasterizer 455, fragment processing unit 260, and a raster operations unit 465. Data assembler 430 is a fixed function unit that collects vertex data for high-order surfaces, primitives, and the like, and outputs the vertex data to vertex processing unit 255. Vertex processing unit 255 is a programmable execution unit that is configured to execute vertex shader programs, transforming vertex data as specified by the vertex shader programs. For example, vertex processing unit 255 may be programmed to transform the vertex data from an object-based coordinate representation (object space) to an alternatively based coordinate system such as world space or normalized device coordinates (NDC) space. Vertex processing unit 255 may read texture map data that is stored in local memory 340 through an interface (not shown) for use in processing the vertex data.

Primitive assembler 450 is fixed function unit that receives processed vertex data from vertex processing unit 255 and constructs graphics primitives, e.g., points, lines, triangles, or the like, for processing by geometry processing unit 365. Geometry processing unit 365 is a programmable execution unit that is configured to execute geometry shader programs, transforming graphics primitives received from primitive assembler 450 as specified by the geometry shader programs. For example, geometry processing unit 365 may be programmed to subdivide the graphics primitives into one or more new graphics primitives and calculate parameters, such as plane equation coefficients, that are used to rasterize the new graphics primitives. Geometry processing unit 365 outputs the parameters and new graphics primitives to rasterizer 455. Geometry processing unit 365 may read texture map data that is stored in local memory 340 through an interface (not shown) for use in processing the geometry data.

Rasterizer 455 is a fixed function unit that scan converts the new graphics primitives and outputs fragments and coverage data to fragment processing unit 260. Rasterizer 455 may include an assembly unit that collects the vertices emitted by geometry processing unit 365 into individual graphics primitives, e.g., points, lines, triangles, and the like, for scan conversion. Fragment processing unit 260 is a programmable execution unit that is configured to execute fragment shader programs, transforming fragments received from rasterizer 455 as specified by the fragment shader programs. For example, fragment processing unit 260 may be programmed to perform operations such as perspective correction, texture mapping, shading, blending, and the like, to produce shaded fragments that are output to raster operations unit 465. Fragment processing unit 260 may read texture map data that is stored in local memory 340 through an interface (not shown) for use in processing the fragment data. Raster operations unit 465 is a fixed function unit that optionally performs near and far plane clipping and raster operations, such as stencil, z test, and the like, and outputs pixel data as processed graphics data 370 for storage in graphics memory.

In some embodiments of the present invention, geometry processing unit 365 is replaced with a fixed function unit that is not configured to execute a geometry shader program and graphics device driver 420 does not use assembly shader instructions from unified ISA 300 to produce microcode for execution by the fixed function unit. Because each of the fixed function units may not support the same interfaces, the shader programs for each of the execution units may need to include domain specific code for the input and output interfaces that match the interface of the corresponding fixed function unit. For example, inputs to rasterizer 455 are vertices and outputs of rasterizer 455 are fragments. Therefore, a shader program type, e.g., vertex, geometry, fragment, is used to specify the input and output semantics for a shader program as needed to interface with the fixed function units within a graphics processor. Although assembly instructions from unified ISA 300 may be used for any shader program, programs for different shader types may vary as needed to interface with the fixed function units.

Figure 5:
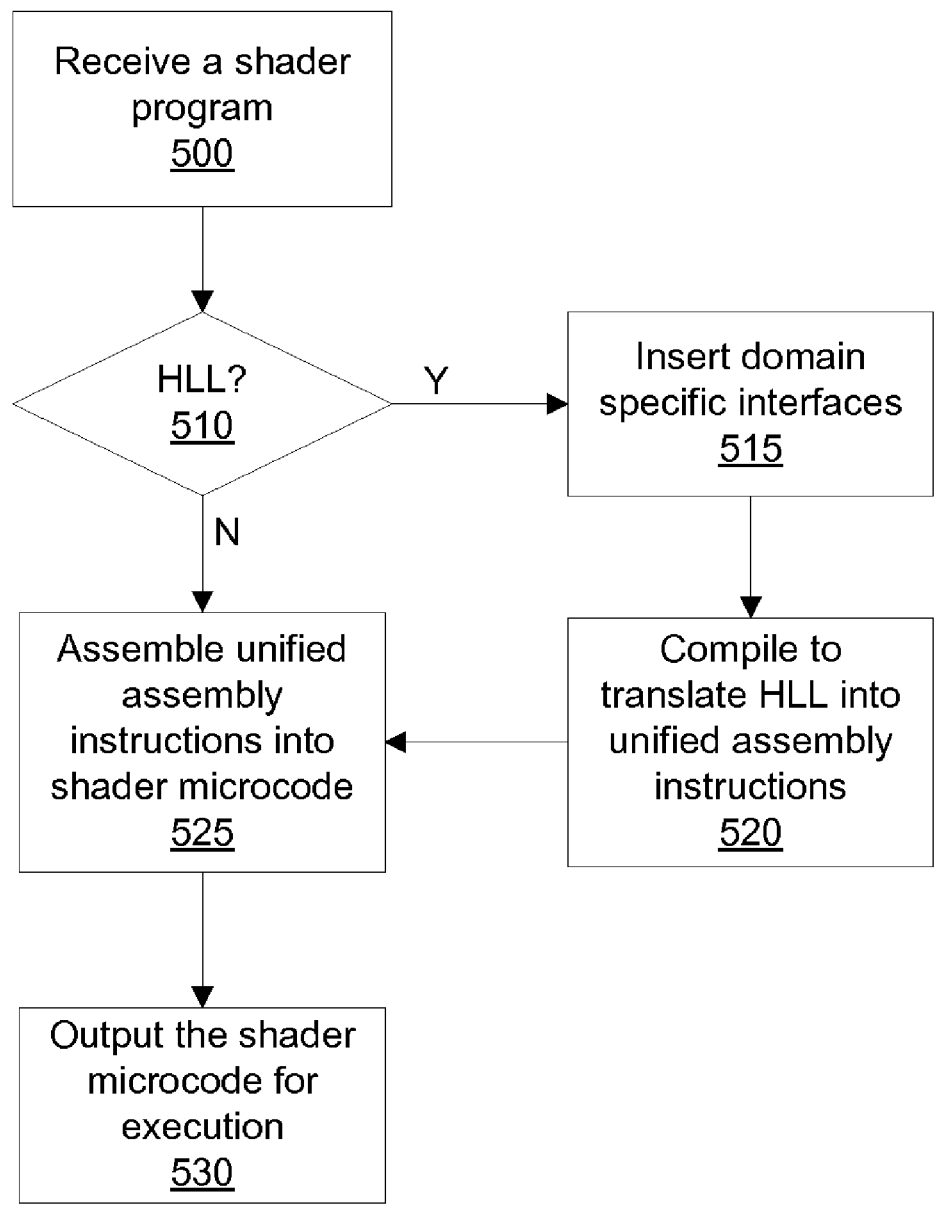
FIG. 5 is a flow diagram of an exemplary embodiment of processing a shader program for execution by a graphics processing unit in accordance with one or more aspects of the present invention.

FIG. 5 is a flow diagram of an exemplary embodiment of processing a shader program for execution by graphics processor 250 or 350, in accordance with one or more aspects of the present invention. In step 500 graphics device driver 420 or 425 receives a shader program, e.g., a vertex shader program, a fragment shader program, or a geometry shader program. In step 510 graphics device driver 420 or 425 determines if the shader program is expressed using a HLL or assembly shader instructions in unified ISA 200 or 300. If, in step 510 graphics device driver 420 or 425 determines that the shader program is expressed using a HLL, then in step 515 HLL compiler 245 or 345 inserts any domain specific interfaces according to the shader type specified by the shader program. In step 520 HLL compiler 245 or 345 compiles the shader program to translate the HLL code into unified assembly shader instructions included in unified ISA 200 or 300 and proceeds to step 525. If, in step 510 graphics device driver 420 or 425 determines that the shader program is not expressed using a HLL, then graphics device driver 420 or 425 proceeds directly to step 525. In embodiments of the present invention that omit GPU unified microcode assembler 240 or 340, i.e., when HLL compiler 245 is configured to produce the shader microcode, steps 515, 520, and 525 are replaced by a single step of HLL compiler 245 compiling the shader program to produce the shader microcode when the shader program is expressed in an HLL.

In step 525 GPU unified microcode assembler 240 or 340 converts the shader program expressed in assembly shader instructions in unified ISA 200 or 300 into shader program microcode for execution by a shader processing unit. In step 530 graphics device driver 225 or 325 outputs the shader program microcode for execution by the shader processing unit. In other embodiments of the present invention, graphics device driver 225 or 325 may output an executable file for execution at a later time by the shader processing unit. Persons skilled in the art will appreciate that any system configured to perform the method steps of FIG. 5 or its equivalents, is within the scope of the present invention.

Unified ISA 200 and 300 provides fully capable signed and unsigned integer data types, along with a set of arithmetic, logical, and data type conversion instructions capable of operating on integers. A uniform set of structured branching constructs, e.g., if tests, loops, and subroutines that fully support runtime condition testing are also included in unified ISA 200 and 300. For example, a conventional if/then/else construct represented in c code is shown in TABLE 1A.

TABLE 1A

```
if (A>B)
    A = A + 1;
else
    B = B + 1;
```

When the condition A>B is true, the if clause, A=A+1, is executed. Otherwise, the else clause, B=B+1 is executed. In a conventional (assembly level) shader programming environment, a different set of instructions is used to implement the same if/then/else construct, depending on whether the construct is used in a fragment program or a vertex program, as shown in TABLES 1B and 1C. When unified ISA 200 or 300 is used, the same construct may be used for vertex, fragment, and geometry programs. Using a single construct that is independent of the processing domain is advantageous since a programmer or HLL compiler 245 or 345 can use the single construct for any type of shader program rather than using a different construct for each type of shader program.

The if/then/else construct for a vertex shader program, written without using unified ISA 200 or 300, is shown in TABLE 1B.

TABLE 1B

```
TEMP R0, A, B;              # declaration
ADDC R0.x, A.x, -B.x;       # add the first component of vectors
BRA else (LE.x)             # branch if the sum was <=0
ADD A.x, A.x, 1;
BRA endif;                  # jump to an "endif"
else:
    ADD B.x, B.x, 1;
endif:
```

R0, A, and B are each 4 component vectors where .x refers to a first component of the 4 component vector. The else clause is implemented using a branch instruction and a second branch instruction is used in the if clause to "jump over" the else clause.

The if/then/else construct for a shader program, written using unified ISA 200 or 300, is shown in TABLE 1C. The construct shown in TABLE 1C may be used for a conventional fragment program, but not for a conventional vertex shader program. Note that the branch instructions that are used in the conventional vertex shader program shown in TABLE 1B are not needed when unified ISA 200 or 300 is used to express the shader program.

TABLE 1C

```
TEMP R0, A, B;              # declaration
ADDC R0.x, A.x, -B.x;
IF GT.x;
ADD A.x, A.x, 1;
ELSE;
ADD B.x, B.x, 1;
ENDIF;
```

A conventional loop construct used for a 10 iteration loop that is represented in C code is shown in TABLE 2A.

TABLE 2A

```
for (i = 0; i < 10; i++) {
    sum = sum + c[i];
}
```

The sum operation is performed 10 times, once for each value of i as i is incremented from 0 to 10. In a conventional shader programming environment, a different set of instructions is used to implement the same loop construct, depending on whether the construct is used in a shader program or a vertex program, as shown in TABLES 2B and 2C. When unified ISA 200 or 300 is used, the same construct may be used for vertex, fragment, and geometry programs as shown in TABLE 2D.

The loop construct for a vertex shader program, written without using unified ISA 200 or 300, is shown in TABLE 2B.

TABLE 2B

```
ADDRESS A0;
TEMP sum, t;
PARAM c[10];
MOV t, {10, 0, -1, 1};
ARLC A0, t;
loop:
BRA end (LE.x);
ADD sum.x, sum.x, c[A0.y];
ARAC A0.xy, A0;         # special instruction to do loops
BRA loop                # do another iteration
end:
```

"A0" is a four-component integer "address register" with capability that is limited to performing indexed array lookups and sum and t are floating-point temporaries. c[ ] is an array of constants. The instruction MOV t.xy, {10, 0, −1, 1} specifies a special address register value t with 10 as a the number of loops left, 0 as the starting loop counter, −1 is added to the number of loops left for each step, and 1 is added to the loop counter for each step. The instruction ARLC A0, t loads the address register with t and updates a condition code based on the value of t. The branch instruction, BRA end (LE.x) causes the loop to jump to "end" when the number of loops left is less than or equal (LE) to 0. Otherwise, the sum is computed where c[A0.y] uses the loop counter A0.y to fetch the constant for that iteration. The ARAC instruction is used to perform loops by computing A0.x=A0.x+A0.z to decrement the number of loops left and A0.y=A0.y+A0.w to increment the loop counter. General purpose math is not allowed using the address register, so the ARAC instruction is used to perform the operations needed for looping. Finally, a second branch instruction, BRA loop is used to perform another iteration of the loop.

The loop construct for a fragment shader program, written without using unified ISA 200 or 300, is shown in TABLE 2C.

TABLE 2C

```
TEMP sum;
LOOP {10, 0, 1};
ADD sum.x, sum.x, fragment.texcoord[A0.x];
ENDLOOP;
```

Sum and t are floating-point temporaries. The instruction LOOP {10, 0, 1} specifies a loop instruction with 10 as the number of iterations, 0 as the starting loop counter, and 1 is added to the loop counter for each step. The loop instruction values must be constants because the conventional fragment program architecture does not permit loops with the iteration count determined at run time. The ADD instruction adds in a value passed in an array of texture coordinates from a vertex shader. A0.x is a special loop counter that is only available in the innermost LOOP construct. The conventional fragment program architecture doesn't allow indexing of constants.

The loop construct for a shader program, written using unified ISA 200 or 300, is shown in TABLE 2D. Note that branch instructions and specialized counters are not needed to perform a loop operation when unified ISA 200 or 300 is used to express the shader program.

TABLE 2D

```
INT TEMP t;
TEMP sum;
PARAM c[10];
MOV.S t.x, 0;
REP 10;
```

TABLE 2D-continued

```
   ADD sum.x, sum.x, c[t.x];
   ADD.S t.x, t.x, 1;
ENDREP;
``` t is an integer temporary and sum is a floating point value. The MOV.S instruction loads t with the integer 0. The REP (repeat) instruction causes the block of code between REP and ENDREP to be repeated 10 times. The first ADD instruction computes the sum, using the loop counter as an index. The second ADD instruction increments the loop counter, t.x. Note that the ADD instruction in the code shown in TABLE 2C uses the loop counter as an index. Therefore, no arithmetic operations can be performed on the loop counter using the conventional fragment program architecture.

A conventional loop until done construct that is represented in C code is shown in TABLE 3A. C is multiplied by itself until c is greater than or equal to 18.

TABLE 3A

```
float c = 1.7;
while (c < 18) {
   c = c * c;
}
```

The loop until done construct for a conventional vertex shader program, written without using unified ISA 200 or 300, is shown in TABLE 3B.

TABLE 3B

```
TEMP c;
MOV c.x, 1.7;
loop:
   ADDC c.y, c.x, -18;
   BRA endloop (GE.y);
   MUL c.x, c.x, c.x;
   BRA loop;
endloop:
```

The ADDC instruction is used to compute c.x−18 as the condition code that is tested using the GE.y test in the branch instruction. The branch instruction jumps to endloop when c.x is greater than or equal to 18.

The loop until done construct for a conventional fragment shader program, written without using unified ISA 200 or 300, is shown in TABLE 3C. There is no dynamic branching support for loop instructions in fragment shader program. Therefore the REP instruction must use a constant upper bound to perform a loop and a break instruction (BRK) to exit the loop. Note that this mechanism does not work when a constant upper bound on the number of loop iterations cannot be determined statically.

TABLE 3C

```
TEMP c;
MOV c.x, 1.7;
REP {100};
   ADDC c.y, c.x, -18;
   BRK GE.x;
   MUL c.x, c.x, c.x;
ENDREP
```

The loop until done construct for a shader program, written using unified ISA 200 or 300, is shown in TABLE 3D. Note that branch instructions and an upper bound for the REP instruction are not needed when unified ISA 200 or 300 is used to express the shader program.

TABLE 3D

```
TEMP c;
MOV c.x, 1.7;
REP;
  ADDC c.y, c.x, -18;
  BRK GE.x;
  MUL c.x, c.x, c.x;
ENDREP
```

The unified instruction set provided by unified ISA 200 and 300 provides shader instructions that may be used to express vertex, fragment, and geometry programs. Functions that use the unified instruction set may be included in shader, vertex, or geometry programs without modification. Existing shader programs may be compiled to produce shader microcode based on the unified instruction set. HLL compilers may be used to convert HLL shader programs into shader microcode using unified ISA 200 or 300. The shader microcode may then be executed by graphics processors designed to support unified ISA 200 and 300 and new hardware features exposed by the unified assembly instructions. A single instruction set enables easy access for new graphics hardware features and faster compile times for shader programs.

The Unified Shader Program Instruction Set Architecture

Unified ISA 200 or 300 includes some new procedures and functions that may be used for vertex, fragment, and geometry shader programs. TABLE 4 lists the new procedures and functions where PLP stands for ProgramLocalParameters, PEP stands for ProgramEnvParameter, and GPLP stands for GetProgramLocalParameter.

TABLE 4

```
void PLPI4iNV(enum target, uint index, int x, int y, int z, int w);
void PLPI4ivNV(enum target, uint index, const int *params);
void PLPI4ivNV(enum target, uint index, sizei count, const int *params);
void PLPI4uiNV(enum target, uint index, uint x, uint y, uint z, uint w);
void PLPI4uivNV(enum target, uint index, const uint *params);
void PLPI4uivNV(enum target, uint index, sizei count, const uint *params);
void PEPI4iNV(enum target, uint index, int x, int y, int z, int w);
void PEPI4ivNV(enum target, uint index, const int *params);
void PEPI4ivNV(enum target, uint index, sizei count, const int *params);
void PEPI4uiNV(enum target, uint index, uint x, uint y, uint z, uint w);
void PEPI4uivNV(enum target, uint index, const uint *params);
void PEPI4uivNV(enum target, uint index, sizei count, const uint *params);
void GPLPIivNV(enum target, uint index, int *params);
void GPLPIuivNV(enum target, uint index, uint *params);
void GPLPIivNV(enum target, uint index, int *params);
void GPLPIuivNV(enum target, uint index, uint *params);
```

Unified ISA 200 or 300 includes some new tokens that may be used for vertex, fragment, and geometry shader programs. TABLE 5A lists the new tokens that are accepted by the <pname> parameter of GetBooleanv, GetIntegerv, GetFloatv, and GetDoublev.

TABLE 5A

| MIN_PROGRAM_TEXEL_OFFSET_NV | 0x8904 |
|---|---|
| MAX_PROGRAM_TEXEL_OFFSET_NV | 0x8905 |

TABLE 5B lists the new tokens that are accepted by the <pname> parameter of GetProgramivARB.

TABLE 5B

| PROGRAM_ATTRIB_COMPONENTS_NV | 0x8906 |
|---|---|
| PROGRAM_RESULT_COMPONENTS_NV | 0x8907 |
| MAX_PROGRAM_ATTRIB_COMPONENTS_NV | 0x8908 |
| MAX_PROGRAM_RESULT_COMPONENTS_NV | 0x8909 |
| MAX_PROGRAM_GENERIC_ATTRIBS_NV | 0x8DA5 |
| MAX_PROGRAM_GENERIC_RESULTS_NV | 0x8DA6 |

Each program object has an associated array of program local parameters. Program local parameters are four-component vectors whose components can hold floating-point, signed integer, or unsigned integer values. The data type of each local parameter is established when the parameter's values are assigned. If a program attempts to read a local parameter using a data type other than the one used when the parameter is set, the values returned are undefined. TABLE 6A lists commands included in unified ISA 200 or 300 that update the values of the program local parameter numbered <index> belonging to the program object currently bound to <target>. For the non-vector versions of these commands, the four components of the parameter are updated with the values of <x>, <y>, <z>, and <w>, respectively. For the vector versions, the components of the parameter are updated with the array of four values pointed to by <params>. The error INVALID_VALUE is generated if <index> is greater than or equal to the number of program local parameters supported by <target>.

TABLE 6A

```
void PLP4fARB(enum target, uint index, float x, float y, float z, float w);
void PLP4fvARB(enum target, uint index, const float *params);
void PLP4dARB(enum target, uint index, double x, double y, double z, double w);
void PLP4dvARB(enum target, uint index, const double *params);
void PLPI4iNV(enum target, uint index, int x, int y, int z, int w);
void PLPI4ivNV(enum target, uint index, const int *params);
void PLPI4uiNV(enum target, uint index, uint x, uint y, uint z, uint w);
void PLPI4uivNV(enum target, uint index, const uint *params);
```

TABLE 6B lists commands included in unified ISA 200 or 300 that update the values of the program local parameters numbered <index> through <index>+<count>-1 with the array of 4*<count> values pointed to by <params>. The error INVALID_VALUE is generated if the sum of <index> and <count> is greater than the number of program local parameters supported by <target>.

TABLE 6B

```
void PLP4fvNV(enum target, uint index, sizei count, const float *params);
void PLPI4ivNV(enum target, uint index, sizei count, const int *params);
void PLPI4uivNV(enum target, uint index, sizei count, const uint *params);
```

When a program local parameter is updated, the data type of its components is assigned according to the data type of the provided values. If values provided are of type "float" or "double", the components of the parameter are floating-point. If the values provided are of type "int", the components of the parameter are signed integers. If the values provided are of type "uint", the components of the parameter are unsigned integers.

Additionally, each program target has an associated array of program environment parameters. Unlike program local parameters, program environment parameters are shared by all program objects of a given target. Program environment parameters are four-component vectors whose components can hold floating-point, signed integer, or unsigned integer values. The data type of each environment parameter is established when the parameter's values are assigned. If a program attempts to read an environment parameter using a data type other than the one used when the parameter is set, the values returned are undefined. TABLE 6C lists commands included in unified ISA 200 or 300 that update the values of the program environment parameter numbered <index> for the given program target <target>. For the non-vector versions of these commands, the four components of the parameter are updated with the values of <x>, <y>, <z>, and <w>, respectively. For the vector versions, the four components of the parameter are updated with the array of four values pointed to by <params>. The error INVALID_VALUE is generated if <index> is greater than or equal to the number of program environment parameters supported by <target>.

TABLE 6C

| | |
|---|---|
| void | PEP4fARB(enum target, uint index, float x, float y, float z, float w); |
| void | PEP4fvARB(enum target, uint index, const float *params); |
| void | PEP4dARB(enum target, uint index, double x, double y, double z, double w); |
| void | PEP4dvARB(enum target, uint index, const double *params); |
| void | ProgramEnvParameterI4iNV(enum target, uint index, int x, int y, int z, int w); |
| void | ProgramEnvParameterI4ivNV(enum target, uint index, const int *params); |
| void | PEPI4uiNV(enum target, uint index, uint x, uint y, uint z, uint w); |
| void | PEPI4uivNV(enum target, uint index, const uint *params); |

TABLE 6D lists commands included in unified ISA 200 or 300 that update the values of the program environment parameters numbered <index> through <index>+<count>−1 with the array of 4*<count> values pointed to by <params>. The error INVALID_VALUE is generated if the sum of <index> and <count> is greater than the number of program local parameters supported by <target>.

TABLE 6D

| |
|---|
| void PEP4fvNV(enum target, uint index, sizei count, const float *params); |
| void PEPI4ivNV(enum target, uint index, sizei count, const int *params); |
| void PEPI4uivNV(enum target, uint index, sizei count, const uint *params); |

When a program environment parameter is updated, the data type of its components is assigned according to the data type of the provided values. If values provided are of type "float" or "double", the components of the parameter are floating-point. If the values provided are of type "int", the components of the parameter are signed integers. If the values provided are of type "uint", the components of the parameter are unsigned integers.

GPU program strings are specified as an array of ASCII characters containing the program text. When a GPU program is loaded by a call to ProgramStringARB, the program string is parsed into a set of tokens possibly separated by whitespace. Spaces, tabs, newlines, carriage returns, and comments are considered whitespace. Comments begin with the character "#" and are terminated by a newline, a carriage return, or the end of the program array.

The Backus-Naur Form (BNF) grammar shown in TABLE 7 specifies the syntactically valid sequences for GPU programs. The set of valid tokens can be inferred from the grammar. A line containing "/* empty */" represents an empty string and is used to indicate optional rules. A program is invalid if it contains any tokens or characters not defined in this specification.

TABLE 7

| | |
|---|---|
| <program> | ::= <optionSequence> <declSequence> <statementSequence> "END" |
| <optionSequence> | ::= <option> <optionSequence> <br> \| /* empty */ |
| <option> | ::= "OPTION" <identifier> ";" |
| <declSequence> | ::= /* empty */ |
| <statementSequence> | ::= <statement> <statementSequence> <br> \| /* empty */ |
| <statement> | ::= <instruction> ";" <br> \| <namingStatement> ";" <br> \| <instLabel> ":" |
| <instruction> | ::= <ALUInstruction> <br> \| <TexInstruction> <br> \| <FlowInstruction> |
| <ALUInstruction> | ::= <VECTORop_instruction> <br> \| <SCALARop_instruction> <br> \| <BINSCop_instruction> <br> \| <BINop_instruction> <br> \| <VECSCAop_instruction> <br> \| <TRIop_instruction> <br> \| <SWZop_instruction> |
| <TexInstruction> | ::= <TEXop_instruction> <br> \| <TXDop_instruction> |
| <FlowInstruction> | ::= <BRAop_instruction> <br> \| <FLOWCCop_instruction> <br> \| <IFop_instruction> <br> \| <REPop_instruction> <br> \| <ENDFLOWop_instruction> |
| <VECTORop_instruction> | ::= <VECTORop> <opModifiers> <instResult> "," |

```
                           <instOperandV>
<VECTORop>          ::= "ABS"
                    | "CEIL"
                    | "FLR"
                    | "FRC"
                    | "I2F"
                    | "LIT"
                    | "MOV"
                    | "NOT"
                    | "NRM"
                    | "PK2H"
                    | "PK2US"
                    | "PK4B"
                    | "PK4UB"
                    | "ROUND"
                    | "SSG"
                    | "TRUNC"
<SCALARop_instruction> ::= <SCALARop> <opModifiers> <instResult> ","
                           <instOperandS>
<SCALARop>          ::= "COS"
                    | "EX2"
                    | "LG2"
                    | "RCC"
                    | "RCP"
                    | "RSQ"
                    | "SCS"
                    | "SIN"
                    | "UP2H"
                    | "UP2US"
                    | "UP4B"
                    | "UP4UB"
<BINSCop_instruction> ::= <BINSCop> <opModifiers> <instResult> ","
                          <instOperandS> "," <instOperandS>
```

```
<BINSCop>             ::= "POW"
<VECSCAop_instruction>  ::= <VECSCAop> <opModifiers> <instResult> ","
                            <instOperandV> "," <instOperandS>
<VECSCAop>            ::= "DIV"
                        | "SHL"
                        | "SHR"
<BINop_instruction>   ::= <BINop> <opModifiers> <instResult> ","
                            <instOperandV> "," <instOperandV>
<BINop>               ::= "ADD"
                        | "AND"
                        | "DP3"
                        | "DP4"
                        | "DPH"
                        | "DST"
                        | "MAX"
                        | "MIN"
                        | "MUL"
                        | "OR"
                        | "RFL"
                        | "SEQ"
                        | "SFL"
                        | "SGE"
                        | "SGT"
                        | "SLE"
                        | "SLT"
                        | "SNE"
                        | "STR"
                        | "SUB"
                        | "XPD"
                        | "DP2"
                        | "MOD"
                        | "XOR"
<TRIop_instruction>   ::= <TRIop> <opModifiers> <instResult> ","
```

```
                              <instOperandV> "," <instOperandV> ","
                              <instOperandV>
<TRIop>                  ::= "CMP"
                          | "DP2A"
                          | "LRP"
                          | "MAD"
                          | "SAD"
                          | "X2D"
<SWZop_instruction>      ::= <SWZop> <opModifiers> <instResult> ","
                              <instOperandVNS> "," <extendedSwizzle>
<SWZop>                  ::= "SWZ"
<TEXop_instruction>      ::= <TEXop> <opModifiers> <instResult> ","
                              <instOperandV> "," <texAccess>
<TEXop>                  ::= "TEX"
                          | "TXB"
                          | "TXF"
                          | "TXL"
                          | "TXP"
                          | "TXQ"
<TXDop_instruction>      ::= <TXDop> <opModifiers> <instResult> ","
                              <instOperandV> "," <instOperandV> ","
                              <instOperandV> "," <texAccess>
<TXDop>                  ::= "TXD"
<BRAop_instruction>      ::= <BRAop> <opModifiers> <instTarget>
                              <optBranchCond>
<BRAop>                  ::= "CAL"
<FLOWCCop_instruction>   ::= <FLOWCCop> <opModifiers> <optBranchCond>
<FLOWCCop>               ::= "RET"
                          | "BRK"
                          | "CONT"
<IFop_instruction>       ::= <IFop> <opModifiers> <ccTest>

<IFop>                   ::= "IF"
```

```
<REPop_instruction>      ::= <REPop> <opModifiers> <instOperandV>
                           | <REPop> <opModifiers>
<REPop>                  ::= "REP"
<ENDFLOWop_instruction>  ::= <ENDFLOWop> <opModifiers>
<ENDFLOWop>              ::= "ELSE"
                           | "ENDIF"
                           | "ENDREP"
<opModifiers>            ::= <opModifierItem> <opModifiers>
                           | /* empty */
<opModifierItem>         ::= "." <opModifier>
<opModifier>             ::= "F"
                           | "U"
                           | "S"
                           | "CC"
                           | "CC0"
                           | "CC1"
                           | "SAT"
                           | "SSAT"
                           | "NTC"
                           | "S24"
                           | "U24"
                           | "HI"
<texAccess>              ::= <texImageUnit> "," <texTarget>
                           | <texImageUnit> "," <texTarget> "," <texOffset>
<texImageUnit>           ::= "texture" <optArrayMemAbs>
<texTarget>              ::= "1D"
                           | "2D"
                           | "3D"
                           | "CUBE"
                           | "RECT"
                           | "SHADOW1D"
                           | "SHADOW2D"
                           | "SHADOWRECT"
```

```
                        | "ARRAY1D"
                        | "ARRAY2D"
                        | "SHADOWCUBE"
                        | "SHADOWARRAY1D"
                        | "SHADOWARRAY2D"
<texOffset>             ::= "(" <texOffsetComp> ")"
                        | "(" <texOffsetComp> "," <texOffsetComp> ")"
                        | "(" <texOffsetComp> "," <texOffsetComp> ","
                            <texOffsetComp> ")"
<texOffsetComp>         ::= <optSign> <int>
<optBranchCond>         ::= /* empty */
                        | <ccMask>
<instOperandV>          ::= <instOperandAbsV>
                        | <instOperandBaseV>
<instOperandAbsV>       ::= <operandAbsNeg> "|" <instOperandBaseV> "|"
<instOperandBaseV>      ::= <operandNeg> <attribUseV>
                        | <operandNeg> <tempUseV>
                        | <operandNeg> <paramUseV>
                        | <operandNeg> <bufferUseV>
<instOperandS>          ::= <instOperandAbsS>
                        | <instOperandBaseS>
<instOperandAbsS>       ::= <operandAbsNeg> "|" <instOperandBaseS> "|"
<instOperandBaseS>      ::= <operandNeg> <attribUseS>
                        | <operandNeg> <tempUseS>
                        | <operandNeg> <paramUseS>
                        | <operandNeg> <bufferUseS>
<instOperandVNS>        ::= <attribUseVNS>
                        | <tempUseVNS>
                        | <paramUseVNS>
                        | <bufferUseVNS>
<operandAbsNeg>         ::= <optSign>
<operandNeg>            ::= <optSign>
<instResult>            ::= <instResultCC>
```

```
                              | <instResultBase>
<instResultCC>       ::= <instResultBase> <ccMask>
<instResultBase>     ::= <tempUseW>
                       | <resultUseW>
<namingStatement>    ::= <varMods> <ATTRIB_statement>
                       | <varMods> <PARAM_statement>
                       | <varMods> <TEMP_statement>
                       | <varMods> <OUTPUT_statement>
                       | <varMods> <BUFFER_statement>
                       | <ALIAS_statement>
<ATTRIB_statement>   ::= "ATTRIB" <establishName> "=" <attribUseD>
<PARAM_statement>    ::= <PARAM_singleStmt>
                       | <PARAM_multipleStmt>
<PARAM_singleStmt>   ::= "PARAM" <establishName> <paramSingleInit>
<PARAM_multipleStmt> ::= "PARAM" <establishName> <optArraySize>
                            <paramMultipleInit>
<paramSingleInit>    ::= "=" <paramUseDB>
<paramMultipleInit>  ::= "=" "{" <paramMultInitList> "}"
<paramMultInitList>  ::= <paramUseDM>
                       | <paramUseDM> "," <paramMultInitList>
<TEMP_statement>     ::= "TEMP" <varNameList>
<OUTPUT_statement>   ::= "OUTPUT" <establishName> "=" <resultUseD>
<varMods>            ::= <varModifier> <varMods>
                       | /* empty */
<varModifier>        ::= "SHORT"
                       | "LONG"
                       | "INT"
                       | "UINT"
                       | "FLOAT"
<ALIAS_statement>    ::= "ALIAS" <establishName> "=" <establishedName>
<BUFFER_statement>   ::= "BUFFER" <establishName> "="
                            <bufferSingleInit>
                       | "BUFFER" <establishName> <optArraySize> "="
```

| | |
|---|---|
| | <bufferMultInit> |
| <bufferSingleInit> | ::= "=" <bufferUseDB> |
| <bufferMultInit> | ::= "=" "{" <bufferMultInitList> "}" |
| <bufferMultInitList> | ::= <bufferUseDM> |
| | \| <bufferUseDM> "," <bufferMultInitList> |
| <varNameList> | ::= <establishName> |
| | \| <establishName> "," <varNameList> |
| <attribUseV> | ::= <attribBasic> <swizzleSuffix> |
| | \| <attribVarName> <swizzleSuffix> |
| | \| <attribVarName> <arrayMem> <swizzleSuffix> |
| | \| <attribColor> <swizzleSuffix> |
| | \| <attribColor> "." <colorType> <swizzleSuffix> |
| <attribUseS> | ::= <attribBasic> <scalarSuffix> |
| | \| <attribVarName> <scalarSuffix> |
| | \| <attribVarName> <arrayMem> <scalarSuffix> |
| | \| <attribColor> <scalarSuffix> |
| | \| <attribColor> "." <colorType> <scalarSuffix> |
| <attribUseVNS> | ::= <attribBasic> |
| | \| <attribVarName> |
| | \| <attribVarName> <arrayMem> |
| | \| <attribColor> |
| | \| <attribColor> "." <colorType> |
| <attribUseD> | ::= <attribBasic> |
| | \| <attribColor> |
| | \| <attribColor> "." <colorType> |
| | \| <attribMulti> |
| <paramUseV> | ::= <paramVarName> <optArrayMem> <swizzleSuffix> |
| | \| <stateSingleItem> <swizzleSuffix> |
| | \| <programSingleItem> <swizzleSuffix> |
| | \| <constantVector> <swizzleSuffix> |
| | \| <constantScalar> |
| <paramUseS> | ::= <paramVarName> <optArrayMem> <scalarSuffix> |
| | \| <stateSingleItem> <scalarSuffix> |

```
                        | <programSingleItem> <scalarSuffix>
                        | <constantVector> <scalarSuffix>
                        | <constantScalar>
<paramUseVNS>       ::= <paramVarName> <optArrayMem>
                        | <stateSingleItem>
                        | <programSingleItem>
                        | <constantVector>
                        | <constantScalar>
<paramUseDB>        ::= <stateSingleItem>
                        | <programSingleItem>
                        | <constantVector>
                        | <signedConstantScalar>
<paramUseDM>        ::= <stateMultipleItem>
                        | <programMultipleItem>
                        | <constantVector>
                        | <signedConstantScalar>
<stateMultipleItem> ::= <stateSingleItem>
                        | "state" "." <stateMatrixRows>
<stateSingleItem>   ::= "state" "." <stateMaterialItem>
                        | "state" "." <stateLightItem>
                        | "state" "." <stateLightModelItem>
                        | "state" "." <stateLightProdItem>
                        | "state" "." <stateFogItem>
                        | "state" "." <stateMatrixRow>
                        | "state" "." <stateTexGenItem>
                        | "state" "." <stateClipPlaneItem>
                        | "state" "." <statePointItem>
                        | "state" "." <stateTexEnvItem>
                        | "state" "." <stateDepthItem>
<stateMaterialItem> ::= "material" "." <stateMatProperty>
                        | "material" "." <faceType> "."
                           <stateMatProperty>
<stateMatProperty>  ::= "ambient"
```

```
                          | "diffuse"
                          | "specular"
                          | "emission"
                          | "shininess"
<stateLightItem>          ::= "light" <arrayMemAbs> "." <stateLightProperty>
<stateLightProperty>      ::= "ambient"
                          | "diffuse"
                          | "specular"
                          | "position"
                          | "attenuation"
                          | "spot" "." <stateSpotProperty>
                          | "half"
<stateSpotProperty>       ::= "direction"
<stateLightModelItem>     ::= "lightmodel" "." <stateLModProperty>
<stateLModProperty>       ::= "ambient"
                          | "scenecolor"
                          | <faceType> "." "scenecolor"
<stateLightProdItem>      ::= "lightprod" <arrayMemAbs> "."
                                  <stateLProdProperty>
                          | "lightprod" <arrayMemAbs> "." <faceType> "."
                                  <stateLProdProperty>
<stateLProdProperty>      ::= "ambient"
                          | "diffuse"
                          | "specular"
<stateFogItem>            ::= "fog" "." <stateFogProperty>
<stateFogProperty>        ::= "color"
                          | "params"
<stateMatrixRows>         ::= <stateMatrixItem>
                          | <stateMatrixItem> "." <stateMatModifier>
                          | <stateMatrixItem> "." "row" <arrayRange>
                          | <stateMatrixItem> "." <stateMatModifier> "."
                              "row" <arrayRange>
<stateMatrixRow>          ::= <stateMatrixItem> "." "row" <arrayMemAbs>
```

```
                                  | <stateMatrixItem> "." <stateMatModifier> "."
                                    "row" <arrayMemAbs>
<stateMatrixItem>       ::= "matrix" "." <stateMatrixName>
<stateMatModifier>      ::= "inverse"
                          | "transpose"
                          | "invtrans"
<stateMatrixName>       ::= "modelview" <optArrayMemAbs>
                          | "projection"
                          | "mvp"
                          | "texture" <optArrayMemAbs>
                          | "program" <arrayMemAbs>
<stateTexGenItem>       ::= "texgen" <optArrayMemAbs> "."
                              <stateTexGenType> "." <stateTexGenCoord>
<stateTexGenType>       ::= "eye"
                          | "object"
<stateTexGenCoord>      ::= "s"
                          | "t"
                          | "r"
                          | "q"
<stateClipPlaneItem>    ::= "clip" <arrayMemAbs> "." "plane"
<statePointItem>        ::= "point" "." <statePointProperty>
<statePointProperty>    ::= "size"
                          | "attenuation"
<stateTexEnvItem>       ::= "texenv" <optArrayMemAbs> "."
                              <stateTexEnvProperty>
<stateTexEnvProperty>   ::= "color"
<stateDepthItem>        ::= "depth" "." <stateDepthProperty>
<stateDepthProperty>    ::= "range"
<programSingleItem>     ::= <progEnvParam>
                          | <progLocalParam>
<programMultipleItem>   ::= <progEnvParams>
                          | <progLocalParams>
<progEnvParams>         ::= "program" "." "env" <arrayMemAbs>
```

```
                              | "program" "." "env" <arrayRange>
<progEnvParam>       ::= "program" "." "env" <arrayMemAbs>
<progLocalParams>    ::= "program" "." "local" <arrayMemAbs>
                              | "program" "." "local" <arrayRange>
<progLocalParam>     ::= "program" "." "local" <arrayMemAbs>
<constantVector>     ::= "{" <constantVectorList> "}"
<constantVectorList> ::= <signedConstantScalar>
                              | <signedConstantScalar> ","
                                <signedConstantScalar>
                              | <signedConstantScalar> ","
                                <signedConstantScalar> ","
                                <signedConstantScalar>
                              | <signedConstantScalar> ","
                                <signedConstantScalar> ","
                                <signedConstantScalar> ","
                                <signedConstantScalar>
<signedConstantScalar>::= <optSign> <constantScalar>
<constantScalar>     ::= <floatConstant>
                              | <intConstant>
<floatConstant>      ::= <float>
<intConstant>        ::= <int>
<tempUseV>           ::= <tempVarName> <swizzleSuffix>
<tempUseS>           ::= <tempVarName> <scalarSuffix>
<tempUseVNS>         ::= <tempVarName>
<tempUseW>           ::= <tempVarName> <optWriteMask>
<resultUseW>         ::= <resultBasic> <optWriteMask>
                              | <resultVarName> <optWriteMask>
<resultUseD>         ::= <resultBasic>
<bufferUseV>         ::= <bufferVarName> <optArrayMem> <swizzleSuffix>
<bufferUseS>         ::= <bufferVarName> <optArrayMem> <scalarSuffix>
<bufferUseVNS>       ::= <bufferVarName> <optArrayMem>
<bufferUseDB>        ::= <bufferBinding> <arrayMemAbs>
<bufferUseDM>        ::= <bufferBinding> <arrayMemAbs>
```

| | | |
|---|---|---|
| | | \| <bufferBinding> <arrayRange> |
| | | \| <bufferBinding> |
| <bufferBinding> | ::= | "program" "." "buffer" <arrayMemAbs> |
| <optArraySize> | ::= | "[" "]" |
| | | \| "[" <int> "]" |
| <optArrayMem> | ::= | /* empty */ |
| | | \| <arrayMem> |
| <arrayMem> | ::= | <arrayMemAbs> |
| | | \| <arrayMemRel> |
| <optArrayMemAbs> | ::= | /* empty */ |
| | | \| <arrayMemAbs> |
| <arrayMemAbs> | ::= | "[" <int> "]" |
| <arrayMemRel> | ::= | "[" <arrayMemReg> <arrayMemOffset> "]" |
| <arrayMemReg> | ::= | <addrUseS> |
| <arrayMemOffset> | ::= | /* empty */ |
| | | \| "+" <int> |
| | | \| "-" <int> |
| <arrayRange> | ::= | "[" <int> ".." <int> "]" |
| <addrUseS> | ::= | <addrVarName> <scalarSuffix> |
| <ccMask> | ::= | "(" <ccTest> ")" |
| <ccTest> | ::= | <ccMaskRule> <swizzleSuffix> |
| <ccMaskRule> | ::= | "EQ" |
| | | \| "GE" |
| | | \| "GT" |
| | | \| "LE" |
| | | \| "LT" |
| | | \| "NE" |
| | | \| "TR" |
| | | \| "FL" |
| | | \| "EQ0" |
| | | \| "GE0" |
| | | \| "GT0" |
| | | \| "LE0" |

| "LT0"
| "NE0"
| "TR0"
| "FL0"
| "EQ1"
| "GE1"
| "GT1"
| "LE1"
| "LT1"
| "NE1"
| "TR1"
| "FL1"
| "NAN"
| "NAN0"
| "NAN1"
| "LEG"
| "LEG0"
| "LEG1"
| "CF"
| "CF0"
| "CF1"
| "NCF"
| "NCF0"
| "NCF1"
| "OF"
| "OF0"
| "OF1"
| "NOF"
| "NOF0"
| "NOF1"
| "AB"
| "AB0"
| "AB1"

```
                          | "BLE"
                          | "BLE0"
                          | "BLE1"
                          | "SF"
                          | "SF0"
                          | "SF1"
                          | "NSF"
                          | "NSF0"
                          | "NSF1"
<optWriteMask>      ::= /* empty */
                          | <xyzwMask>
                          | <rgbaMask>
<xyzwMask>          ::= "." "x"
                          | "." "y"
                          | "." "xy"
                          | "." "z"
                          | "." "xz"
                          | "." "yz"
                          | "." "xyz"
                          | "." "w"
                          | "." "xw"
                          | "." "yw"
                          | "." "xyw"
                          | "." "zw"
                          | "." "xzw"
                          | "." "yzw"
                          | "." "xyzw"
<rgbaMask>          ::= "." "r"
                          | "." "g"
                          | "." "rg"
                          | "." "b"
                          | "." "rb"
                          | "." "gb"
```

```
                         | "." "rgb"
                         | "." "a"
                         | "." "ra"
                         | "." "ga"
                         | "." "rga"
                         | "." "ba"
                         | "." "rba"
                         | "." "gba"
                         | "." "rgba"
<swizzleSuffix>      ::= /* empty */
                         | "." <component>
                         | "." <xyzwSwizzle>
                         | "." <rgbaSwizzle>
<extendedSwizzle>    ::= <extSwizComp> "," <extSwizComp> ","
                             <extSwizComp> "," <extSwizComp>
<extSwizComp>        ::= <optSign> <xyzwExtSwizSel>
                         | <optSign> <rgbaExtSwizSel>
<xyzwExtSwizSel>     ::= "0"
                         | "1"
                         | <xyzwComponent>
<rgbaExtSwizSel>     ::= <rgbaComponent>
<scalarSuffix>       ::= "." <component>
<component>          ::= <xyzwComponent>
                         | <rgbaComponent>
<xyzwComponent>      ::= "x"
                         | "y"
                         | "z"
                         | "w"
<rgbaComponent>      ::= "r"
                         | "g"
                         | "b"
                         | "a"
<optSign>            ::= /* empty */
```

```
                         | "-"
                         | "+"
<faceType>          ::= "front"
                         | "back"
<colorType>         ::= "primary"
                         | "secondary"
<instLabel>         ::= <identifier>
<instTarget>        ::= <identifier>
<establishedName>   ::= <identifier>
<establishName>     ::= <identifier>
```

Programs may operate on a number of different variables during their execution. The following sections define the different classes of variables that can be declared and used by a program.

Some variable classes require variable bindings. Variable classes with bindings refer to state that is either generated or consumed outside the program. Examples of variable bindings include a vertex's normal, the position of a vertex computed by a vertex program, an interpolated texture coordinate, and the diffuse color of light 1. Variables that are used only during program execution do not have bindings.

Variables may be declared explicitly according to the <namingStatement> grammar rule. Explicit variable declarations allow a program to establish a variable name that can be used to refer to a specified resource in subsequent instructions. Variables may be declared anywhere in the program string, but must be declared prior to use. A program will fail to load if it declares the same variable name more than once, or if it refers to a variable name that has not been previously declared in the program string. Variables may also be declared implicitly, simply by using a variable binding as an operand in a program instruction. Such uses are considered to automatically create a nameless variable using the specified binding. Only variable from classes with bindings can be declared implicitly.

Explicit variable declarations may include one or more modifiers that specify additional information about the variable, such as the size and data type of the components of the variable. Variable modifiers are specified according to the <varModifier> grammar rule. By default, variables are considered typeless. They can be used in instructions that read or write the variable as floating-point values, signed integers, or unsigned integers. If a variable is written using one data type but then read using a different one, the results of the operation are undefined. Variables with bindings are considered to be read or written when their values are produced or consumed; the data type used by unified ISA 200 or 300 is specified in the description of each binding.

Explicitly declared variables may optionally have one data type modifier, which can be used to detect data type mismatch errors. Type modifiers of "INT", "UINT", and "FLOAT" indicate that the components of the variable are stored as signed integers, unsigned integers, or floating-point values, respectively. A program will fail to load if it attempts to read or write a variable using a data type other than the one indicated by the data type modifier. Variables without a data type modifier can be read or written using any data type. GPU unified microcode assemblers 240, 242, 340, and 342 may be configured to perform error checking based on the specified data type modifiers.

Explicitly declared variables may optionally have one storage size modifier. Variables declared as "SHORT" will be represented using at least 16 bits per component. "SHORT" floating-point values will have at least 5 bits of exponent and 10 bits of mantissa. Variables declared as "LONG" will be represented with at least 32 bits per component. "LONG" floating-point values will have at least 8 bits of exponent and 23 bits of mantissa. If no size modifier is provided, GPU unified microcode assembler 240 and 340 will automatically select component sizes. Implementations are not required to support more than one component size, so "SHORT", "LONG", and the default could all refer to the same component size. Each variable declaration can include at most one data type and one storage size modifier. A program will fail to load if it specifies multiple data type or multiple storage size modifiers in a single variable declaration.

Explicitly declared variables of all types may be declared as arrays. An array variable has one or more members, numbered 0 through <n>−1, where <n> is the number of entries in the array. The total number of entries in the array can be declared using the <optArraySize> grammar rule. For variable classes without bindings, an array size must be specified in the program, and must be a positive integer. For variable classes with bindings, a declared size is optional, and is taken from the number of bindings assigned in the declaration if omitted. A program will fail to load if the declared size of an array variable does not match the number of assigned bindings.

When a variable is declared as an array, instructions that use the variable must specify an array member to access according to the <arrayMem> grammar rule. A program will fail to load if it contains an instruction that accesses an array variable without specifying an array member or an instruction that specifies an array member for a non-array variable.

Program attribute variables represent per-vertex or per-fragment inputs to the program. All attribute variables have associated bindings, and are read-only during program execution. Attribute variables may be declared explicitly via the <ATTRIB_statement> grammar rule, or implicitly by using an attribute binding in an instruction. The set of available attribute bindings depends on the program type, and is enumerated in the specifications for each program type. A special modifier for fragment programs may be used to control the interpolation state. The special modifier specifies the type of interpolation to be used for the attribute, e.g., flat, centroid, or centroid without perspective correction.

The set of bindings allowed for attribute array variables is limited to attribute state grouped in arrays (e.g., texture coordinates, generic vertex attributes). Unified ISA 200 and 300 provides a generic array that can be used to pass variables between adjacent program stages, i.e., from a vertex shader to a geometry shader. Conventional instruction architectures use variables with specific meanings, e.g., color, position, or texture coordinates, to pass data between different program stages. Additionally, all bindings assigned to the array must be of the same binding type and must increase consecutively. Examples of valid and invalid binding lists are shown in TABLE 8.

TABLE 8

| | |
|---|---|
| vertex.attrib[1], vertex.attrib[2] | #valid, 2-entry array |
| vertex.texcoord[0..3] | #valid, 4-entry array |
| vertex.attrib[1], vertex.attrib[3] | #invalid, skipped attrib 2 |
| vertex.attrib[2], vertex.attrib[1] | #invalid, wrong order |
| vertex.attrib[1], vertex.texcoord[2] | #invalid, different types |

Additionally, attribute bindings may be used in no more than one array variable accessed with relative addressing.

Implementations may have a limit on the total number of attribute binding components used by each program target (MAX_PROGRAM_ATTRIB_COMPONENTS). Programs that use more attribute binding components than this limit will fail to load. The method of counting used attribute binding components is implementation-dependent, but must satisfy the following properties (1) if an attribute binding is not referenced in a program, or is referenced only in declarations of attribute variables that are not used, none of its components are counted (2) an attribute binding component may be counted as used only if there exists an instruction operand where the component is enabled for read by the swizzle pattern and the attribute binding is referenced directly by the operand, bound to a declared variable referenced by the operand, or bound to a declared array variable where another binding in the array satisfies one of the two previous conditions.

Implementations are not required to optimize out unused elements of an attribute array or components that are used in only some elements of an array. The last of these rules is intended to cover the case where the same attribute binding is used in multiple variables. For example, an operand whose swizzle pattern selects only the x component may result in the x component of an attribute binding being counted, but may never result in the counting of the y, z, or w components of any attribute binding. Implementations are not required to determine that components read by an instruction are actually unused due to (1) write masks (for example, a componentwise ADD operation that only writes the "x" component doesn't have to read the "y", "z", and "w" components of its operands) or (2) any other properties of the instruction (for example, the DP3 instruction computes a 3-component dot product doesn't have to read the "w" component of its operands).

Program parameter variables are used as constants during program execution. All program parameter variables have associated bindings and are read-only during program execution. Program parameters retain their values across program invocations, although their values may change between invocations due to GL state changes. Program parameter variables may be declared explicitly via the <PARAM_statement> grammar rule, or implicitly by using a parameter binding in an instruction. Except where otherwise specified, program parameter bindings always specify floating-point values.

When declaring program parameter array variables, all bindings are supported and can be assigned to array members in any order. The only restriction is that no parameter binding may be used more than once in array variables accessed using relative addressing. A program will fail to load if any program parameter binding is used more than once in a single array accessed using relative addressing or used at least once in two or more arrays accessed using relative addressing.

If a program parameter binding matches the <constantScalar> or <signedConstantScalar> grammar rules, the corresponding program parameter variable is bound to the vector (X,X,X,X), where X is the value of the specified constant. If a program parameter binding matches <constantVector>, the corresponding program parameter variable is bound to the vector (X,Y,Z,W), where X, Y, Z, and W are the values corresponding to the first, second, third, and fourth match of <signedConstantScalar>. If fewer than four constants are specified, Y, Z, and W assume the values 0, 0, and 1, if their respective constants are not specified.

Constant bindings can be interpreted as having signed integer, unsigned integer, or floating-point values, depending on how they are used in the program text. For constants in variable declarations, the components of the constant are interpreted according to the variable's component data type modifier. If no data type modifier is specified in a declaration, constants are interpreted as floating-point values. For constant bindings used directly in an instruction, the components of the constant are interpreted according to the required data type of the operand. A program will fail to load if it specifies a floating-point constant value (matching the <floatConstant> grammar rule) that should be interpreted as a signed or unsigned integer, or a negative integer constant value that should be interpreted as an unsigned integer.

If the value used to specify a floating-point constant can not be exactly represented, the nearest floating-point value will be used. If the value used to specify an integer constant is too large to be represented, the program will fail to load. TABLE 9A lists program environmental/local parameter bindings where <a> and <b> indicate parameter numbers, where <a> must be less than or equal to <b>.

TABLE 9A

| Binding | Components | Underlying State |
| --- | --- | --- |
| program.env[a] | (x, y, z, w) | program environment parameter a |
| program.local[a] | (x, y, z, w) | program local parameter a |
| program.env[a..b] | (x, y, z, w) | program environment parameters a through b |
| program.local[a..b] | (x, y, z, w) | program local parameters a through b |

If a program parameter binding matches "program.env[a]" or "program.local[a]", the four components of the program parameter variable are filled with the four components of program environment parameter <a> or program local parameter <a> respectively. Additionally, for program parameter array bindings, "program.env[a . . . b]" and "program.local[a . . . b]" are equivalent to specifying program environment or local parameters <a> through <b> in order, respectively. A program using any of these bindings will fail to load if <a> is greater than <b>.

Program environment and local parameters are typeless, and may be specified as signed integer, unsigned integer, or floating-point variables. If a program environment parameter is read using a data type other than the one used to specify it, an undefined value is returned. TABLE 9B lists material property bindings.

TABLE 9B

| Binding | Components | Underlying State |
| --- | --- | --- |
| state.material.ambient | (r, g, b, a) | front ambient material color |
| state.material.diffuse | (r, g, b, a) | front diffuse material color |
| state.material.specular | (r, g, b, a) | front specular material color |
| state.material.emission | (r, g, b, a) | front emissive material color |
| state.material.shininess | (s, 0, 0, 1) | front material shininess |
| state.material.front.ambient | (r, g, b, a) | front ambient material color |
| state.material.front.diffuse | (r, g, b, a) | front diffuse material color |
| state.material.front.specular | (r, g, b, a) | front specular material color |
| state.material.front.emission | (r, g, b, a) | front emissive material color |
| state.material.front.shininess | (s, 0, 0, 1) | front material shininess |
| state.material.back.ambient | (r, g, b, a) | back ambient material color |
| state.material.back.diffuse | (r, g, b, a) | back diffuse material color |
| state.material.back.specular | (r, g, b, a) | back specular material color |
| state.material.back.emission | (r, g, b, a) | back emissive material color |
| state.material.back.shininess | (s, 0, 0, 1) | back material shininess |

If a material face is not specified in the binding, the front property is used. If a program parameter binding matches any of the material properties listed in TABLE 9B, the program parameter variable is filled according to TABLE 9B. For ambient, diffuse, specular, or emissive colors, the "x", "y", "z", and "w" components are filled with the "r", "g", "b", and "a" components, respectively, of the corresponding material color. For material shininess, the "x" component is filled with the material's specular exponent, and the "y", "z", and "w" components are filled with the floating-point constants 0, 0, and 1, respectively. Bindings containing ".back" refer to the back material; all other bindings refer to the front material.

Material properties can be changed inside a Begin/End pair, either directly by calling Material, or indirectly through color material. However, such property changes are not guaranteed to update program parameter bindings until the following End command. Program parameter variables bound to material properties changed inside a Begin/End pair are undefined until the following End command.

TABLE 9C lists light property bindings where <n> indicates a light number.

TABLE 9C

| Binding | Components | Underlying State |
| --- | --- | --- |
| state.light[n].ambient | (r, g, b, a) | light n ambient color |
| state.light[n].diffuse | (r, g, b, a) | light n diffuse color |
| state.light[n].specular | (r, g, b, a) | light n specular color |
| state.light[n].position | (x, y, z, w) | light n position |
| state.light[n].attenuation | (a, b, c, e) | light n attenuation constants and spot light exponent |
| state.light[n].spot.direction | (x, y, z, c) | light n spot direction and cutoff angle cosine |
| state.light[n].half | (x, y, z, 1) | light n infinite half-angle |
| state.lightmodel.ambient | (r, g, b, a) | light model ambient color |
| state.lightmodel.scenecolor | (r, g, b, a) | light model front scene color |
| state.lightmodel.front.scenecolor | (r, g, b, a) | light model front scene color |
| state.lightmodel.back.scenecolor | (r, g, b, a) | light model back scene color |
| state.lightprod[n].ambient | (r, g, b, a) | light n/front material ambient color product |
| state.lightprod[n].diffuse | (r, g, b, a) | light n/front material diffuse color product |
| state.lightprod[n].specular | (r, g, b, a) | light n/front material specular color product |
| state.lightprod[n].front.ambient | (r, g, b, a) | light n/front material ambient color product |
| state.lightprod[n].front.diffuse | (r, g, b, a) | light n/front material diffuse color product |
| state.lightprod[n].front.specular | (r, g, b, a) | light n/front material specular color product |
| state.lightprod[n].back.ambient | (r, g, b, a) | light n/back material ambient color product |
| state.lightprod[n].back.diffuse | (r, g, b, a) | light n/back material diffuse color product |
| state.lightprod[n].back.specular | (r, g, b, a) | light n/back material specular color product |

If a program parameter binding matches "state.light[n].ambient", "state.light[n].diffuse", or "state.light[n].specular", the "x", "y", "z", and "w" components of the program parameter variable are filled with the "r", "g", "b", and "a" components, respectively, of the corresponding light color. If a program parameter binding matches "state.light[n].position", the "x", "y", "z", and "w" components of the program parameter variable are filled with the "x", "y", "z", and "w" components, respectively, of the light position.

If a program parameter binding matches "state.light[n].attenuation", the "x", "y", and "z" components of the program parameter variable are filled with the constant, linear, and quadratic attenuation parameters of the specified light, respectively. The "w" component of the program parameter variable is filled with the spot light exponent of the specified light. If a program parameter binding matches "state.light[n].spot.direction", the "x", "y", and "z" components of the program parameter variable are filled with the "x", "y", and "z" components of the spot light direction of the specified light, respectively. The "w" component of the program parameter variable is filled with the cosine of the spot light cutoff angle of the specified light. If a program parameter binding matches "state.light[n].half", the "x", "y", and "z" components of the program parameter variable are filled with the x, y, and z components, respectively, of the normalized infinite half-angle vector $h\_inf = \|P+(0, 0, 1)\|$.

The "w" component is filled with 1.0. In the computation of $h\_inf$, P consists of the x, y, and z coordinates of the normalized vector from the eye position $P\_e$ to the eye-space light position $P\_pli$. $h\_inf$ is defined to correspond to the normalized half-angle vector when using an infinite light (w coordinate of the position is zero) and an infinite viewer ($v\_bs$ is FALSE). For local lights or a local viewer, $h\_inf$ is well-defined but does not match the normalized half-angle vector, which will vary depending on the vertex position.

If a program parameter binding matches "state.lightmodel.ambient", the "x", "y", "z", and "w" components of the program parameter variable are filled with the "r", "g", "b", and "a" components of the light model ambient color, respectively. If a program parameter binding matches "state.lightmodel.scenecolor" or "state.lightmodel.front.scenecolor", the "x", "y", and "z" components of the program parameter variable are filled with the "r", "g", and "b" components respectively of the "front scene color" $c\_scene = a\_cs*a\_cm + e\_cm$, where $a\_cs$ is the light model ambient color, $a\_cm$ is the front ambient material color, and $e\_cm$ is the front emissive material color. The "w" component of the program parameter variable is filled with the alpha component of the front diffuse material color. If a program parameter binding matches "state.lightmodel.back.scenecolor", a similar back scene color, computed using back-facing material properties, is used. The front and back scene colors match the values that would be assigned to vertices using conventional lighting if all lights were disabled.

If a program parameter binding matches anything beginning with "state.lightprod[n]", the "x", "y", and "z" components of the program parameter variable are filled with the "r", "g", and "b" components, respectively, of the corresponding light product. The three light product components are the products of the corresponding color components of the specified material property and the light color of the specified light (see TABLE 9C). The "w" component of the program parameter variable is filled with the alpha component of the specified material property.

Light products depend on material properties, which can be changed inside a Begin/End pair. Such property changes are not guaranteed to take effect until the following End command. Program parameter variables bound to light products whose corresponding material property changes inside a Begin/End pair are undefined until the following End command. TABLE 9D lists texture coordinate generation property bindings, where [n] is optional—texture unit <n> is used if specified; texture unit 0 is used otherwise.

TABLE 9D

| Binding | Components | Underlying State |
| --- | --- | --- |
| state.texgen[n].eye.s | (a, b, c, d) | TexGen eye linear plane coefficients, s coord, unit n |
| state.texgen[n].eye.t | (a, b, c, d) | TexGen eye linear plane coefficients, t coord, unit n |
| state.texgen[n].eye.r | (a, b, c, d) | TexGen eye linear plane coefficients, r coord, unit n |
| state.texgen[n].eye.q | (a, b, c, d) | TexGen eye linear plane coefficients, q coord, unit n |
| state.texgen[n].object.s | (a, b, c, d) | TexGen object linear plane coefficients, s coord, unit n |
| state.texgen[n].object.t | (a, b, c, d) | TexGen object linear plane coefficients, t coord, unit n |
| state.texgen[n].object.r | (a, b, c, d) | TexGen object linear plane coefficients, r coord, unit n |
| state.texgen[n].object.q | (a, b, c, d) | TexGen object linear plane coefficients, q coord, unit n |

If a program parameter binding matches a set of TexGen plane coefficients, the "x", "y", "z", and "w" components of the program parameter variable are filled with the coefficients p1, p2, p3, and p4, respectively, for object linear coefficients, and the coefficients p1', p2', p3', and p4', respectively, for eye linear coefficients.

TABLE 9E lists fog property bindings.

TABLE 9E

| Binding | Components | Underlying State |
|---|---|---|
| state.fog.color | (r, g, b, a) | RGB fog color (section 3.10) |
| state.fog.params | (d, s, e, r) | fog density, linear start and end, and 1/(end-start) |

If a program parameter binding matches "state.fog.color", the "x", "y", "z", and "w" components of the program parameter variable are filled with the "r", "g", "b", and "a" components, respectively, of the fog color. If a program parameter binding matches "state.fog.params", the "x", "y", and "z" components of the program parameter variable are filled with the fog density, linear fog start, and linear fog end parameters, respectively. The "w" component is filled with 1/(end-start), where end and start are the linear fog end and start parameters, respectively.

TABLE 9F lists clip plane property bindings, where <n> specifies the clip plane number, and is required.

TABLE 9F

| Binding | Components | Underlying State |
|---|---|---|
| state.clip[n].plane | (a, b, c, d) | clip plane n coefficients |

If a program parameter binding matches "state.clip[n].plane", the "x", "y", "z", and "w" components of the program parameter variable are filled with the coefficients p1', p2', p3', and p4', respectively, of clip plane <n>.

TABLE 9G lists point property bindings.

TABLE 9G

| Binding | Components | Underlying State |
|---|---|---|
| state.point.size | (s, n, x, f) | point size, min and max size clamps, and fade threshold |
| state.point.attenuation | (a, b, c, 1) | point size attenuation constants |

If a program parameter binding matches "state.point.size", the "x", "y", "z", and "w" components of the program parameter variable are filled with the point size, minimum point size, maximum point size, and fade threshold, respectively. If a program parameter binding matches "state.point.attenuation", the "x", "y", and "z" components of the program parameter variable are filled with the constant, linear, and quadratic point size attenuation parameters (a, b, and c), respectively. The "w" component is filled with 1.0.

TABLE 9H lists texture environment property bindings, where "[n]" is optional—texture unit <n> is used if specified; texture unit 0 is used otherwise.

TABLE 9G

| Binding | Components | Underlying State |
|---|---|---|
| state.texenv[n].color | (r, g, b, a) | texture environment n color |

If a program parameter binding matches "state.texenv[n].color", the "x", "y", "z", and "w" components of the program parameter variable are filled with the "r", "g", "b", and "a" components, respectively, of the corresponding texture environment color. Note that only "legacy" texture units, as queried by MAX_TEXTURE_UNITS, include texture environment state. Texture image units and texture coordinate sets do not have associated texture environment state.

TABLE 9I lists depth property bindings.

TABLE 9I

| Binding | Components | Underlying State |
|---|---|---|
| state.depth.range | (n, f, d, 1) | Depth range near, far, and (far-near) |

If a program parameter binding matches "state.depth.range", the "x" and "y" components of the program parameter variable are filled with the mappings of near and far clipping planes to window coordinates, respectively. The "z" component is filled with the difference of the mappings of near and far clipping planes, far minus near. The "w" component is filled with 1.0.

TABLE 9J lists matrix property bindings, where the "[n]" syntax indicates a specific matrix number.

TABLE 9J

| Binding | Underlying State |
|---|---|
| * state.matrix.modelview[n] | modelview matrix n |
| state.matrix.projection | projection matrix |
| state.matrix.mvp | modelview-projection matrix |
| * state.matrix.texture[n] | texture matrix n |
| state.matrix.program[n] | program matrix n |

For modelview and texture matrices, a matrix number is optional, and matrix zero will be used if the matrix number is omitted. These base bindings may further be modified by an inverse/transpose selector and a row selector.

If the beginning of a program parameter binding matches any of the matrix binding names listed in Table X.11, the binding corresponds to a 4×4 matrix. If the parameter binding is followed by ".inverse", ".transpose", or ".invtrans" (<stateMatModifier> grammar rule), the inverse, transpose, or transpose of the inverse, respectively, of the matrix specified in TABLE 9J is selected. Otherwise, the matrix specified in TABLE 9J is selected. If the specified matrix is poorly-conditioned (singular or nearly so), its inverse matrix is undefined. The binding name "state.matrix.mvp" refers to the product of modelview matrix zero and the projection matrix, defined as MVP=P*M0, where P is the projection matrix and M0 is modelview matrix zero.

If the selected matrix is followed by ".row[<a>]" (matching the <stateMatrixRow> grammar rule), the "x", "y", "z", and "w" components of the program parameter variable are filled with the four entries of row <a> of the selected matrix. In the example, PARAM m0=state.matrix.modelview[1].row[0]; PARAM m1=state.matrix.projection.transpose.row[3]; the variable "m0" is set to the first row (row 0) of modelview matrix 1 and "m1" is set to the last row (row 3) of the transpose of the projection matrix.

For program parameter array bindings, multiple rows of the selected matrix can be bound via the <stateMatrixRows> grammar rule. If the selected matrix binding is followed by ".row[<a> . . . <b>]", the result is equivalent to specifying matrix rows <a> through <b>, in order. A program will fail to load if <a> is greater than <b>. If no row selection is specified (<optMatrixRows> matches " "), matrix rows 0 through 3 are bound in order. In the example, PARAM m2[ ]={state.matrix.program[0].row[1.2]}; PARAM m3[ ]={state.matrix.program[0].transpose}; the array "m2" has two entries, containing rows 1 and 2 of program matrix zero, and "m3" has four entries, containing all four rows of the transpose of program matrix zero.

Program temporary variables are used to hold temporary results during program execution. Temporaries do not persist between program invocations, and are undefined at the beginning of each program invocation. Temporary variables are declared explicitly using the <TEMP_statement> grammar rule. Each such statement can declare one or more temporaries. Temporaries can not be declared implicitly. Temporaries can be declared using any component size ("SHORT" or "LONG") and type ("FLOAT" or "INT") modifier. Temporary variables may be declared as arrays. Temporary variables declared as arrays may be stored in slower memory than those not declared as arrays, and it is recommended to use non-array variables unless array functionality is required.

Program result variables represent the per-vertex or per-fragment results of the program. All result variables have associated bindings, are write-only during program execution, and are undefined at the beginning of each program invocation. Any vertex or fragment attributes corresponding to unwritten result variables will be undefined in subsequent stages of the pipeline. Result variables may be declared explicitly via the <OUTPUT_statement> grammar rule, or implicitly by using a result binding in an instruction. The set of available result bindings depends on the program type, and is enumerated in the specifications for each program type.

Result variables may generally be declared as arrays, but the set of bindings allowed for arrays is limited to state grouped in arrays (e.g., texture coordinates, clip distances, colors). Additionally, all bindings assigned to the array must be of the same binding type and must increase consecutively. Examples of valid and invalid binding lists for vertex programs are shown in TABLE 9K.

TABLE 9K

| | |
|---|---|
| result.clip[1], result.clip[2] | # valid, 2-entry array |
| result.texcoord[0..3] | # valid, 4-entry array |
| result.texcoord[1], result.texcoord[3] | # invalid, skipped texcoord 2 |
| result.texcoord[2], result.texcoord[1] | # invalid, wrong order |
| result.texcoord[1], result.clip[2] | # invalid, different types |

Additionally, result bindings may be used in no more than one array addressed with relative addressing. Implementations may have a limit on the total number of result binding components used by each program target (MAX_PROGRAM_RESULT_COMPONENTS).

Programs that require more result binding components than this limit will fail to load. The method of counting used result binding components is implementation-dependent, but must satisfy the following properties (1) if a result binding is not referenced in a program, or is referenced only in declarations of result variables that are not used, none of its components are counted and (2) a result binding component may be counted as used only if there exists an instruction operand where (i) the component is enabled in the write mask, and(ii) the result binding is either referenced directly by the operand, bound to a declared variable referenced by the operand, or bound to a declared array variable where another binding in the array satisfies one of the two previous conditions.

Implementations are not required to optimize out unused elements of a result array or components that are used in only some elements of an array. The last of these rules is intended to cover the case where the same result binding is used in multiple variables. For example, an instruction whose write mask selects only the x component may result in the x component of a result binding being counted, but may never result in the counting of the y, z, or w components of any result binding.

Program parameter buffers are arrays consisting of single-component typeless values stored in a buffer object. A buffer object is a portion of graphics memory that may be loaded in a variety of ways, including through graphics processor 250 or 350 or by host computer 410. A bound buffer object functions as an array of four component vectors with a single word of integer or floating-point values corresponding to a four component vector that may be read by graphics processor 250 or 350. Unified ISA 200 and 300 provides an implementation-dependent number of buffer object binding points for each program target, to which buffer objects can be attached. Program parameter buffer variables can be changed either by updating the contents of bound buffer objects, or simply by changing the buffer object attached to a binding point.

Program parameter buffer variables are used as constants during program execution. All program parameter buffer variables have an associated binding and are read-only during program execution. Program parameter buffers retain their values across program invocations, although their values may change as buffer object bindings or contents change. Program parameter buffer variables must be declared explicitly via the <BUFFER_statement> grammar rule. Program parameter buffer bindings can not be used directly in executable instructions. Program parameter buffer variables may be declared as arrays, but all bindings assigned to the array must use the same binding point and must increase consecutively.

TABLE 9L lists Program Parameter Buffer bindings, where <a> indicates a buffer number, <b> and <c> indicate individual elements.

TABLE 9L

| Binding | Components | Underlying State |
|---|---|---|
| program.buffer[a][b] | (x, x, x, x) | program parameter buffer a, element b |
| program.buffer[a][b..c] | (x, x, x, x) | program parameter buffer a, elements b through c |
| program.buffer[a] | (x, x, x, x) | program parameter buffer a, all elements |

If a program parameter buffer binding matches "program.buffer[a][b]", the program parameter variable are filled with element <b> of the buffer object bound to binding point <a>. Each element of the bound buffer object is treated a single word of data that can hold integer or floating-point values. When the binding is evaluated the single word is broadcast to all four components. If no buffer object is bound to binding point <a>, or the bound buffer object is not large enough to hold an element <b>, the values used are undefined. The binding point <a> must be a nonnegative integer constant.

For program parameter buffer array declarations, "program.buffer[a][b . . . c]" is equivalent to specifying elements <b> through <c> of the buffer object bound to binding point <a> in order. For program parameter buffer array declarations, "program.buffer[a]" is equivalent to specifying the entire buffer—elements 0 through <n>−1, where <n> is either the size of the array (if declared) or the implementation-dependent maximum parameter buffer object size limit (if no size is declared).

The program condition code registers are four-component vectors. Each component of this register is a collection of single-bit flags, including a sign flag (SF), a zero flag (ZF), an overflow flag (OF), and a carry flag (CF). There are two condition code registers (CC0 and CC1), whose values are undefined at the beginning of program execution. Most program instructions can optionally update one of the condition code registers, by designating the condition code to update in the instruction. When a condition code component is updated, the four flags of each component of the condition code are set according to the corresponding component of the instruction result. The value of these four flags can be combined in various condition code tests, which can be used to mask writes to destination variables and to perform conditional branches or other condition operations.

Programs can create aliases by matching the <ALIAS_statement> grammar rule. Aliases allow programs to use multiple variable names to refer to a single underlying variable. For example, the statement ALIAS var1=var0 establishes a variable name of "var1". Subsequent references to "var1" in the program text are treated as references to "var0". The left hand side of an ALIAS statement must be a new variable name, and the right hand side must be an established variable name. Aliases are not considered variable declarations, so do not count against the limits on the number of variable declarations allowed in the program text.

The set of instructions supported for GPU programs is given in TABLE 10A. An instruction can use up to three operands when it executes, and most instructions can write a single result vector. Instructions may also specify one or more modifiers, according to the <opModifiers> grammar rule. Instruction modifiers affect how the specified operation is performed.

Shader programs may operate on signed integer, unsigned integer, or floating-point values; some instructions are capable of operating on any of the three types. However, the data type of the operands and the result are always determined based solely on the instruction and its modifiers. If any of the variables used in the instruction are typeless, they will be interpreted according to the data type derived from the instruction. If any variables with a conflicting data type are used in the instruction, the program will fail to load unless the "NTC" (no type checking) instruction modifier is specified.

TABLE 10A

| Instruction | F | I | C | S | H | D | Out | Inputs | Description |
|---|---|---|---|---|---|---|---|---|---|
| ABS | X | X | X | X | X | F | v | v | absolute value |
| ADD | X | X | X | X | X | F | v | v, v | add |
| AND | — | X | X | — | — | S | v | v, v | bitwise and |
| BRK | — | — | — | — | — | — | — | c | break out of loop instruction |
| CAL | — | — | — | — | — | — | — | c | subroutine call |
| CEIL | X | X | X | X | X | F | v | vf | ceiling |
| CMP | X | X | X | X | X | F | v | v, v, v | compare |
| CONT | — | — | — | — | — | — | — | c | continue with next loop interation |
| COS | X | — | X | X | X | F | s | s | cosine with reduction to [−PI,PI] |
| DIV | X | X | X | X | X | F | v | v, s | divide vector components by scalar |
| DP2 | X | — | X | X | X | F | s | v, v | 2-component dot product |
| DP2A | X | — | X | X | X | F | s | v, v, v | 2-comp. dot product w/scalar add |
| DP3 | X | — | X | X | X | F | s | v, v | 3-component dot product |
| DP4 | X | — | X | X | X | F | s | v, v | 4-component dot product |
| DPH | X | — | X | X | X | F | s | v, v | homogeneous dot product |
| DST | X | — | X | X | X | F | v | v, v | distance vector |
| ELSE | — | — | — | — | — | — | — | — | start if test else block |
| ENDIF | — | — | — | — | — | — | — | — | end if test block |
| ENDREP | — | — | — | — | — | — | — | — | end of repeat block |
| EX2 | X | — | X | X | X | F | s | s | exponential base 2 |
| FLR | X | X | X | X | X | F | v | vf | floor |
| FRC | X | — | X | X | X | F | v | v | fraction |
| I2F | — | X | X | — | — | S | vf | v | integer to float |
| IF | — | — | — | — | — | — | — | c | start of if test block |
| KIL | X | X | — | — | X | F | — | vc | kill fragment |
| LG2 | X | — | X | X | X | F | s | s | logarithm base 2 |
| LIT | X | — | X | X | X | F | v | v | compute lighting coefficients |
| LRP | X | — | X | X | X | F | v | v, v, v | linear interpolation |
| MAD | X | X | X | X | X | F | v | v, v, v | multiply and add |
| MAX | X | X | X | X | X | F | v | v, v | maximum |
| MIN | X | X | X | X | X | F | v | v, v | minimum |
| MOD | — | X | X | — | — | S | v | v, v | modulus |
| MOV | X | X | X | X | X | F | v | v | move |
| MUL | X | X | X | X | X | F | v | v, v | multiply |
| NOT | — | X | X | — | — | S | v | v | bitwise not |
| NRM | X | — | X | X | X | F | v | v | normalize 3-component vector |
| OR | — | X | X | — | — | S | v | v, v | bitwise or |
| PK2H | X | X | — | — | — | F | s | vf | pack two 16-bit floats |
| PK2US | X | X | — | — | — | F | s | vf | pack two floats as unsigned 16-bit |
| PK4B | X | X | — | — | — | F | s | vf | pack four floats as signed 8-bit |
| PK4UB | X | X | — | — | — | F | s | vf | pack four floats as unsigned 8-bit |
| POW | X | — | X | X | X | F | s | s, s | exponentiate |
| RCC | X | — | X | X | X | F | s | s | reciprocal (clamped) |
| RCP | X | — | X | X | X | F | s | s | reciprocal |
| REP | X | X | — | — | X | F | — | v | start of repeat block |
| RET | — | — | — | — | — | — | — | c | subroutine return |
| RFL | X | — | X | X | X | F | v | v, v | reflection vector |
| ROUND | X | X | X | X | X | F | v | vf | round to nearest integer |
| RSQ | X | — | X | X | X | F | s | s | reciprocal square root |
| SAD | — | X | X | — | — | S | vu | v, v, vu | sum of absolute differences |
| SCS | X | — | X | X | X | F | v | s | sine/cosine without reduction |
| SEQ | X | X | X | X | X | F | v | v, v | set on equal |
| SFL | X | X | X | X | X | F | v | v, v | set on false |
| SGE | X | X | X | X | X | F | v | v, v | set on greater than or equal |
| SGT | X | X | X | X | X | F | v | v, v | set on greater than |
| SHL | — | X | X | — | — | S | v | v, s | shift left |
| SHR | — | X | X | — | — | S | v | v, s | shift right |
| SIN | X | — | X | X | X | F | s | s | sine with reduction to [−PI,PI] |
| SLE | X | X | X | X | X | F | v | v, v | set on less than or equal |
| SLT | X | X | X | X | X | F | v | v, v | set on less than |
| SNE | X | X | X | X | X | F | v | v, v | set on not equal |
| SSG | X | — | X | X | X | F | v | v | set sign |
| STR | X | X | X | X | X | F | v | v, v | set on true |
| SUB | X | X | X | X | X | F | v | v, v | subtract |
| SWZ | X | — | X | X | X | F | v | v | extended swizzle |
| TEX | X | X | X | X | — | F | v | vf | texture sample |
| TRUNC | X | X | X | X | X | F | v | vf | truncate (round toward zero) |
| TXB | X | X | X | X | — | F | v | vf | texture sample with bias |
| TXD | X | X | X | X | — | F | v | vf, vf, vf | texture sample w/partials |
| TXF | X | X | X | X | — | F | v | vs | texel fetch |
| TXL | X | X | X | X | — | F | v | vf | texture sample w/LOD |
| TXP | X | X | X | X | — | F | v | vf | texture sample w/projection |
| TXQ | — | — | — | — | — | S | vs | vs | texture info query |
| UP2H | X | X | X | X | — | F | vf | s | unpack two 16-bit floats |
| UP2US | X | X | X | X | — | F | vf | s | unpack two unsigned 16-bit ints |
| UP4B | X | X | X | X | — | F | vf | s | unpack four |

TABLE 10A-continued

| Instruction | F | I | C | S | H | D | Out | Inputs | Description |
|---|---|---|---|---|---|---|---|---|---|
| UP4UB | X | X | X | X | — | F | vf | s | signed 8-bit ints unpack four unsigned 8-bit ints |
| X2D | X | — | X | X | X | F | v | v, v, v | 2D coordinate transformation |
| XOR | — | X | X | — | — | S | v | v, v | exclusive or |
| XPD | X | — | X | X | X | F | v | v, v | cross product |

The columns of TABLE 10A specify the set of modifiers allowed for the instruction F=floating-point data type modifiers, I=signed and unsigned integer data type modifiers, C=condition code update modifiers, S=clamping (saturation) modifiers, H=half-precision float data type suffix, D=default data type modifier (F, U, or S).

The input and output columns describe the formats of the operands and results of the instruction, where v is a 4-component vector (data type is inherited from operation), of is a 4-component vector (data type is always floating-point), vs is a 4-component vector (data type is always signed integer), vu is a 4-component vector (data type is always unsigned integer), s is a scalar (replicated if written to a vector destination; data type is inherited from operation), c is a condition code test result (e.g., "EQ", "GT1.x"), and vc is a 4-component vector or condition code test.

There are several types of instruction modifiers available. A data type modifier specifies that an instruction should operate on signed integer, unsigned integer, or floating-point data, when multiple data types are supported. A clamping modifier applies to instructions with floating-point results, and specifies the range to which the results should be clamped. A condition code update modifier specifies that the instruction should update one of the condition code variables. Several other special modifiers are also provided.

Instruction modifiers may be specified as stand-alone modifiers or as suffixes concatenated with the opcode name. A program will fail to load if it contains an instruction that (1) specifies more than one modifier of any given type,(2) specifies a clamping modifier on an instruction, unless it produces floating-point results, or (3) specifies a modifier that is not supported by the instruction (see TABLE 10A and the instruction description).

Stand-alone instruction modifiers are specified according to the <opModifiers> grammar rule using a "<modifier>" syntax. Multiple modifiers, separated by periods, may be specified. The set of supported modifiers is described in TABLE 10B.

TABLE 10B

| Modifier | Description |
|---|---|
| F | Floating-point operation |
| U | Fixed-point operation, unsigned operands |
| S | Fixed-point operation, signed operands |
| CC | Update condition code register zero |
| CC0 | Update condition code register zero |
| CC1 | Update condition code register one |
| SAT | Floating-point results clamped to [0, 1] |
| SSAT | Floating-point results clamped to [−1, 1] |
| NTC | Disable type-checking on operands/results |
| S24 | Signed multiply (24-bit operands) |
| U24 | Unsigned multiply (24-bit operands) |
| HI | Multiplies two 32-bit integer operands, returns the 32 MSBs of the product |

"F", "U", and "S" modifiers are data type modifiers and specify that the instruction should operate on floating-point, unsigned integer, or unsigned integer values, respectively. For example, "ADD.F", "ADD.U", and "ADD.S" specify component-wise addition of floating-point, signed integer, or unsigned integer vectors, respectively. These modifiers specify a data type, but do not specify a precision at which the operation is performed. Floating-point operations will be carried out with an internal precision no less than that used to represent the largest operand. Fixed-point operations will be carried out using at least as many bits as used to represent the largest operand. Operands represented with fewer bits than used to perform the instruction will be promoted to a larger data type.

Signed integer operands will be sign-extended, where the most significant bits are filled with ones if the operand is negative and zero otherwise. Unsigned integer operands will be zero-extended, where the most significant bits are always filled with zeroes. For some instructions, the data type of some operands or the result is fixed; in these cases, the data type modifier specifies the data type of the remaining values.

"CC", "CC0", and "CC1" are condition code update modifiers that specify that one of the condition code registers should be updated based on the result of the instruction. "CC" and "CC0" specify that the condition code register CC0 be updated; "CC1" specifies an update to CC1. If no condition code update modifier is provided, the condition code registers will not be affected. "SAT" and "SSAT" are clamping modifiers that specify that the floating-point components of the instruction result should be clamped to [0,1] or [−1,1], respectively, before updating the condition code and the destination variable. If no clamping suffix is specified, unclamped results will be used for condition code updates (if any) and destination variable writes. Clamping modifiers are not supported on instructions that do not produce floating-point results.

"NTC" (no type checking) disables data type checking on the instruction, and allows instructions to use operands or result variables whose data types are inconsistent with the expected data types of the instruction. "S24", "U24", and "HI" are special modifiers that are allowed only for the MUL instruction, and are described in detail where MUL is documented. No more than one such modifier may be provided for any instruction.

If an instruction supports data type modifiers, but none is provided, a default data type will be chosen based on the instruction, as specified in TABLE 10A and the instruction set description. If condition code update or clamping modifiers are not specified, the corresponding operation will not be performed. Additionally, each instruction name may have one or more suffixes, concatenated onto the base instruction name, that operate as instruction modifiers. For conciseness, these suffixes are not spelled out in the grammar—the base opcode name is used as a placeholder for the opcode and all of its possible suffixes. Instruction suffixes are provided mainly for compatibility with prior shader program instruction sets. The set of allowable suffixes, and their equivalent stand-alone modifiers, are listed in TABLE 10C.

TABLE 10C

| Suffix | Modifier | Description |
|---|---|---|
| R | F | Floating-point operation, 32-bit precision |
| H | F(*) | Floating-point operation, at least 16-bit precision |
| C | CC0 | Update condition code register zero |
| C0 | CC0 | Update condition code register zero |
| C1 | CC1 | Update condition code register one |
| _SAT | SAT | Floating-point results clamped to [0, 1] |
| _SSAT | SSAT | Floating-point results clamped to [−1, 1] |

The "R" and "H" suffixes specify floating-point operations and are equivalent to the "F" data type modifier. They additionally specify a minimum precision for the operations. Instructions with an "R" precision modifier will be carried out at no less than IEEE single-precision floating-point (8 bits of exponent, 23 bits of mantissa). Instructions with an "H" precision modifier will be carried out at no less than 16-bit floating-point precision (5 bits of exponent, 10 bits of mantissa).

An instruction may have multiple suffixes, but they must appear in order, with data type suffixes first, followed by condition code update suffixes, followed by clamping suffixes. For example, "ADDR" carries out an add at 32-bit precision. "ADDH_SAT" carries out an add at 16-bit precision (or better) and clamps the results to [0,1]. "ADDRC1_SSAT" carries out an add at 32-bit floating-point precision, clamps the results to [−1,1], and updates condition code one based on the clamped result.

Most program instructions operate on one or more scalar or vector operands. Each operand specifies an operand variable, which is either the name of a previously declared variable or an implicit variable declaration created by using a variable binding in the instruction. Attribute, parameter, or parameter buffer variables can be declared implicitly by using a valid binding name in an operand. Instruction operands are specified by the <instOperandV>, <instOperandS>, or <instOperandVNS> grammar rules.

If the operand variable is not an array, its contents are loaded directly. If the operand variable is an array, a single element of the array is loaded according to the <arrayMem> grammar rule. The elements of an array are numbered from 0 to <n>−1, where <n> is the number of entries in the array. Array members can be accessed using either absolute or relative addressing.

Absolute array addressing is used when the <arrayMemAbs> grammar rule is matched; the array member to load is specified by the matching integer. Out-of-bounds array absolute accesses are not allowed. If the specified member number is greater than or equal to the size of the array, the program will fail to load.

Relative array addressing is used when the <arrayMemRel> grammar rule is matched. This grammar rule allows the program to specify a scalar integer operand and an optional constant offset, according to the <arrayMemReg> and <arrayMemOffset> grammar rules. When performing relative addressing, unified ISA 200 or 300 evaluates the specified integer scalar operand (according to the rules specified in this section) and adds the constant offset. The array member loaded is given by this sum. The constant offset is considered zero if an offset is omitted. If the sum is negative or exceeds the size of the array, the results of the access are undefined, but may not lead to program or unified ISA 200 or 300 termination. The set of constant offsets supported for relative addressing is limited to values in the range [0,<n>−1], where <n> is the size of the array. A program will fail to load if it specifies an offset outside that range. If offsets outside that range are required, they can be applied by using an integer ADD instruction writing to a temporary variable.

After the operand is loaded, its components can be rearranged according to the <swizzleSuffix> grammar rule, or it can be converted to a scalar operand according to the <scalarSuffix> grammar rule. The <swizzleSuffix> grammar rule rearranges the components of a loaded vector to produce another vector. If the <swizzleSuffix> rule matches the <xyzwSwizzle> or <rgbaSwizzle> grammar rule, a pattern of the form ".????" is used, where each question mark is replaced with one of "x", "y", "z", "w", "r", "g", "b", or "a".

For such patterns, the x, y, z, and w components of the operand are taken from the vector components named by the first, second, third, and fourth character of the pattern, respectively. Swizzle components of "r", "g", "b", and "a" are equivalent to "x", "y", "z", and "w", respectively. For example, if the swizzle suffix is ".yzzx" or ".gbbr" and the specified source contains {2,8,9,0}, the result is the vector {8,9,9,2}. If the <swizzleSuffix> matches the <component> grammar rule, a pattern of the form ".?" is used. For this pattern, all four components of the operand are taken from the single component identified by the pattern. If the swizzle suffix is omitted, components are not rearranged and swizzling has no effect, as though ".xyzw" were specified. The swizzle suffix rules do not allow mixing "x", "y", "z", or "w" selectors with "r", "g", "b", or "a" selectors. A program will fail to load if it contains a swizzle suffix with selectors from both of these sets.

The <scalarSuffix> grammar rule converts a vector to a scalar by selecting a single component. The <scalarSuffix> rule is similar to the swizzle selector, except that only a single component is selected. If the scalar suffix is ".y" and the specified source contains {2,8,9,0}, the value is the scalar value 8. Next, a component-wise negate operation is performed on the operand if the <operandNeg> grammar rule matches "−". Negation is not performed if the operand has no sign prefix, or is prefixed with "+".

Next, a component-wise absolute value operation is performed on the operand if the <instOperandAbsV> or <instOperandAbsS> grammar rule is matched, by surrounding the operand with two "|" characters. The result is optionally negated if the <operandAbsNeg> grammar rule matches "−". For unsigned integer operands, the absolute value operation has no effect.

Most program instructions perform computations that produce a result, which will be written to a variable. Each instruction that computes a result specifies a destination variable, which is either the name of a previously declared variable or an implicit variable declaration created by using a variable binding in the instruction. Result variables can be declared implicitly by using a valid program result binding name in the result portion of the instruction. Instruction results are specified according to the <instResult> grammar rule.

The destination variable may be a single member of an array. In this case, a single array member is specified using the <arrayMem> grammar rule, and the array member to update is computed in the exact same manner as done for operand loads. If the array member is computed at run time, and is negative or greater than or equal to the size of the array, the results of the destination variable update are undefined and could result in overwriting other program variables.

The results of the operation may be obtained at a different precision than that used to store the destination variable. If so, the results are converted to match the size of the destination variable. For floating-point values, the results are rounded to the nearest floating-point value that can be represented in the destination variable. If a result component is larger in magnitude than the largest representable floating-point value in the data type of the destination variable, an infinity encoding (+/−INF) is used. Signed or unsigned integer values are sign-extended or zero-extended, respectively, if the destination variable has more bits than the result, and have their most significant bits discarded if the destination variable has fewer bits.

Writes to individual components of a vector destination variable can be controlled at compile time by individual component write masks specified in the instruction. The component write mask is specified by the <optWriteMask> grammar rule, and is a string of up to four characters, naming the components to enable for writing. If no write mask is specified, all components are enabled for writing. The characters "x", "y", "z", and "w" match the x, y, z, and w components respectively. For example, a write mask of ".xzw" indicates that the x, z, and w components should be enabled for writing but the y component should not be written. The grammar requires that the destination register mask components must be listed in "xyzw" order. Additionally, write mask components of "r", "g", "b", and "a" are equivalent to "x", "y", "z", and "w", respectively. The grammar does not allow mixing "x", "y", "z", or"w" components with "r", "g", "b", and "a" ones.

Writes to individual components of a vector destination variable, or to a scalar destination variable, can also be controlled at run time using condition code write masks. The condition code write mask is specified by the <ccMask> grammar rule. If a mask is specified, a condition code variable is loaded according to the <ccMaskRule> grammar rule and tested as described in TABLE 10D to produce a four-component vector of TRUE/FALSE values.

TABLE 10D

| mask rule | test name | condition |
|---|---|---|
| EQ, EQ0, EQ1 | equal | !SF && ZF |
| GE, GE0, GE1 | greater than or equal | !(SF ^ OF) |
| GT, GT0, GT1 | greater than | (!SF ^ OF) && !ZF |
| LE, LE0, LE1 | less than or equal | SF ^ (ZF ‖ OF) |
| LT, LT0, LT1 | less than | (SF && !ZF) ^ OF |
| NE, NE0, NE1 | not equal | SF ‖ !ZF |
| FL, FL0, FL1 | false | always false |
| TR, TR0, TR1 | true | always true |
| NAN, NAN0, NAN1 | not a number | SF && ZF |
| LEG, LEG0, LEG1 | less, equal, or greater | !SF ‖ !ZF (anything but a NaN) |
| CF, CF0, CF1 | carry flag | CF |
| NCF, NCF0, NCF1 | no carry flag | !CF |
| OF, OF0, OF1 | overflow flag | OF |
| NOF, NOF0, NOF1 | no overflow flag | !OF |
| SF, SF0, SF1 | sign flag | SF |
| NSF, NSF0, NSF1 | no sign flag | !SF |
| AB, AB0, AB1 | above | CF && !ZF |
| BLE, BLE0, BLE1 | below or equal | !CF ‖ ZF |

The allowed rules are specified in the "mask rule" column. If "0" or "1" is appended to the rule name (e.g., "EQ1"), the corresponding condition code register (CC1 in this example) is loaded, otherwise CC0 is loaded. After loading, each component is tested, using the expression listed in the "condition" column. After the condition code tests are performed, the four-component result can be swizzled according to the <swizzleSuffix> grammar rule. Individual components of the destination variable are written only if the corresponding component of the swizzled condition code test result is TRUE. If both a (compile-time) component write mask and a condition code write mask are specified, destination variable components are written only if the corresponding component is enabled in both masks.

A program instruction can also optionally update one of the two condition code registers if the "CC", "CC0", or "CC1" instruction modifier is specified. These instruction modifiers update condition code register CC0, CC0, or CC1, respectively. The instructions "ADD.CC" or "ADD.CC0" will perform an add and update condition code zero, "ADD.CC1" will add and update condition code one, and "ADD" will simply perform the add without a condition code update. The components of the selected condition code register are updated if and only if the corresponding component of the destination variable is enabled by both write masks. For the purposes of condition code update, a scalar destination variable is treated as a vector where the scalar result is written to "x" (if enabled in the write mask), and writes to the "y", "z", and "w" components are disabled.

When condition code components are written, the condition code flags are updated based on the corresponding component of the result. If a component of the destination register is not enabled for writes, the corresponding condition code component is also unchanged. For floating-point results, the sign flag (SF) is set if the result is less than zero or is a NaN (not a number) value. The zero flag (ZF) is set if the result is equal to zero or is a NaN. For signed and unsigned integer results, the sign flag (SF) is set if the most significant bit of the value written to the result variable is set and the zero flag (ZF) is set if the result written is zero.

For instructions other than those performing an integer add or subtract (ADD, MAD, SAD, SUB), the overflow and carry flags (OF and CF) are cleared. For integer add or subtract operations, the overflow and carry flags by doing both signed and unsigned adds/subtracts as follows: (1) the overflow flag (OF) is set by interpreting the two operands as signed integers and performing a signed add or subtract. If the result is representable as a signed integer (i.e., doesn't overflow), the overflow flag is cleared; otherwise, it is set. (2) The carry flag (CF) is set by interpreting the two operands as unsigned integers and performing an unsigned add or subtract. If the result of an addition is representable as an unsigned integer (i.e., doesn't overflow), the carry flag is cleared; otherwise, it is set. If the result of a subtraction is greater than or equal to zero, the carry flag is set; otherwise, it is cleared.

For the purposes of condition code setting, negation modifiers turn add operations into subtracts and vice versa. If the operation is equivalent to an addition with both operands negated (−A−B), the carry and overflow flags are both undefined. Certain program instructions may access texture images. The coordinates, level-of-detail, and partial derivatives used for performing the texture lookup are derived from values provided in the program and may use the function shown in TABLE 10E which obtains a filtered texel value <tau> and returns a 4-component vector (R,G,B,A).

TABLE 10E result_t_vec
TextureSample(float_vec coord, float lod, float_vec ddx,
        float_vec ddy, int_vec offset);

The result vector is interpreted as floating-point, signed integer, or unsigned integer, according to the data type modifier of the instruction. If the internal format of the texture does not match the instruction's data type modifier, the results of the texture lookup are undefined. Note that for unextended OpenGL 2.0, all supported texture internal formats store integer values but return floating-point results in the range [0,1] on a texture lookup. An ARB_texture_float extension introduces floating-point internal format where components are both stored and returned as floating-point values. An EXT_texture_integer extension introduces formats that both store and return either signed or unsigned integer values.

<coord> is a four-component floating-point vector from which the (s,t,r) texture coordinates used for the texture access, the layer used for array textures, and the reference value used for depth comparisons are extracted according to TABLE 10F. If the texture is a cube map, (s,t,r) is projected to one of the six cube faces to produce a new (s,t) vector. For array textures, the layer used is derived by rounding the extracted floating-point component to the nearest integer and clamping the result to the range [0,<n>−1], where <n> is the number of layers in the texture.

<lod> specifies the level of detail parameter. <ddx> and <ddy> specify partial derivatives (ds/dx, dt/dx, dr/dx, ds/dy, dt/dy, and dr/dy) for the texture coordinates, and may be used to derive footprint shapes for anisotropic texture filtering. <offset> is a constant 3-component signed integer vector specified according to the <texelOffset> grammar rule, which is added to the computed <u>, <v>, and <w> texel locations prior to sampling. One, two, or three components may be specified in the instruction; if fewer than three are specified, the remaining offset components are zero. A limited range of offset values are supported; the minimum and maximum <texelOffset> values are implementation-dependent and given by MIN_PROGRAM_TEXEL_OFFSET_NV and MAX_PROGRAM_TEXEL_OFFSET_NV, respectively.

A program will fail to load in the following circumstances (1) if the texture target specified in the instruction is 1D, ARRAY1D, SHADOW1D, or SHADOWARRAY1D, and the second or third component of the offset vector is non-zero, (2) if the texture target specified in the instruction is 2D, RECT, ARRAY2D, SHADOW2D, SHADOWRECT, or SHADOWARRAY2D, and the third component of the offset vector is non-zero, (3) if the texture target is CUBE or SHADOWCUBE, and any component of the offset vector is non-zero—texel offsets are not supported for cube map or buffer textures, or if any component of the offset vector is less than MIN_PROGRAM_TEXEL_OFFSET_NV or greater than MAX_PROGRAM_TEXEL_OFFSET_NV. Texel offsets are a new feature provided by unified ISA 200 and 300.

The texture used by TextureSample( ) is one of the textures bound to the texture image unit whose number is specified in the instruction according to the <texImageUnit> grammar rule. The texture target accessed is specified according to the <texTarget> grammar rule and TABLE 10F. Fixed-function texture enables are always ignored when determining the texture to access in a program.

TABLE 10F

| texTarget | Texture Type | s | t | r | layer | shadow |
|---|---|---|---|---|---|---|
| 1D | TEXTURE_1D | x | — | — | — | — |
| 2D | TEXTURE_2D | x | y | — | — | — |
| 3D | TEXTURE_3D | x | y | z | — | — |
| CUBE | TEXTURE_CUBE_MAP | x | y | z | — | — |
| RECT | TEXTURE_RECTANGLE_ARB | x | y | — | — | — |
| ARRAY1D | TEXTURE_1D_ARRAY_EXT | x | — | — | y | — |
| ARRAY2D | TEXTURE_2D_ARRAY_EXT | x | y | — | z | — |
| SHADOW1D | TEXTURE_1D | x | — | — | — | z |
| SHADOW2D | TEXTURE_2D | x | y | — | — | z |
| SHADOWRECT | TEXTURE_RECTANGLE_ARB | x | y | — | — | z |
| SHADOWCUBE | TEXTURE_CUBE_MAP | x | y | z | — | w |
| SHADOWARRAY1D | TEXTURE_1D_ARRAY_EXT | x | — | — | y | z |
| SHADOWARRAY2D | TEXTURE_2D_ARRAY_EXT | x | y | — | z | w |
| BUFFER | TEXTURE_BUFFER_EXT | <not supported> | | | | |

Texture types accessed for each of the <texTarget>, and coordinate mappings. The "SHADOW" and "ARRAY" targets are special pseudo-targets described below. The "coordinates used" column indicate the input values used for each coordinate of the texture lookup, the layer selector for array textures, and the reference value for texture comparisons. Buffer textures are not supported by normal texture lookup functions, but are supported by TXF and TXQ, described below.

Texture targets with "SHADOW" are used to access textures with a DEPTH_COMPONENT base internal format using depth comparisons. Results of a texture access are undefined under the following circumstances (1) if a "SHADOW" target is used, and the corresponding texture has a base internal format other than DEPTH_COMPONENT or a TEXTURE_COMPARE_MODE of NONE, or (2) if a non-"SHADOW" target is used, and the corresponding texture has a base internal format of DEPTH_COMPONENT and a TEXTURE_COMPARE_MODE other than NONE. If the texture being accessed is not complete (or cube complete for cubemap textures) no texture access is performed and the result is undefined.

A program will fail to load if it attempts to sample from multiple texture targets (including the SHADOW pseudo-targets) on the same texture image unit. For example, a program containing any two the following instructions will fail to load: TEX out, coord, texture[0], 1D; TEX out, coord, texture[0], 2D; TEX out, coord, texture[0], ARRAY2D; TEX out, coord, texture[0], SHADOW2D; and TEX out, coord, texture[0], 3D.

Additionally, multiple texture targets for a single texture image unit may not be used at the same time by the shader program. The error INVALID_OPERATION is generated by Begin, RasterPos, or any command that performs an implicit Begin if an enabled program accesses one texture target for a texture unit while another enabled program or fixed-function fragment processing accesses a different texture target for the same texture image unit.

Some texture instructions use standard methods to compute partial derivatives and/or the level-of-detail used to perform texture accesses. For fragment programs, the functions float_vec ComputePartialsX(float_vec coord); and float_vec ComputePartialsY(float_vec coord); compute approximate component-wise partial derivatives of the floating-point vector <coord> relative to the X and Y coordinates, respectively. For vertex and geometry programs, these functions always return (0,0,0,0). The function float ComputeLOD(float_vec ddx, float_vec ddy); maps partial derivative vectors <ddx> and <ddy> to ds/dx, dt/dx, dr/dx, ds/dy, dt/dy, and dr/dy and computes lambda_base(x,y).

The TXF instruction provides the ability to extract a single texel from a specified texture image using the function result_t_vec TexelFetch(uint_vec coord, int_vec offset). The extracted texel is converted to an (R,G,B,A) vector and the result vector is interpreted as floating-point, signed integer, or unsigned integer, according to the data type modifier of the instruction. If the internal format of the texture is not compatible with the instruction's data type modifier, the extracted texel value is undefined.

<coord> is a four-component signed integer vector used to identify the single texel accessed. The (i,j,k) coordinates of the texel and the layer used for array textures are extracted according to TABLE 10G. The level of detail accessed is obtained by adding the w component of <coord> to the base level (level_base). <offset> is a constant 3-component signed integer vector added to the texel coordinates prior to the texel fetch as described above. In addition to the restrictions described above, non-zero offset components are also not supported for BUFFER targets.

The texture used by TexelFetch( ) is specified by the image unit and target parameters provided in the instruction, as for TextureSample( ) above. Single texel fetches can not perform depth comparisons or access cubemaps. If a program contains a TXF instruction specifying one of the "SHADOW" or "CUBE" targets, it will fail to load. TABLE 10G lists mappings of texel fetch coordinates to texel locations.

TABLE 10G

| texTarget | supported | coordinates used | | | | |
|---|---|---|---|---|---|---|
| | | i | j | k | layer | lod |
| 1D | yes | x | — | — | — | w |
| 2D | yes | x | y | — | — | w |
| 3D | yes | x | y | z | — | w |
| CUBE | no | — | — | — | — | — |
| RECT | yes | x | y | — | — | w |
| ARRAY1D | yes | x | — | — | y | w |
| ARRAY2D | yes | x | y | — | z | w |
| SHADOW1D | no | — | — | — | — | — |
| SHADOW2D | no | — | — | — | — | — |
| SHADOWRECT | no | — | — | — | — | — |
| SHADOWCUBE | no | — | — | — | — | — |
| SHADOWARRAY1D | no | — | — | — | — | — |
| SHADOWARRAY2D | no | — | — | — | — | — |
| BUFFER | yes | x | — | — | — | — |

Single-texel fetches do not support LOD clamping or any texture wrap mode, and require a mipmapped minification filter to access any level of detail other than the base level. The results of the texel fetch are undefined (1) if the computed LOD is less than the texture's base level (level_base) or greater than the maximum level (level_max), (2) if the computed LOD is not the texture's base level and the texture's minification filter is NEAREST or LINEAR, (3) if the layer specified for array textures is negative or greater than the number of layers in the array texture, (4) if the texel at (i,j,k) coordinates refer to a border texel outside the defined extents of the specified LOD, where $i<-b\_s$, $j<-b\_s$, $k<-b\_s$, $i>=w\_s-b\_s$, $j>=h\_s-b\_s$, or $k>=d\_s-b\_s$, where the size parameters (w_s, h_s, d_s, and b_s) refer to the width, height, depth, and border size of the image, or (5) if the texture being accessed is not complete (or cube complete for cubemaps).

In addition to basic arithmetic, logical, and texture instructions, a number of flow control instructions are provided, which are described in detail in further herein. Programs can contain several types of instruction blocks: IF/ELSE/ENDIF blocks, REP/ENDREP blocks, and subroutine blocks. IF/ELSE/ENDIF blocks are a set of instructions beginning with an "IF" instruction, ending with an "ENDIF" instruction, and possibly containing an optional "ELSE" instruction. REP/ENDREP blocks are a set of instructions beginning with a "REP" instruction and ending with an "ENDREP" instruction. Subroutine blocks begin with an instruction label identifying the name of the subroutine and ending just before the next instruction label or the end of the program. Examples are shown in TABLE 10H.

TABLE 10H

```
MOVC CC, R0;
IF GT.x;
    MOV R0, R1; # executes if R0.x > 0
ELSE;
    MOV R0, R2; # executes if R0.x <= 0
ENDIF;
REP repCount;
ADD R0, R0, R1;
ENDREP;
    square: # subroutine to compute R0^2
MUL R0, R0, R0;
RET;
```

TABLE 10H-continued

```
main:
MOV R0, 9.0;
CAL square; # compute 9.0^2 in R0
```

IF/ELSE/ENDIF and REP/ENDREP blocks may be nested inside each other, and inside subroutines. In all cases, each instruction block must be terminated with the appropriate instruction (ENDIF for IF, ENDREP for REP). Nested instruction blocks must be wholly contained within a block—if a REP instruction is found between an IF and ELSE instruction, the corresponding ENDREP must also be present between the IF and ELSE.

Subroutines may not be nested inside IF/ELSE/ENDIF or REP/ENDREP blocks, or inside other subroutines. A program will fail to load if any instruction block is terminated by an incorrect instruction, is not terminated before the block containing it, or contains an instruction label.

IF/ELSE/ENDIF blocks evaluate a condition to determine which instructions to execute. If the condition is true, all instructions between the IF and ELSE are executed. If the condition is false, all instructions between the ELSE and ENDIF are executed. The ELSE instruction is optional. If the ELSE is omitted, all instructions between the IF and ENDIF are executed if the condition is true, or skipped if the condition is false. A limited amount of nesting is supported—a program will fail to load if an IF instruction is nested inside MAX_PROGRAM_IF_DEPTH_NV or more IF/ELSE/ENDIF blocks.

REP/ENDREP blocks are used to execute a sequence of instructions multiple times. The REP instruction includes an optional scalar operand to specify a loop count indicating the number of times the sequence of instructions should be repeated. If the loop count is omitted, the contents of a REP/ENDREP block will be repeated indefinitely until the loop is explicitly terminated. A limited amount of nesting is supported—a program will fail to load if a REP instruction is nested inside MAX_PROGRAM_LOOP_DEPTH_NV or more REP/ENDREP blocks.

Within a REP/ENDREP block, the CONT instruction can be used to terminate the current iteration of the loop by effectively jumping to the ENDREP instruction. The BRK instruction can be used to terminate the entire loop by effectively jumping to the instruction immediately following the ENDREP instruction. If CONT and BRK instructions are found inside multiply nested REP/ENDREP blocks, they apply to the innermost block. A program will fail to load if it includes a CONT or BRK instruction that is not contained inside a REP/ENDREP block.

A REP/ENDREP block without a specified loop count can result in an infinite loop. To prevent obvious infinite loops, a program will fail to load if it contains a REP/ENDREP block that contains neither a BRK instruction at the current nesting level or a RET instruction at any nesting level.

Subroutines are supported via the CAL and RET instructions. A subroutine block is identified by an instruction, which can be any valid identifier according to the <instLabel> grammar rule. The CAL instruction identifies a subroutine name to call according to the <instTarget> grammar rule. Instruction labels used in CAL instructions do not need to be defined in the program text that precedes the instruction, but a program will fail to load if it includes a CAL instruction that references an instruction label that is not defined anywhere in the program. When a CAL instruction is executed, it transfers control to the instruction immediately following the specified instruction label. Subsequent instructions in that subroutine are executed until a RET instruction is executed, or until program execution reaches another instruction label or the end of the program text. After the subroutine finishes, execution continues with the instruction immediately following the CAL instruction. When a RET instruction is issued, it will break out of any IF/ELSE/ENDIF or REP/ENDREP blocks that contain it.

Subroutines may call other subroutines before completing, up to an implementation-dependent maximum depth of MAX_PROGRAM_CALL_DEPTH_NV calls. Subroutines may call any subroutine in the program, including themselves, as long as the call depth limit is obeyed. The results of issuing a CAL instruction while MAX_PROGRAM_CALL_DEPTH subroutines have not completed has undefined results, including possible program termination.

Several flow control instructions include condition code tests. The IF instruction requires a condition test to determine what instructions are executed. The CONT, BRK, CAL, and RET instructions have an optional condition code test; if the test fails, the instructions are not executed. Condition code tests are specified by the <ccTest> grammar rule. The test is evaluated like the condition code write mask, and passes if and only if any of the four components passes.

If an instruction label named "main" is specified, GPU program execution begins with the instruction immediately following that label. Otherwise, it begins with the first instruction of the program. Instructions are executed in sequence until either a RET instruction is issued in the main subroutine or the end of the program text is reached.

Programs may specify a number of options to indicate that one or more extended language features are used by the program. All program options used by the program must be declared at the beginning of the program string. Each program option specified in a program string will modify the syntactic or semantic rules used to interpret the program and the execution environment used to execute the program. Features in program options not declared by the program are ignored, even if the option is otherwise supported by the unified ISA 200 and 300. Each option declaration consists of two tokens: the keyword "OPTION" and an identifier. The set of available options depends on the program type, and is enumerated in the specifications for each program type. Some program types may not provide any options.

Programs may include a number of declaration statements to specify characteristics of the program. Each declaration statement is followed by one or more arguments, separated by commas. The set of available declarations depends on the program type, and is enumerated in the specifications for each program type. Some program types may not provide declarations.

The following TABLES enumerate the set of instructions supported for shader programs. Some instructions allow the use of one of the three basic data type modifiers (floating point, signed integer, and unsigned integer). Unless otherwise mentioned: the result and all of the operands will be interpreted according to the specified data type, and if no data type modifier is specified, the instruction will operate as though a floating-point modifier ("F") were specified. Some instructions will override one or both of these rules.

TABLE 11A describes the ABS (Absolute value) assembly instruction that is included in unified ISA 200 and 300. The ABS instruction performs a component-wise absolute value operation on the single operand to yield a result vector.

TABLE 11A

```
tmp = VectorLoad(op0);
result.x = abs(tmp.x);
result.y = abs(tmp.y);
result.z = abs(tmp.z);
result.w = abs(tmp.w);
```

ABS supports all three data type modifiers. Taking the absolute value of an unsigned integer is not a useful operation, but is not illegal.

TABLE 11B describes the ADD (Addition) assembly instruction that is included in unified ISA 200 and 300. The ADD instruction performs a component-wise add of the two operands to yield a result vector. ADD supports all three data type modifiers.

TABLE 11B

```
tmp0 = VectorLoad(op0);
tmp1 = VectorLoad(op1);
result.x = tmp0.x + tmp1.x;
result.y = tmp0.y + tmp1.y;
result.z = tmp0.z + tmp1.z;
result.w = tmp0.w + tmp1.w;
```

TABLE 11C describes the AND assembly instruction that is included in unified ISA 200 and 300. The AND instruction performs a bitwise AND operation on the components of the two source vectors to yield a result vector.

TABLE 11C

```
tmp0 = VectorLoad(op0);
tmp1 = VectorLoad(op1);
result.x = tmp0.x & tmp1.x;
result.y = tmp0.y & tmp1.y;
result.z = tmp0.z & tmp1.z;
result.w = tmp0.w & tmp1.w;
```

AND supports only signed and unsigned integer data type modifiers. If no type modifier is specified, both operands and the result are treated as signed integers.

TABLE 11E lists pseudocode describing the operation of the BRK (Break out of loop) assembly instruction that is included in unified ISA 200 and 300. The BRK instruction conditionally transfers control to the instruction immediately following the next ENDREP instruction. A BRK instruction has no effect if the condition code test evaluates to FALSE.

TABLE 11E

```
if (TestCC(cc.c***) || TestCC(cc.*c**) ||
    TestCC(cc.**c*) || TestCC(cc.***c)) {
continue execution at instruction following the next ENDREP;
}
```

TABLE 11F lists pseudocode describing the operation of the CAL (Subroutine Call) assembly instruction that is included in unified ISA 200 and 300. The CAL instruction conditionally transfers control to the instruction following the label specified in the instruction. It also pushes a reference to the instruction immediately following the CAL instruction onto the call stack, where execution will continue after executing the matching RET instruction.

TABLE 11F

```
if (TestCC(cc.c***) || TestCC(cc.*c**) ||
    TestCC(cc.**c*) || TestCC(cc.***c)) {
```

TABLE 11F-continued

```
if (callStackDepth >= MAX_PROGRAM_CALL_DEPTH_NV) {
  // undefined results
} else {
  callStack[callStackDepth] = nextInstruction;
  callStackDepth++;
}
// continue execution at instruction following <instTarget>
} else {
// do nothing
}
```

In the pseudocode shown in TABLE 11F, <instTarget> is the label specified in the instruction matching the <branchLabel> grammar rule, <callStackDepth> is the current depth of the call stack, <callStack> is an array holding the call stack, and <nextInstruction> is a reference to the instruction immediately following the CAL instruction in the program string. If the call stack overflows, the results of the CAL instruction are undefined, and can result in immediate program termination.

An instruction label signifies the beginning of a new subroutine. Subroutines may not nest or overlap. If a CAL instruction is executed and subsequent program execution reaches an instruction label before a corresponding RET instruction is executed, the subroutine call returns immediately, as though an unconditional RET instruction were inserted immediately before the instruction label.

TABLE 11G describes the CEIL (Ceiling) assembly instruction that is included in unified ISA 200 and 300. The CEIL instruction loads a single vector operand and performs a component-wise ceiling operation to generate a result vector.

TABLE 11G

```
tmp = VectorLoad(op0);
iresult.x = ceil(tmp.x);
iresult.y = ceil(tmp.y);
iresult.z = ceil(tmp.z);
iresult.w = ceil(tmp.w);
```

The ceiling operation returns the nearest integer greater than or equal to the operand. For example ceil(−1.7)=−1.0, ceil(+1.0)=+1.0, and ceil(+3.7)=+4.0. CEIL supports all three data type modifiers. The single operand is always treated as a floating-point vector, but the result is written as a floating-point value, a signed integer, or an unsigned integer, as specified by the data type modifier. If a value cannot be exactly represented using the data type of the result (e.g., an overflow or writing a negative value to an unsigned integer), the result is undefined.

TABLE 11H describes the CMP (Compare) assembly instruction that is included in unified ISA 200 and 300. The CMP instruction performs a component-wise comparison of the first operand against zero, and copies the values of the second or third operands based on the results of the compare.

TABLE 11H

```
tmp0 = VectorLoad(op0);
tmp1 = VectorLoad(op1);
tmp2 = VectorLoad(op2);
result.x = (tmp0.x < 0) ? tmp1.x : tmp2.x;
result.y = (tmp0.y < 0) ? tmp1.y : tmp2.y;
result.z = (tmp0.z < 0) ? tmp1.z : tmp2.z;
result.w = (tmp0.w < 0) ? tmp1.w : tmp2.w;
```

CMP supports all three data type modifiers. CMP with an unsigned data type modifier is not a useful operation, but is not illegal.

TABLE 11I lists pseudo-code describing the operation of the CONT (Continue with Next Loop Iteration) assembly instruction that is included in unified ISA 200 and 300. The CONT instruction conditionally transfers control to the next ENDREP instruction. A CONT instruction has no effect if the condition code test evaluates to FALSE.

TABLE 11I

```
if (TestCC(cc.c***) || TestCC(cc.*c**) ||
    TestCC(cc.**c*) || TestCC(cc.***c)) {
  continue execution at the next ENDREP;
}
```

TABLE 11J describes the COS (Cosine with Reduction to [−PI,PI]) assembly instruction that is included in unified ISA 200 and 300. The COS instruction approximates the trigonometric cosine of the angle specified by the scalar operand and replicates it to all four components of the result vector. The angle is specified in radians and does not have to be in the range [−PI,PI].

TABLE 11J

```
tmp = ScalarLoad(op0);
result.x = ApproxCosine(tmp);
result.y = ApproxCosine(tmp);
result.z = ApproxCosine(tmp);
result.w = ApproxCosine(tmp);
```

COS supports only floating-point data type modifiers.

The DDX (Partial Derivative Relative to X) assembly instruction is included in unified ISA 200 and 300. The DDX instruction computes approximate partial derivatives of a vector operand with respect to the X window coordinate, and is only available to fragment programs. The DDY (Partial Derivative Relative to Y) assembly instruction is included in unified ISA 200 and 300. The DDY instruction computes approximate partial derivatives of a vector operand with respect to the Y window coordinate, and is only available to fragment programs.

TABLE 11K describes the DIV (Divide Vector Components by Scalar) assembly instruction that is included in unified ISA 200 and 300. The DIV instruction performs a component-wise divide of the first vector operand by the second scalar operand to produce a 4-component result vector.

TABLE 11K

```
tmp0 = VectorLoad(op0);
tmp1 = ScalarLoad(op1);
result.x = tmp0.x / tmp1;
result.y = tmp0.y / tmp1;
result.z = tmp0.z / tmp1;
result.w = tmp0.w / tmp1;
```

DIV supports all three data type modifiers. For floating-point division, this instruction is not guaranteed to produce results identical to a RCP/MUL instruction sequence. The results of a signed or unsigned integer division by zero are undefined.

TABLE 11L describes the DP2 (2-Component Dot Product) assembly instruction that is included in unified ISA 200 and 300. The DP2 instruction computes a two-component dot product of the two operands (using the first two components) and replicates the dot product to all four components of the result vector.

TABLE 11L

```
tmp0 = VectorLoad(op0);
tmp1 = VectorLoad(op1);
dot = (tmp0.x * tmp1.x) + (tmp0.y * tmp1.y);
result.x = dot;
result.y = dot;
result.z = dot;
result.w = dot;
```

DP2 supports only floating-point data type modifiers.

TABLE 11M describes the DP2A (2-Component Dot Product with Scalar Add) assembly instruction that is included in unified ISA 200 and 300. The DP2 instruction computes a two-component dot product of the two operands (using the first two components), adds the x component of the third operand, and replicates the result to all four components of the result vector.

TABLE 11M

```
tmp0 = VectorLoad(op0);
tmp1 = VectorLoad(op1);
tmp2 = VectorLoad(op2);
dot = (tmp0.x * tmp1.x) + (tmp0.y * tmp1.y) + tmp2.x;
result.x = dot;
result.y = dot;
result.z = dot;
result.w = dot;
```

DP2A supports only floating-point data type modifiers.

TABLE 11N describes the DP3 (3-Component Dot Product) assembly instruction that is included in unified ISA 200 and 300. The DP3 instruction computes a three-component dot product of the two operands (using the x, y, and z components) and replicates the dot product to all four components of the result vector.

TABLE 11N

```
tmp0 = VectorLoad(op0);
tmp1 = VectorLoad(op1);
dot = (tmp0.x * tmp1.x) + (tmp0.y * tmp1.y) + (tmp0.z * tmp1.z);
result.x = dot;
result.y = dot;
result.z = dot;
result.w = dot;
```

DP3 supports only floating-point data type modifiers.

TABLE 11O describes the DP4 (4-Component Dot Product) assembly instruction that is included in unified ISA 200 and 300. The DP4 instruction computes a four-component dot product of the two operands and replicates the dot product to all four components of the result vector.

TABLE 11O

```
tmp0 = VectorLoad(op0);
tmp1 = VectorLoad(op1):
dot = (tmp0.x * tmp1.x) + (tmp0.y * tmp1.y) +
      (tmp0.z * tmp1.z) + (tmp0.w * tmp1.w);
result.x = dot;
result.y = dot;
result.z = dot;
result.w = dot;
```

DP4 supports only floating-point data type modifiers.

TABLE 11P describes the DPH (Homogeneous Dot Product) assembly instruction that is included in unified ISA 200 and 300. The DPH instruction computes a three-component dot product of the two operands (using the x, y, and z components), adds the w component of the second operand, and replicates the sum to all four components of the result vector. This is equivalent to a four-component dot product where the w component of the first operand is forced to 1.0.

TABLE 11P

```
tmp0 = VectorLoad(op0);
tmp1 = VectorLoad(op1):
dot = (tmp0.x * tmp1.x) + (tmp0.y * tmp1.y) +
      (tmp0.z * tmp1.z) + tmp1.w;
result.x = dot;
result.y = dot;
result.z = dot;
result.w = dot;
```

DPH supports only floating-point data type modifiers.

TABLE 11Q lists pseudo-code that describes the exact behavior of the DST (Distance Vector) assembly instruction that is included in unified ISA 200 and 300. The DST instruction computes a distance vector from two specially-formatted operands. The first operand should be of the form [NA, $d^2$, $d^2$, NA] and the second operand should be of the form [NA, 1/d, NA, 1/d], where NA values are not relevant to the calculation and d is a vector length. If both vectors satisfy these conditions, the result vector will be of the form [1.0, d, $d^2$, 1/d].

TABLE 11Q

```
tmp0 = VectorLoad(op0);
tmp1 = VectorLoad(op1);
result.x = 1.0;
result.y = tmp0.y * tmp1.y;
result.z = tmp0.z;
result.w = tmp1.w;
```

Given an arbitrary vector, $d^2$ can be obtained using the DP3 instruction (using the same vector for both operands) and 1/d can be obtained from $d^2$ using the RSQ instruction. This distance vector is useful for per-vertex light attenuation calculations: a DP3 operation using the distance vector and an attenuation constants vector as operands will yield the attenuation factor. DST supports only floating-point data type modifiers.

An ELSE (Start of If Test Else Block) assembly instruction is included in unified ISA 200 and 300. The ELSE instruction signifies the end of the "execute if true" portion of an IF/ELSE/ENDIF block and the beginning of the "execute if false" portion. If the condition evaluated at the IF statement was TRUE, when a program reaches the ELSE statement, it has completed the entire "execute if true" portion of the IF/ELSE/ENDIF block. Execution will continue at the corresponding ENDIF instruction. If the condition evaluated at the IF statement was FALSE, program execution would skip over the entire "execute if true" portion of the IF/ELSE/ENDIF block, including the ELSE instruction.

An EMIT (Emit Vertex) assembly instruction is included in unified ISA 200 and 300. The EMIT instruction emits a new vertex to be added to the current output primitive generated by a geometry program, and is only available to geometry programs. See the NV_geometry_program4 specification for more details.

An ENDIF (End of If Test Block) assembly instruction is included in unified ISA 200 and 300. The ENDIF instruction signifies the end of an IF/ELSE/ENDIF block. It has no other effect on program execution.

An ENDPRIM (End of Primitive) assembly instruction is included in unified ISA 200 and 300. A geometry program can emit multiple primitives in a single invocation. The ENDPRIM instruction is used in a geometry program to signify the end of the current primitive and the beginning of a new primitive of the same type. It is only available to geometry programs.

An ENDREP (End of Repeat Block) assembly instruction is included in unified ISA 200 and 300. The ENDREP instruction specifies the end of a REP block. When used with in conjunction with a REP instruction with a loop count, ENDREP decrements the loop counter. If the decremented loop counter is greater than zero, ENDREP transfers control to the instruction immediately after the corresponding REP instruction. If the loop counter is less than or equal to zero, execution continues at the instruction following the ENDREP instruction. When used in conjunction with a REP instruction without loop count, ENDREP always transfers control to the instruction immediately after the REP instruction. An example use of the REP instruction is shown in pseudo-code listed in TABLE 11R.

TABLE 11R

```
if (REP instruction includes a loop count) {
LoopCount--;
if (LoopCount > 0) {
    continue execution at instruction following corresponding REP
    instruction;
}
} else {
continue execution at instruction following corresponding REP
    instruction;
}
```

TABLE 11S describes the EX2 (Exponential Base 2) assembly instruction that is included in unified ISA 200 and 300. The EX2 instruction approximates 2 raised to the power of the scalar operand and replicates the approximation to all four components of the result vector.

TABLE 11S

```
tmp = ScalarLoad(op0);
result.x = Approx2ToX(tmp);
result.y = Approx2ToX(tmp);
result.z = Approx2ToX(tmp);
result.w = Approx2ToX(tmp);
```

EX2 supports only floating-point data type modifiers.

TABLE 11T describes the FLR (Floor) assembly instruction that is included in unified ISA 200 and 300. The FLR instruction loads a single vector operand and performs a component-wise floor operation to generate a result vector.

TABLE 11T

```
tmp = VectorLoad(op0);
result.x = floor(tmp.x);
result.y = floor(tmp.y);
result.z = floor(tmp.z);
result.w = floor(tmp.w);
```

The floor operation returns the nearest integer less than or equal to the operand. For example floor(−1.7)=−2.0, floor(+1.0)=+1.0, and floor(+3.7)=+3.0. FLR supports all three data type modifiers. The single operand is always treated as a floating-point value, but the result is written as a floating-point value, a signed integer, or an unsigned integer, as specified by the data type modifier. If a value is not exactly representable using the data type of the result (e.g., an overflow or writing a negative value to an unsigned integer), the result is undefined.

TABLE 11U describes the FRC (Fraction) assembly instruction that is included in unified ISA 200 and 300. The FRC instruction extracts the fractional portion of each component of the operand to generate a result vector. The fractional portion of a component is defined as the result after subtracting off the floor of the component (see FLR), and is always in the range [0.0, 1.0). For negative values, the fractional portion is NOT the number written to the right of the decimal point—the fractional portion of −1.7 is not 0.7—it is 0.3. 0.3 is produced by subtracting the floor of −1.7 (−2.0) from −1.7.

TABLE 11U

```
tmp = VectorLoad(op0);
result.x = fraction(tmp.x);
result.y = fraction(tmp.y);
result.z = fraction(tmp.z);
result.w = fraction(tmp.w);
```

FRC supports only floating-point data type modifiers.

TABLE 11V describes the I2F (Integer to Float) assembly instruction that is included in unified ISA 200 and 300. The I2F instruction converts the components of an integer vector operand to floating-point to produce a floating-point result vector.

TABLE 11V

```
tmp = VectorLoad(op0);
result.x = (float)tmp.x;
result.y = (float)tmp.y;
result.z = (float)tmp.z;
result.w = (float)tmp.w;
```

I2F supports only signed and unsigned integer data type modifiers. The single operand is interpreted according to the data type modifier. If no data type modifier is specified, the operand is treated as a signed integer vector. The result is always written as a float.

An IF (Start of If Test Block) assembly instruction that is included in unified ISA 200 and 300. The IF instruction performs a condition code test to determine what instructions inside an IF/ELSE/ENDIF block are executed. If the test passes, execution continues at the instruction immediately following the IF instruction. If the test fails, IF transfers control to the instruction immediately following the corresponding ELSE instruction (if present) or the ENDIF instruction (if no ELSE is present).

Implementations may have a limited ability to nest IF blocks in any subroutine. If the number of IF/ENDIF blocks nested inside each other is MAX_PROGRAM_IF_DEPTH_NV or higher, a program will fail to compile. TABLE 11W lists example pseudo-code using the IF instruction.

TABLE 11W

```
// Evaluate the condition. If the condition is true, continue at the
// next instruction. Otherwise, continue at the
if (TestCC(cc.c***) || TestCC(cc.*c**) ||
    TestCC(cc.**c*) || TestCC(cc.***c)) {
continue execution at the next instruction;
} else if (IF block contains an ELSE statement) {
continue execution at instruction following corresponding ELSE;
} else {
continue execution at instruction following corresponding ENDIF;
}
```

Note that there is no run-time limit on the maximum overall depth of IF/ENDIF nesting. As long as each individual subroutine of the program obeys the static nesting limits, there will be no run-time errors in the program. When conventional assembly instructions are used, a program could terminate abnormally if it called a subroutine inside a very deeply nested set of IF/ENDIF blocks and the called subroutine also contained deeply nested IF/ENDIF blocks. Such an error could occur even if neither subroutine exceeded static limits.

A KIL (Kill Fragment) assembly instruction that is included in unified ISA 200 and 300. The KIL instruction conditionally kills a fragment, and is only available to fragment programs.

TABLE 11X describes the LG2 (Logarithm Base 2) assembly instruction that is included in unified ISA 200 and 300. The LG2 instruction approximates the base 2 logarithm of the scalar operand and replicates it to all four components of the result vector.

TABLE 11X

```
tmp = ScalarLoad(op0);
result.x = ApproxLog2(tmp);
result.y = ApproxLog2(tmp);
result.z = ApproxLog2(tmp);
result.w = ApproxLog2(tmp);
```

If the scalar operand is zero or negative, the result is undefined. LG2 supports only floating-point data type modifiers.

The LIT (Compute Lighting Coefficients) instruction accelerates lighting computations by computing lighting coefficients for ambient, diffuse, and specular light contributions. TABLE 11Y describes the LIT assembly instruction that is included in unified ISA 200 and 300. The "x" component of the single operand is assumed to hold a diffuse dot product (n dot VP_pli). The "y" component of the operand is assumed to hold a specular dot product (n dot h_i). The "w" component of the operand is assumed to hold the specular exponent of the material (s_rm), and is clamped to the range (−128, +128) exclusive.

The "x" component of the result vector receives the value that should be multiplied by the ambient light/material product (always 1.0). The "y" component of the result vector receives the value that should be multiplied by the diffuse light/material product (n dot VP_pli). The "z" component of the result vector receives the value that should be multiplied by the specular light/material product (f_i*(n dot h_i) A s_rm). The "w" component of the result is the constant 1.0.

Negative diffuse and specular dot products are clamped to 0.0, as is done in the standard per-vertex lighting operations. In addition, if the diffuse dot product is zero or negative, the specular coefficient is forced to zero.

TABLE 11Y

```
tmp = VectorLoad(op0);
if (tmp.x < 0) tmp.x = 0;
if (tmp.y < 0) tmp.y = 0;
if (tmp.w < −(128.0-epsilon)) tmp.w = −(128.0-epsilon);
else if (tmp.w > 128-epsilon) tmp.w = 128-epsilon;
result.x = 1.0;
result.y = tmp.x;
result.z = (tmp.x > 0) ? RoughApproxPower(tmp.y, tmp.w) : 0.0;
result.w = 1.0;
```

Since 0^0 is defined to be 1, RoughApproxPower(0.0, 0.0) will produce 1.0. LIT supports only floating-point data type modifiers.

TABLE 11Z describes the LRP (Linear Interpolation) assembly instruction that is included in unified ISA 200 and 300. The LRP instruction performs a component-wise linear interpolation between the second and third operands using the first operand as the blend factor.

TABLE 11Z

```
tmp0 = VectorLoad(op0);
tmp1 = VectorLoad(op1);
tmp2 = VectorLoad(op2);
result.x = tmp0.x * tmp1.x + (1 − tmp0.x) * tmp2.x;
result.y = tmp0.y * tmp1.y + (1 − tmp0.y) * tmp2.y;
result.z = tmp0.z * tmp1.z + (1 − tmp0.z) * tmp2.z;
result.w = tmp0.w * tmp1.w + (1 − tmp0.w) * tmp2.w;
```

LRP supports only floating-point data type modifiers.

TABLE 11AA describes the MAD (Multiple and Add) assembly instruction that is included in unified ISA 200 and 300. The MAD instruction performs a component-wise multiply of the first two operands, and then does a component-wise add of the product to the third operand to yield a result vector.

TABLE 11AA

```
tmp0 = VectorLoad(op0);
tmp1 = VectorLoad(op1);
tmp2 = VectorLoad(op2);
result.x = tmp0.x * tmp1.x + tmp2.x;
result.y = tmp0.y * tmp1.y + tmp2.y;
result.z = tmp0.z * tmp1.z + tmp2.z;
result.w = tmp0.w * tmp1.w + tmp2.w;
```

The multiplication and addition operations in this instruction are subject to the same rules as described for the MUL and ADD instructions. MAD supports all three data type modifiers.

TABLE 11BB describes the MAX (Maximum) assembly instruction that is included in unified ISA 200 and 300. The MAX instruction computes component-wise maximums of the values in the two operands to yield a result vector.

TABLE 11BB

```
tmp0 = VectorLoad(op0);
tmp1 = VectorLoad(op1);
result.x = (tmp0.x > tmp1.x) ? tmp0.x : tmp1.x;
result.y = (tmp0.y > tmp1.y) ? tmp0.y : tmp1.y;
result.z = (tmp0.z > tmp1.z) ? tmp0.z : tmp1.z;
result.w = (tmp0.w > tmp1.w) ? tmp0.w : tmp1.w;
```

MAX supports all three data type modifiers.

TABLE 11CC describes the MIN (Minimum) assembly instruction that is included in unified ISA 200 and 300. The MIN instruction computes component-wise minimums of the values in the two operands to yield a result vector.

TABLE 11CC

```
tmp0 = VectorLoad(op0);
tmp1 = VectorLoad(op1);
result.x = (tmp0.x > tmp1.x) ? tmp1.x : tmp0.x;
result.y = (tmp0.y > tmp1.y) ? tmp1.y : tmp0.y;
result.z = (tmp0.z > tmp1.z) ? tmp1.z : tmp0.z;
result.w = (tmp0.w > tmp1.w) ? tmp1.w : tmp0.w;
```

MIN supports all three data type modifiers.

TABLE 11DD describes the MOD (Modulus) assembly instruction that is included in unified ISA 200 and 300. The MOD instruction performs a component-wise modulus operation on the two operands to yield a result vector.

TABLE 11DD

```
tmp0 = VectorLoad(op0);
tmp1 = VectorLoad(op1);
result.x = tmp0.x % tmp1.x;
result.y = tmp0.y % tmp1.y;
result.z = tmp0.z % tmp1.z;
result.w = tmp0.w % tmp1.w;
```

MOD supports both signed and unsigned integer data type modifiers. If no data type modifier is specified, both operands and the result are treated as signed integers. A MOV (Move) assembly instruction is included in unified ISA 200 and 300. The MOV instruction copies the value of the operand to yield a result vector, e.g., result=VectorLoad(op0); MOV supports all three data type modifiers.

TABLE 11EE describes the MUL (Multiply) assembly instruction that is included in unified ISA 200 and 300. The MUL instruction performs a component-wise multiply of the two operands to yield a result vector.

TABLE 11EE

```
tmp0 = VectorLoad(op0);
tmp1 = VectorLoad(op1);
result.x = tmp0.x * tmp1.x;
result.y = tmp0.y * tmp1.y;
result.z = tmp0.z * tmp1.z;
result.w = tmp0.w * tmp1.w;
```

MUL supports all three data type modifiers. The MUL instruction additionally supports three special modifiers.

The "S24" and "U24" modifiers specify "fast" signed or unsigned integer multiplies of 24-bit quantities, respectively. The results of such multiplies are undefined if either operand is outside the range [−2^23,+2^23-1] for S24 or [0,2^24-1] for U24. If "S24" or "U24" is specified, the data type is implied and normal data type modifiers may not be provided.

The "HI" modifier specifies a 32-bit integer multiply that returns the 32 most significant bits of the 64-bit product. Integer multiplies without the "HI" modifier normally return the least significant bits of the product. If "HI" is specified, either of the "S" or "U" integer data type modifiers must also be specified. Note that if condition code updates are performed on integer multiplies, the overflow or carry flags are always cleared, even if the product overflowed. If it is necessary to determine if the results of an integer multiply overflowed, the MUL.HI instruction may be used.

TABLE 11FF describes the NOT (Bitwise Not) assembly instruction that is included in unified ISA 200 and 300. The NOT instruction performs a component-wise bitwise NOT operation on the source vector to produce a result vector.

TABLE 11FF

```
tmp = VectorLoad(op0);
tmp.x = ~tmp.x;
tmp.y = ~tmp.y;
tmp.z = ~tmp.z;
tmp.w = ~tmp.w;
```

NOT supports only integer data type modifiers. If no type modifier is specified, the operand and the result are treated as signed integers.

TABLE 11GG describes the NRM (Normalize 3-Component Vector) assembly instruction that is included in unified ISA 200 and 300. The NRM instruction normalizes the vector given by the x, y, and z components of the vector operand to produce the x, y, and z components of the result vector. The w component of the result is undefined.

TABLE 11GG

```
tmp = VectorLoad(op0);
scale = ApproxRSQ(tmp.x * tmp.x + tmp.y * tmp.y + tmp.z * tmp.z);
result.x = tmp.x * scale;
result.y = tmp.y * scale;
result.z = tmp.z * scale;
result.w = undefined;
```

NRM supports only floating-point data type modifiers.

TABLE 11HH describes the OR (Bitwise Or) assembly instruction that is included in unified ISA 200 and 300. The OR instruction performs a bitwise OR operation on the components of the two source vectors to yield a result vector.

TABLE 11HH

```
tmp0 = VectorLoad(op0);
tmp1 = VectorLoad(op1);
result.x = tmp0.x | tmp1.x;
result.y = tmp0.y | tmp1.y;
result.z = tmp0.z | tmp1.z;
result.w = tmp0.w | tmp1.w;
```

OR supports only integer data type modifiers. If no type modifier is specified, both operands and the result are treated as signed integers.

TABLE 11II describes the PK2H (Pack Two 16-bit Floats) assembly instruction that is included in unified ISA 200 and 300. The PK2H instruction converts the "x" and "y" components of the single floating-point vector operand into 16-bit floating-point format, packs the bit representation of these two floats into a 32-bit unsigned integer, and replicates that value to all four components of the result vector. The PK2H instruction can be reversed by the UP2H instruction below.

TABLE 11II

```
tmp0 = VectorLoad(op0);
/* result obtained by combining raw bits of tmp0.x, tmp0.y */
result.x = RawBits(tmp0.x) | (RawBits(tmp0.y) << 16);
result.y = RawBits(tmp0.x) | (RawBits(tmp0.y) << 16);
result.z = RawBits(tmp0.x) | (RawBits(tmp0.y) << 16);
result.w = RawBits(tmp0.x) | (RawBits(tmp0.y) << 16);
```

PK2H supports all three data type modifiers. The single operand is always treated as a floating-point value, but the result is written as a floating-point value, a signed integer, or an unsigned integer, as specified by the data type modifier. For integer results, the bits can be interpreted as described above. For floating-point result variables, the packed results do not constitute a meaningful floating-point variable and should only be used to feed future unpack instructions. A program will fail to load if it contains a PK2H instruction that writes its results to a variable declared as "SHORT".

TABLE 11JJ describes the PK2US (Pack Two Floats as Unsigned 16-bit) assembly instruction that is included in unified ISA 200 and 300. The PK2US instruction converts the "x" and "y" components of the single floating-point vector operand into a packed pair of 16-bit unsigned scalars. The scalars are represented in a bit pattern where all '0' bits corresponds to 0.0 and all '1' bits corresponds to 1.0. The bit representations of the two converted components are packed into a 32-bit unsigned integer, and that value is replicated to all four components of the result vector. The PK2US instruction can be reversed by the UP2US instruction below.

TABLE 11JJ

```
tmp0 = VectorLoad(op0);
if (tmp0.x < 0.0) tmp0.x = 0.0;
if (tmp0.x > 1.0) tmp0.x = 1.0;
if (tmp0.y < 0.0) tmp0.y = 0.0;
if (tmp0.y > 1.0) tmp0.y = 1.0;
us.x = round(65535.0 * tmp0.x); /* us is a ushort vector */
us.y = round(65535.0 * tmp0.y);
/* result obtained by combining raw bits of us. */
result.x = ((us.x) | (us.y << 16));
result.y = ((us.x) | (us.y << 16));
result.z = ((us.x) | (us.y << 16));
result.w = ((us.x) | (us.y << 16));
```

PK2US supports all three data type modifiers. The single operand is always treated as a floating-point value, but the result is written as a floating-point value, a signed integer, or an unsigned integer, as specified by the data type modifier. For integer result variables, the bits can be interpreted as described above. For floating-point result variables, the packed results do not constitute a meaningful floating-point variable and should only be used to feed future unpack instructions. A program will fail to load if it contains a PK2S instruction that writes its results to a variable declared as "SHORT".

TABLE 11 KK describes the PK2B (Pack Four Floats as Signed 8-bit) assembly instruction that is included in unified ISA 200 and 300. The PK4B instruction converts the four components of the single floating-point vector operand into 8-bit signed quantities. The signed quantities are represented in a bit pattern where all '0' bits corresponds to −128/127 and all '1' bits corresponds to +127/127. The bit representations of the four converted components are packed into a 32-bit unsigned integer, and that value is replicated to all four components of the result vector. The PK4B instruction can be reversed by the UP4B instruction below.

TABLE 11KK

```
tmp0 = VectorLoad(op0);
if (tmp0.x < −128/127) tmp0.x = −128/127;
if (tmp0.y < −128/127) tmp0.y = −128/127;
if (tmp0.z < −128/127) tmp0.z = −128/127;
if (tmp0.w < −128/127) tmp0.w = −128/127;
if (tmp0.x > +127/127) tmp0.x = +127/127;
if (tmp0.y > +127/127) tmp0.y = +127/127;
if (tmp0.z > +127/127) tmp0.z = +127/127;
if (tmp0.w > +127/127) tmp0.w = +127/127;
ub.x = round(127.0 * tmp0.x + 128.0); /* ub is a ubyte vector */
ub.y = round(127.0 * tmp0.y + 128.0);
ub.z = round(127.0 * tmp0.z + 128.0);
ub.w = round(127.0 * tmp0.w + 128.0);
/* result obtained by combining raw bits of ub. */
result.x = ((ub.x) | (ub.y << 8) | (ub.z << 16) | (ub.w << 24));
result.y = ((ub.x) | (ub.y << 8) | (ub.z << 16) | (ub.w << 24));
result.z = ((ub.x) | (ub.y << 8) | (ub.z << 16) | (ub.w << 24));
result.w = ((ub.x) | (ub.y << 8) | (ub.z << 16) | (ub.w << 24));
```

PK4B supports all three data type modifiers. The single operand is always treated as a floating-point value, but the result is written as a floating-point value, a signed integer, or an unsigned integer, as specified by the data type modifier. For integer result variables, the bits can be interpreted as described above. For floating-point result variables, the packed results do not constitute a meaningful floating-point variable and should only be used to feed future unpack instructions. A program will fail to load if it contains a PK4B instruction that writes its results to a variable declared as "SHORT".

TABLE 11LL describes the PK4UB (Pack Four Floats as Unsigned 8-bit) assembly instruction that is included in unified ISA 200 and 300. The PK4UB instruction converts the four components of the single floating-point vector operand into a packed grouping of 8-bit unsigned scalars. The scalars are represented in a bit pattern where all '0' bits corresponds to 0.0 and all '1' bits corresponds to 1.0. The bit representations of the four converted components are packed into a 32-bit unsigned integer, and that value is replicated to all four components of the result vector. The PK4UB instruction can be reversed by the UP4UB instruction below.

TABLE 11LL

```
tmp0 = VectorLoad(op0);
if (tmp0.x < 0.0) tmp0.x = 0.0;
if (tmp0.x > 1.0) tmp0.x = 1.0;
if (tmp0.y < 0.0) tmp0.y = 0.0;
if (tmp0.y > 1.0) tmp0.y = 1.0;
if (tmp0.z < 0.0) tmp0.z = 0.0;
if (tmp0.z > 1.0) tmp0.z = 1.0;
if (tmp0.w < 0.0) tmp0.w = 0.0;
if (tmp0.w > 1.0) tmp0.w = 1.0;
ub.x = round(255.0 * tmp0.x); /* ub is a ubyte vector */
ub.y = round(255.0 * tmp0.y);
ub.z = round(255.0 * tmp0.z);
ub.w = round(255.0 * tmp0.w);
/* result obtained by combining raw bits of ub. */
result.x = ((ub.x) | (ub.y << 8) | (ub.z << 16) | (ub.w << 24));
result.y = ((ub.x) | (ub.y << 8) | (ub.z << 16) | (ub.w << 24));
result.z = ((ub.x) | (ub.y << 8) | (ub.z << 16) | (ub.w << 24));
result.w = ((ub.x) | (ub.y << 8) | (ub.z << 16) | (ub.w << 24));
```

PK4UB supports all three data type modifiers. The single operand is always treated as a floating-point value, but the result is written as a floating-point value, a signed integer, or an unsigned integer, as specified by the data type modifier. For integer result variables, the bits can be interpreted as described above. For floating-point result variables, the packed results do not constitute a meaningful floating-point variable and should only be used to feed future unpack instructions. A program will fail to load if it contains a PK4UB instruction that writes its results to a variable declared as "SHORT".

TABLE 11MM describes the POW (Exponentiate) assembly instruction that is included in unified ISA 200 and 300. The POW instruction approximates the value of the first scalar operand raised to the power of the second scalar operand and replicates it to all four components of the result vector.

TABLE 11MM

```
tmp0 = ScalarLoad(op0);
tmp1 = ScalarLoad(op1);
result.x = ApproxPower(tmp0, tmp1);
result.y = ApproxPower(tmp0, tmp1);
result.z = ApproxPower(tmp0, tmp1);
result.w = ApproxPower(tmp0, tmp1);
```

The exponentiation approximation function may be implemented using the base 2 exponentiation and logarithm approximation operations in the EX2 and LG2 instructions. In particular, ApproxPower(a,b)=ApproxExp2 (b*ApproxLog2(a)). Note that a logarithm may be involved even for cases where the exponent is an integer. This means that it may not be possible to exponentiate correctly with a negative base. In contrast, it is possible in a "normal" mathematical formulation to raise negative numbers to integral powers (e.g., $(-3)^2==9$, and $(-0.5)^{-2}==4$). POW supports only floating-point data type modifiers.

TABLE 11NN describes the RCC (Reciprocal, clamped) assembly instruction that is included in unified ISA 200 and 300. The RCC instruction approximates the reciprocal of the scalar operand, clamps the result to one of two ranges, and replicates the clamped result to all four components of the result vector. If the approximated reciprocal is greater than 0.0, the result is clamped to the range [$2^{-64}$, $2^{+64}$]. If the approximate reciprocal is not greater than zero, the result is clamped to the range [$-2^{+64}$, $-2^{-64}$].

TABLE 11NN

```
tmp = ScalarLoad(op0);
result.x = ClampApproxReciprocal(tmp);
result.y = ClampApproxReciprocal(tmp);
result.z = ClampApproxReciprocal(tmp);
result.w = ClampApproxReciprocal(tmp);
```

RCC supports only floating-point data type modifiers.

TABLE 11OO describes the RCP (Reciprocal) assembly instruction that is included in unified ISA 200 and 300. The RCP instruction approximates the reciprocal of the scalar operand and replicates it to all four components of the result vector.

TABLE 11OO

```
tmp = ScalarLoad(op0);
result.x = ApproxReciprocal(tmp);
result.y = ApproxReciprocal(tmp);
result.z = ApproxReciprocal(tmp);
result.w = ApproxReciprocal(tmp);
```

RCP supports only floating-point data type modifiers.

A REP (Start of Repeat Block) assembly instruction is included in unified ISA 200 and 300. The REP instruction begins a REP/ENDREP block. The REP instruction supports an optional operand whose x component specifies the initial value for the loop count. The loop count indicates the number of times the instructions between the REP and corresponding ENDREP instruction will be executed. If the initial value of the loop count is not positive, the entire block is skipped and execution continues at the instruction following the corresponding ENDREP instruction. If the loop count is specified as a floating-point value, it is converted to the largest integer less than or equal to the specified value (i.e., taking its floor).

If no operand is provided to REP, the loop count is ignored and the corresponding ENDREP instruction unconditionally transfers control to the instruction immediately following the REP instruction. The only way to exit such a loop is with the BRK instruction. To prevent obvious infinite loops, a program that includes a REP/ENDREP block with no loop count will fail to compile unless it contains either a BRK instruction at the current nesting level or a RET instruction at any nesting level.

Implementations may have a limited ability to nest REP/ENDREP blocks. If the number of REP/ENDREP blocks nested inside each other is MAX_PROGRAM_LOOP_DEPTH_NV or higher, a program will fail to compile. TABLE 11PP lists pseudo-code for setting up a new nesting level.

TABLE 11PP

```
// Set up loop information for the new nesting level.
tmp = VectorLoad(op0);
LoopCount = floor(tmp.x);
if (LoopCount <= 0) {
continue execution at the corresponding ENDREP;
}
```

REP supports all three data type modifiers. The single operand is interpreted according to the data type modifier. Note that REP blocks support fully general looping; the specified loop count can be computed in the program itself. Additionally, there is no run-time limit on the maximum overall depth of REP/ENDREP nesting. As long as each individual subroutine of the program obeys the static nesting limits, there will be no run-time errors in the program. With conventional assembly instructions, a program could terminate abnormally if it called a subroutine inside a deeply nested set of REP/ENDREP blocks and the called subroutine also contained deeply nested REP/ENDREP blocks. Such an error could occur even if neither subroutine exceeded static limits.

A RET (Subroutine Return) assembly instruction is included in unified ISA 200 and 300. The RET instruction conditionally returns from a subroutine initiated by a CAL instruction by popping an instruction reference off the top of the call stack and transferring control to the referenced instruction. TABLE 11QQ lists pseudo-code that describes the operation of the RET instruction.

TABLE 11QQ

```
if (TestCC(cc.c***) || TestCC(cc.*c**) ||
   TestCC(cc.**c*) || TestCC(cc.***c)) {
if (callStackDepth <= 0) {
   // terminate program
} else {
   callStackDepth--;
   instruction = callStack[callStackDepth];
}
// continue execution at <instruction>
} else {
// do nothing
}
```

In the pseudocode shown in TABLE 11QQ, <callStackDepth> is the depth of the call stack, <callStack> is an array holding the call stack, and <instruction> is a reference to an instruction previously pushed onto the call stack. If the call stack is empty when RET executes, the program terminates normally.

TABLE 11RR describes the RFL (Reflection Vector) assembly instruction that is included in unified ISA 200 and 300. The RFL instruction computes the reflection of the second vector operand (the "direction" vector) about the vector specified by the first vector operand (the "axis" vector). Both operands are treated as 3D vectors (the w components are ignored). The result vector is another 3D vector (the "reflected direction" vector). The length of the result vector, ignoring rounding errors, should equal that of the second operand.

TABLE 11RR

```
axis = VectorLoad(op0);
direction = VectorLoad(op1);
tmp.w = (axis.x * axis.x + axis.y * axis.y + axis.z * axis.z);
tmp.x = (axis.x * direction.x + axis.y * direction.y +
   axis.z * direction.z);
tmp.x = 2.0 * tmp.x;
tmp.x = tmp.x / tmp.w;
result.x = tmp.x * axis.x - direction.x;
result.y = tmp.x * axis.y - direction.y;
result.z = tmp.x * axis.z - direction.z;
```

RFL supports only floating-point data type modifiers.

TABLE 11SS describes the ROUND (Round to Nearest Integer) assembly instruction that is included in unified ISA 200 and 300. The ROUND instruction loads a single vector operand and performs a component-wise round operation to generate a result vector.

TABLE 11SS

```
tmp = VectorLoad(op0);
result.x = round(tmp.x);
result.y = round(tmp.y);
result.z = round(tmp.z);
result.w = round(tmp.w);
```

The round operation returns the nearest integer to the operand. If the fractional portion of the operand is 0.5, round( ) selects the nearest even integer. For example round(−1.7)=−2.0, round(+1.0)=+1.0, and round(+3.7)=+4.0. ROUND supports all three data type modifiers. The single operand is always treated as a floating-point value, but the result is written as a floating-point value, a signed integer, or an unsigned integer, as specified by the data type modifier. If a value is not exactly representable using the data type of the result (e.g., an overflow or writing a negative value to an unsigned integer), the result is undefined.

TABLE 11TT describes the RSQ (Reciprocal Square Root) assembly instruction that is included in unified ISA 200 and 300. The RSQ instruction approximates the reciprocal of the square root of the scalar operand and replicates it to all four components of the result vector.

TABLE 11TT

```
tmp = ScalarLoad(op0);
result.x = ApproxRSQRT(tmp);
result.y = ApproxRSQRT(tmp);
result.z = ApproxRSQRT(tmp);
result.w = ApproxRSQRT(tmp);
```

If the operand is less than or equal to zero, the results of the instruction are undefined. RSQ supports only floating-point data type modifiers. Note that this instruction differs from a conventional RSQ instruction for vertex programs in that it does not implicitly take the absolute value of its operand. The 'abs' operator can be used to achieve equivalent semantics.

TABLE 11UU describes the SAD (Sum of Absolute Differences) assembly instruction that is included in unified ISA 200 and 300. The SAD instruction performs a component-wise difference of the first two integer operands (subtracting the second from the first), and then does a component-wise add of the absolute value of the difference to the third unsigned integer operand to yield an unsigned integer result vector.

TABLE 11UU

```
tmp0 = VectorLoad(op0);
tmp1 = VectorLoad(op1);
tmp2 = VectorLoad(op2);
result.x = abs(tmp0.x − tmp1.x) + tmp2.x;
result.y = abs(tmp0.y − tmp1.y) + tmp2.y;
result.z = abs(tmp0.z − tmp1.z) + tmp2.z;
result.w = abs(tmp0.w − tmp1.w) + tmp2.w;
```

SAD supports signed and unsigned integer data type modifiers. The first two operands are interpreted according to the data type modifier. The third operand and the result are always unsigned integers.

TABLE 11VV describes the SCS (Sine/Cosine without Reduction) assembly instruction that is included in unified ISA 200 and 300. The SCS instruction approximates the trigonometric sine and cosine of the angle specified by the scalar operand and places the cosine in the x component and the sine in the y component of the result vector. The z and w components of the result vector are undefined. The angle is specified in radians and must be in the range [−PI,PI].

TABLE 11VV

```
tmp = ScalarLoad(op0);
result.x = ApproxCosine(tmp);
result.y = ApproxSine(tmp);
```

If the scalar operand is not in the range [−PI,PI], the result vector is undefined. SCS supports only floating-point data type modifiers.

TABLE 11WW describes the SEQ (Set on Equal) assembly instruction that is included in unified ISA 200 and 300. The SEQ instruction performs a component-wise comparison of the two operands. Each component of the result vector returns a TRUE value (described below) if the corresponding component of the first operand is equal to that of the second, and a FALSE value otherwise.

TABLE 11WW

```
tmp0 = VectorLoad(op0);
tmp1 = VectorLoad(op1);
result.x = (tmp0.x == tmp1.x) ? TRUE : FALSE;
result.y = (tmp0.y == tmp1.y) ? TRUE : FALSE;
result.z = (tmp0.z == tmp1.z) ? TRUE : FALSE;
result.w = (tmp0.w == tmp1.w) ? TRUE : FALSE;
```

SEQ supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11XX describes the SFL (Set on False) assembly instruction that is included in unified ISA 200 and 300. The SFL instruction is a degenerate case of the other "Set on" instructions that sets all components of the result vector to a FALSE value (described below).

TABLE 11XX

```
result.x = FALSE;
result.y = FALSE;
result.z = FALSE;
result.w = FALSE;
```

SFL supports all data type modifiers. For floating-point data types, the FALSE value is 0.0. For signed and unsigned integer data types, the FALSE value is zero.

TABLE 11YY describes the SGE (Set on Greater Than or Equal) assembly instruction that is included in unified ISA 200 and 300. The SGE instruction performs a component-wise comparison of the two operands. Each component of the result vector returns a TRUE value (described below) if the corresponding component of the first operand is greater than or equal to that of the second, and a FALSE value otherwise.

TABLE 11YY

```
tmp0 = VectorLoad(op0);
tmp1 = VectorLoad(op1);
result.x = (tmp0.x >= tmp1.x) ? TRUE : FALSE;
result.y = (tmp0.y >= tmp1.y) ? TRUE : FALSE;
result.z = (tmp0.z >= tmp1.z) ? TRUE : FALSE;
result.w = (tmp0.w >= tmp1.w) ? TRUE : FALSE;
```

SGE supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11ZZ describes the SGT (Set on Greater Than) assembly instruction that is included in unified ISA 200 and 300. The SGT instruction performs a component-wise comparison of the two operands. Each component of the result vector returns a TRUE value (described below) if the corresponding component of the first operand is greater than that of the second, and a FALSE value otherwise.

TABLE 11ZZ

```
tmp0 = VectorLoad(op0);
tmp1 = VectorLoad(op1);
result.x = (tmp0.x > tmp1.x) ? TRUE : FALSE;
result.y = (tmp0.y > tmp1.y) ? TRUE : FALSE;
result.z = (tmp0.z > tmp1.z) ? TRUE : FALSE;
result.w = (tmp0.w > tmp1.w) ? TRUE : FALSE;
```

SGT supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11AAA describes the SHL (Shift Left) assembly instruction that is included in unified ISA 200 and 300. The SHL instruction performs a component-wise left shift of the bits of the first operand by the value of the second scalar operand to produce a result vector. The bits vacated during the shift operation are filled with zeroes.

TABLE 11AAA

```
tmp0 = VectorLoad(op0);
tmp1 = ScalarLoad(op1);
result.x = tmp0.x << tmp1;
result.y = tmp0.y << tmp1;
result.z = tmp0.z << tmp1;
result.w = tmp0.w << tmp1;
```

The results of a shift operation ("<<") are undefined if the value of the second operand is negative, or greater than or equal to the number of bits in the first operand. SHL supports both signed and unsigned integer data type modifiers. If no modifier is provided, the operands and the result are treated as signed integers.

TABLE 11BBB describes the SHR (Shift Right) assembly instruction that is included in unified ISA 200 and 300. The SHR instruction performs a component-wise right shift of the bits of the first operand by the value of the second scalar operand to produce a result vector. The bits vacated during shift operation are filled with zeros if the operand is non-negative and ones otherwise.

TABLE 11BBB

```
tmp0 = VectorLoad(op0);
tmp1 = ScalarLoad(op1);
result.x = tmp0.x >> tmp1;
result.y = tmp0.y >> tmp1;
result.z = tmp0.z >> tmp1;
result.w = tmp0.w >> tmp1;
```

The results of a shift operation (">>") are undefined if the value of the second operand is negative, or greater than or equal to the number of bits in the first operand. SHR supports both signed and unsigned integer data type modifiers. If no modifiers are provided, the operands and the result are treated as signed integers.

TABLE 11CCC describes the SIN (Sine with Reduction to [−PI,PI]) assembly instruction that is included in unified ISA 200 and 300. The SIN instruction approximates the trigonometric sine of the angle specified by the scalar operand and replicates it to all four components of the result vector. The angle is specified in radians and does not have to be in the range [−PI,PI].

TABLE 11CCC

```
tmp = ScalarLoad(op0);
result.x = ApproxSine(tmp);
result.y = ApproxSine(tmp);
result.z = ApproxSine(tmp);
result.w = ApproxSine(tmp);
```

SIN supports only floating-point data type modifiers.

TABLE 11DDD describes the SLE (Set on Less Than or Equal) assembly instruction that is included in unified ISA 200 and 300. The SLE instruction performs a component-wise comparison of the two operands. Each component of the result vector returns a TRUE value (described below) if the corresponding component of the first operand is less than or equal to that of the second, and a FALSE value otherwise.

TABLE 11DDD

```
tmp0 = VectorLoad(op0);
tmp1 = VectorLoad(op1);
result.x = (tmp0.x <= tmp1.x) ? TRUE : FALSE;
result.y = (tmp0.y <= tmp1.y) ? TRUE : FALSE;
result.z = (tmp0.z <= tmp1.z) ? TRUE : FALSE;
result.w = (tmp0.w <= tmp1.w) ? TRUE : FALSE;
```

SLE supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11EEE describes the SLT (Set on Less Than) assembly instruction that is included in unified ISA 200 and 300. The SLT instruction performs a component-wise comparison of the two operands. Each component of the result vector returns a TRUE value (described below) if the corresponding component of the first operand is less than that of the second, and a FALSE value otherwise.

TABLE 11EEE

```
tmp0 = VectorLoad(op0);
tmp1 = VectorLoad(op1);
result.x = (tmp0.x < tmp1.x) ? TRUE : FALSE;
result.y = (tmp0.y < tmp1.y) ? TRUE : FALSE;
result.z = (tmp0.z < tmp1.z) ? TRUE : FALSE;
result.w = (tmp0.w < tmp1.w) ? TRUE : FALSE;
```

SLT supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11FFF describes the SNE (Set on Not Equal) assembly instruction that is included in unified ISA 200 and 300. The SNE instruction performs a component-wise comparison of the two operands. Each component of the result vector returns a TRUE value (described below) if the corresponding component of the first operand is less than that of the second, and a FALSE value otherwise.

TABLE 11FFF tmp0 = VectorLoad(op0);
tmp1 = VectorLoad(op1);
result.x = (tmp0.x != tmp1.x) ? TRUE : FALSE;
result.y = (tmp0.y != tmp1.y) ? TRUE : FALSE;
result.z = (tmp0.z != tmp1.z) ? TRUE : FALSE;
result.w = (tmp0.w != tmp1.w) ? TRUE : FALSE;

SNE supports all data type modifiers. For floating-point data types, the TRUE value is 1.0 and the FALSE value is 0.0. For signed integer data types, the TRUE value is −1 and the FALSE value is 0. For unsigned integer data types, the TRUE value is the maximum integer value (all bits are ones) and the FALSE value is zero.

TABLE 11GGG describes the SSG (Set Sign) assembly instruction that is included in unified ISA 200 and 300. The SSG instruction generates a result vector containing the signs of each component of the single vector operand. Each component of the result vector is 1.0 if the corresponding component of the operand is greater than zero, 0.0 if the corresponding component of the operand is equal to zero, and −1.0 if the corresponding component of the operand is less than zero.

TABLE 11GGG tmp = VectorLoad(op0);
result.x = SetSign(tmp.x);
result.y = SetSign(tmp.y);
result.z = SetSign(tmp.z);
result.w = SetSign(tmp.w);

SSG supports only floating-point data type modifiers.

TABLE 11HHH describes the STR (Set on True) assembly instruction that is included in unified ISA 200 and 300. The STR instruction is a degenerate case of the other "Set on" instructions that sets all components of the result vector to a TRUE value (described below).

TABLE 11HHH result.x = TRUE;
result.y = TRUE;
result.z = TRUE;
result.w = TRUE;

STR supports all data type modifiers. For floating-point data types, the TRUE value is 1.0. For signed integer data types, the TRUE value is −1. For unsigned integer data types, the TRUE value is the maximum integer value (all bits are ones).

TABLE 11III describes the SUB (Subtract) assembly instruction that is included in unified ISA 200 and 300. The SUB instruction performs a component-wise subtraction of the second operand from the first to yield a result vector.

TABLE 11III tmp0 = VectorLoad(op0);
tmp1 = VectorLoad(op1);
result.x = tmp0.x − tmp1.x;
result.y = tmp0.y − tmp1.y;
result.z = tmp0.z − tmp1.z;
result.w = tmp0.w − tmp1.w;

SUB supports all three data type modifiers.

A SWZ (Extended Swizzle) assembly instruction is included in unified ISA 200 and 300. The SWZ instruction loads the single vector operand, and performs a swizzle operation more powerful than that provided for loading normal vector operands to yield an instruction vector. After the operand is loaded, the "x", "y", "z", and "w" components of the result vector are selected by the first, second, third, and fourth matches of the <extSwizComp> pattern in the <extendedSwizzle> rule.

A result component can be selected from any of the four components of the operand or the constants 0.0 and 1.0. The result component can also be optionally negated. The following pseudo-code listed in TABLE 11JJJ describes the component selection method. "operand" refers to the vector operand, "select" is an enumerant where the values ZERO, ONE, X, Y, Z, and W correspond to the <extSwizSel> rule matching "0", "1", "x", "y", "z", and "w", respectively. "negate" is TRUE if and only if the <optionalSign> rule in <extSwizComp> matches "−".

TABLE 11JJJ float ExtSwizComponent(floatVec operand, enum select, boolean negate)
{
   float result;
   switch (select) {
   case ZERO: result = 0.0; break;
   case ONE: result = 1.0; break;
   case X: result = operand.x; break;
   case Y: result = operand.y; break;
   case Z: result = operand.z; break;
   case W: result = operand.w; break;
   }
   if (negate) {
   result = −result;
   }
   return result;
}

The entire extended swizzle operation is then defined using the pseudo-code shown in TABLE 11KKK.

TABLE 11KKK tmp = VectorLoad(op0);
result.x = ExtSwizComponent(tmp, xSelect, xNegate);
result.y = ExtSwizComponent(tmp, ySelect, yNegate);
result.z = ExtSwizComponent(tmp, zSelect, zNegate);
result.w = ExtSwizComponent(tmp, wSelect, wNegate);

"xSelect", "xNegate", "ySelect", "yNegate", "zSelect", "zNegate", "wSelect", and "wNegate" correspond to the "select" and "negate" values above for the four <extSwizComp> matches. Since this instruction allows for component selection and negation for each individual component, the grammar does not allow the use of the normal swizzle and negation operations allowed for vector operands in other instructions. SWZ supports only floating-point data type modifiers.

TABLE 11LLL describes the TEX (Texture Sample) assembly instruction that is included in unified ISA 200 and 300. The TEX instruction takes the four components of a single floating-point source vector and performs a filtered texture access. The returned (R,G,B,A) value is written to the floating-point result vector. Partial derivatives and the level of detail are computed automatically.

TABLE 11LLL

```
tmp = VectorLoad(op0);
ddx = ComputePartialsX(tmp);
ddy = ComputePartialsY(tmp);
lambda = ComputeLOD(ddx, ddy);
result = TextureSample(tmp, lambda, ddx, ddy, texelOffset);
```

TEX supports all three data type modifiers. The single operand is always treated as a floating-point vector; the results are interpreted according to the data type modifier.

TABLE 11MMM describes the TRUNC (Truncate, round toward zero) assembly instruction that is included in unified ISA 200 and 300. The TRUNC instruction loads a single vector operand and performs a component-wise truncate operation to generate a result vector.

TABLE 11MMM

```
tmp = VectorLoad(op0);
result.x = trunc(tmp.x);
result.y = trunc(tmp.y);
result.z = trunc(tmp.z);
result.w = trunc(tmp.w);
```

The truncate operation returns the nearest integer to zero smaller in magnitude than the operand. For example trunc(−1.7)=−1.0, trunc(+1.0)=+1.0, and trunc(+3.7)=+3.0. TRUNC supports all three data type modifiers. The single operand is always treated as a floating-point value, but the result is written as a floating-point value, a signed integer, or an unsigned integer, as specified by the data type modifier. If a value is not exactly representable using the data type of the result (e.g., an overflow or writing a negative value to an unsigned integer), the result is undefined.

TABLE 11NNN describes the TXB (Texture Sample with Bias) assembly instruction that is included in unified ISA 200 and 300. The TXB instruction takes the four components of a single floating-point source vector and performs a filtered texture access. The returned (R,G,B,A) value is written to the floating-point result vector. Partial derivatives and the level of detail are computed automatically, but the fourth component of the source vector is added to the computed LOD prior to sampling.

TABLE 11NNN

```
tmp = VectorLoad(op0);
ddx = ComputePartialsX(tmp);
ddy = ComputePartialsY(tmp);
lambda = ComputeLOD(ddx, ddy);
result = TextureSample(tmp, lambda + tmp.w, ddx, ddy, texelOffset);
```

The single source vector in the TXB instruction does not have enough coordinates to specify a lookup into a two-dimensional array texture or cube map texture with both an LOD bias and an explicit reference value for depth comparison. A program will fail to load if it contains a TXB instruction with a target of SHADOWCUBE or SHADOWARRAY2D. TXB supports all three data type modifiers. The single operand is always treated as a floating-point vector; the results are interpreted according to the data type modifier.

TABLE 11OOO describes the TXD (Texture Sample with Partials) assembly instruction that is included in unified ISA 200 and 300. The TXD instruction takes the four components of the first floating-point source vector and performs a filtered texture access. The returned (R,G,B,A) value is written to the floating-point result vector. The partial derivatives of the texture coordinates with respect to X and Y are specified by the second and third floating-point source vectors. The level of detail is computed automatically using the provided partial derivatives. Note that for cube map texture targets, the provided partial derivatives are in the coordinate system used before texture coordinates are projected onto the appropriate cube face. The partial derivatives of the post-projection texture coordinates, which are used for level-of-detail and anisotropic filtering calculations, are derived from the original coordinates and partial derivatives in an implementation-dependent manner.

TABLE 11OOO

```
tmp0 = VectorLoad(op0);
tmp1 = VectorLoad(op1);
tmp2 = VectorLoad(op2);
lambda = ComputeLOD(tmp1, tmp2);
result = TextureSample(tmp0, lambda, tmp1, tmp2, texelOffset);
```

TXD supports all three data type modifiers. All three operands are always treated as floating-point vectors; the results are interpreted according to the data type modifier.

TABLE 11PPP describes the TXF (Texel Fetch) assembly instruction that is included in unified ISA 200 and 300. The TXF instruction takes the four components of a single signed integer source vector and performs a single texel fetch. The first three components provide the <i>, <j>, and <k> values for the texel fetch, and the fourth component is used to determine the level of detail (LOD) to access. The returned (R,G,B,A) value is written to the floating-point result vector. Partial derivatives are irrelevant for single texel fetches.

TABLE 11PPP

```
tmp = VectorLoad(op0);
result = TexelFetch(tmp, texelOffset);
```

TXF supports all three data type modifiers. The single vector operand is treated as a signed integer vector; the results are interpreted according to the data type modifier.

TABLE 11QQQ describes the TXL (Texture Sample with LOD) assembly instruction that is included in unified ISA 200 and 300. The TXL instruction takes the four components of a single floating-point source vector and performs a filtered texture access. The returned (R,G,B,A) value is written to the floating-point result vector. The level of detail is taken from the fourth component of the source vector. Partial derivatives are not computed by the TXL instruction and anisotropic filtering is not performed.

TABLE 11QQQ

```
tmp = VectorLoad(op0);
ddx = (0,0,0);
ddy = (0,0,0);
result = TextureSample(tmp, tmp.w, ddx, ddy, texelOffset);
```

The single source vector in the TXL instruction does not have enough coordinates to specify a lookup into a 2D array or cube map texture with both an explicit LOD and a reference value for depth comparison. A program will fail to load if it contains a TXL instruction with a target of SHADOWCUBE or SHADOWARRAY2D. TXL supports all three data type modifiers. The single vector operand is treated as a floating-point vector; the results are interpreted according to the data type modifier.

TABLE 11RRR describes the TXP (Texture Sample with Projection) assembly instruction that is included in unified ISA 200 and 300. The TXP instruction divides the first three components of its single floating-point source vector by its fourth component, maps the results to s, t, and r, and performs a filtered texture access. The returned (R,G,B,A) value is written to the floating-point result vector. Partial derivatives and the level of detail are computed automatically.

TABLE 11RRR

```
tmp0 = VectorLoad(op0);
tmp0.x = tmp0.x / tmp0.w;
tmp0.y = tmp0.y / tmp0.w;
tmp0.z = tmp0.z / tmp0.w;
ddx = ComputePartialsX(tmp);
ddy = ComputePartialsY(tmp);
lambda = ComputeLOD(ddx, ddy);
result = TextureSample(tmp, lambda, ddx, ddy, texelOffset);
```

The single source vector in the TXP instruction does not have enough coordinates to specify a lookup into a 2D array or cube map texture with both a Q coordinate and an explicit reference value for depth comparison. A program will fail to load if it contains a TXP instruction with a target of SHADOWCUBE or SHADOWARRAY2D. TXP supports all three data type modifiers. The single vector operand is treated as a floating-point vector; the results are interpreted according to the data type modifier.

TABLE 11SSS describes the TXQ (Texture Size Query) assembly instruction that is included in unified ISA 200 and 300. The TXQ instruction takes the first component of the single integer vector operand, adds the number of the base level of the specified texture to determine a texture image level, and returns an integer result vector containing the size of the image at that level of the texture.

For one-dimensional and one-dimensional array textures, the "x" component of the result vector is filled with the width of the image(s). For two-dimensional, rectangle, cube map, and two-dimensional array textures, the "x" and "y" components are filled with the width and height of the image(s). For three-dimensional textures, the "x", "y", and "z" components are filled with the width, height, and depth of the image. Additionally, the number of layers in an array texture is returned in the "y" component of the result for one-dimensional array textures or the "z" component for two-dimensional array textures. All other components of the result vector is undefined. For the purposes of this instruction, the width, height, and depth of a texture do NOT include any border.

TABLE 11SSS

```
tmp0 = VectorLoad(op0);
tmp0.x = tmp0.x + texture[op1].target[op2].base_level;
result.x = texture[op1].target[op2].level[tmp0.x].width;
result.y = texture[op1].target[op2].level[tmp0.x].height;
result.z = texture[op1].target[op2].level[tmp0.x].depth;
```

If the level computed by adding the operand to the base level of the texture is less than the base level number or greater than the maximum level number, the results are undefined. TXQ supports no data type modifiers; the scalar operand and the result vector are both interpreted as signed integers.

TABLE 11TTT describes the UP2H (Unpack Two 16-bit Floats) assembly instruction that is included in unified ISA 200 and 300. The UP2H instruction unpacks two 16-bit floats stored together in a 32-bit scalar operand. The first 16-bit float (stored in the 16 least significant bits) is written into the "x" and "z" components of the result vector; the second is written into the "y" and "w" components of the result vector. This operation undoes the type conversion and packing performed by the PK2H instruction.

TABLE 11TTT

```
tmp = ScalarLoad(op0);
result.x = (fp16) (RawBits(tmp) & 0xFFFF);
result.y = (fp16) ((RawBits(tmp) >> 16) & 0xFFFF);
result.z = (fp16) (RawBits(tmp) & 0xFFFF);
result.w = (fp16) ((RawBits(tmp) >> 16) & 0xFFFF);
```

UP2H supports all three data type modifiers. The single operand is read as a floating-point value, a signed integer, or an unsigned integer, as specified by the data type modifier; the 32 least significant bits of the encoding are used for unpacking. For floating-point operand variables, it is expected (but not required) that the operand was produced by a previous pack instruction. The result is always written as a floating-point vector. A program will fail to load if it contains a UP2H instruction whose operand is a variable declared as "SHORT".

TABLE 11UUU describes the UP2US (Unpack Two Unsigned 16-bit

Integers) assembly instruction that is included in unified ISA 200 and 300. The UP2US instruction unpacks two 16-bit unsigned values packed together in a 32-bit scalar operand. The unsigned quantities are encoded where a bit pattern of all '0' bits corresponds to 0.0 and a pattern of all '1' bits corresponds to 1.0. The "x" and "z" components of the result vector are obtained from the 16 least significant bits of the operand; the "y" and "w" components are obtained from the 16 most significant bits. This operation undoes the type conversion and packing performed by the PK2US instruction.

TABLE 11UUU

```
tmp = ScalarLoad(op0);
result.x = ((RawBits(tmp) >> 0) & 0xFFFF) / 65535.0;
result.y = ((RawBits(tmp) >> 16) & 0xFFFF) / 65535.0;
result.z = ((RawBits(tmp) >> 0) & 0xFFFF) / 65535.0;
result.w = ((RawBits(tmp) >> 16) & 0xFFFF) / 65535.0;
```

UP2US supports all three data type modifiers. The single operand is read as a floating-point value, a signed integer, or an unsigned integer, as specified by the data type modifier; the 32 least significant bits of the encoding are used for unpacking. For floating-point operand variables, it is expected (but not required) that the operand was produced by a previous pack instruction. The result is always written as a floating-point vector. A shader program will fail to load if it contains a UP2S instruction whose operand is a variable declared as "SHORT".

TABLE 11VVV describes the UP4B (Unpack Four Signed 8-bit Integers) assembly instruction that is included in unified ISA 200 and 300. The UP4B instruction unpacks four 8-bit signed values packed together in a 32-bit scalar operand. The signed quantities are encoded where a bit pattern of all '0' bits corresponds to −128/127 and a pattern of all '1' bits corresponds to +127/127. The "x" component of the result vector is the converted value corresponding to the 8 least significant bits of the operand; the "w" component corresponds to the 8 most significant bits. This operation undoes the type conversion and packing performed by the PK4B instruction.

TABLE 11VVV

```
tmp = ScalarLoad(op0);
result.x = (((RawBits(tmp) >> 0) & 0xFF) - 128) / 127.0;
result.y = (((RawBits(tmp) >> 8) & 0xFF) - 128) / 127.0;
```

TABLE 11VVV-continued

```
result.z = (((RawBits(tmp) >> 16) & 0xFF) - 128) / 127.0;
result.w = (((RawBits(tmp) >> 24) & 0xFF) - 128) / 127.0;
```

UP2B supports all three data type modifiers. The single operand is read as a floating-point value, a signed integer, or an unsigned integer, as specified by the data type modifier; the 32 least significant bits of the encoding are used for unpacking. For floating-point operand variables, it is expected (but not required) that the operand was produced by a previous pack instruction. The result is always written as a floating-point vector. A program will fail to load if it contains a UP4B instruction whose operand is a variable declared as "SHORT".

TABLE 11WWW describes the UP4UB (Unpack Four Unsigned 8-bit Integers) assembly instruction that is included in unified ISA 200 and 300. The UP4UB instruction unpacks four 8-bit unsigned values packed together in a 32-bit scalar operand. The unsigned quantities are encoded where a bit pattern of all '0' bits corresponds to 0.0 and a pattern of all '1' bits corresponds to 1.0. The "x" component of the result vector is obtained from the 8 least significant bits of the operand; the "w" component is obtained from the 8 most significant bits. This operation undoes the type conversion and packing performed by the PK4UB instruction.

TABLE 11WWW

```
tmp = ScalarLoad(op0);
result.x = ((RawBits(tmp) >> 0) & 0xFF) / 255.0;
result.y = ((RawBits(tmp) >> 8) & 0xFF) / 255.0;
result.z = ((RawBits(tmp) >> 16) & 0xFF) / 255.0;
result.w = ((RawBits(tmp) >> 24) & 0xFF) / 255.0;
```

UP4UB supports all three data type modifiers. The single operand is read as a floating-point value, a signed integer, or an unsigned integer, as specified by the data type modifier; the 32 least significant bits of the encoding are used for unpacking. For floating-point operand variables, it is expected (but not required) that the operand was produced by a previous pack instruction. The result is always written as a floating-point vector. A program will fail to load if it contains a UP4UB instruction whose operand is a variable declared as "SHORT".

TABLE 11XXX describes the X2D (2D Coordinate Transformation) assembly instruction that is included in unified ISA 200 and 300. The X2D instruction multiplies the 2D offset vector specified by the "x" and "y" components of the second vector operand by the 2×2 matrix specified by the four components of the third vector operand, and adds the transformed offset vector to the 2D vector specified by the "x" and "y" components of the first vector operand. The first component of the sum is written to the "x" and "z" components of the result; the second component is written to the "y" and "w" components of the result.

TABLE 11XXX

```
tmp0 = VectorLoad(op0);
tmp1 = VectorLoad(op1);
tmp2 = VectorLoad(op2);
result.x = tmp0.x + tmp1.x * tmp2.x + tmp1.y * tmp2.y;
result.y = tmp0.y + tmp1.x * tmp2.z + tmp1.y * tmp2.w;
result.z = tmp0.x + tmp1.x * tmp2.x + tmp1.y * tmp2.y;
result.w = tmp0.y + tmp1.x * tmp2.z + tmp1.y * tmp2.w;
```

X2D supports only floating-point data type modifiers.

TABLE 11YYY describes the XOR (Exclusive OR) assembly instruction that is included in unified ISA 200 and 300. The XOR instruction performs a bitwise XOR operation on the components of the two source vectors to yield a result vector.

TABLE 11YYY

```
tmp0 = VectorLoad(op0);
tmp1 = VectorLoad(op1);
result.x = tmp0.x ^ tmp1.x;
result.y = tmp0.y ^ tmp1.y;
result.z = tmp0.z ^ tmp1.z;
result.w = tmp0.w ^ tmp1.w;
```

XOR supports only integer data type modifiers. If no type modifier is specified, both operands and the result are treated as signed integers.

TABLE 11ZZZ describes the XPD (Cross Product) assembly instruction that is included in unified ISA 200 and 300. The XPD instruction computes the cross product using the first three components of its two vector operands to generate the x, y, and z components of the result vector. The w component of the result vector is undefined.

TABLE 11ZZZ

```
tmp0 = VectorLoad(op0);
tmp1 = VectorLoad(op1);
result.x = tmp0.y * tmp1.z – tmp0.z * tmp1.y;
result.y = tmp0.z * tmp1.x – tmp0.x * tmp1.z;
result.z = tmp0.x * tmp1.y – tmp0.y * tmp1.x;
```

XPD supports only floating-point data type modifiers.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer device, comprising:
   a processing unit having a vertex execution unit configured to execute vertex shader microcode and a fragment execution unit configured to execute fragment shader microcode;
   and a software program configured to:
      receive a shader program comprised of both assembly instructions configured to be executed by a specific target execution unit within the processing unit and a set of assembly instructions from a unified shader program assembly instruction set that is configured to be executed by each target execution unit within the processing unit, including a vertex execution unit and a fragment execution unit,
      determine, based on a tag in the shader program, the specific target execution unit within the processing unit that is supposed to execute the shader program, wherein the specific target execution unit comprises either the vertex execution unit or the fragment execution unit; and
      convert, by a single unified microcode assembler regardless of whether the shader program relates to vertex shading or fragment shading, the shader program into shader microcode for execution by the specific target execution unit within the processing unit.

2. The computer device of claim 1, wherein the software program is a device driver that is further configured to:
   determine a runtime mode is specified for the converting of the shader program; and
   transmit the shader microcode to the target execution unit as the shader program is converted into the shader microcode.

3. The computer device of claim 1, wherein the software program is a microcode assembler that is further configured to:
   determine an off-line mode is specified for the converting of the shader program; and
   store the shader microcode as an executable file for execution by the target execution unit at a later time.

4. The computer device of claim 1, further comprising:
   a fixed function unit coupled to the fragment execution unit and configured to interface with the fragment execution unit; and
   domain specific code within the shader program that is configured to match input or output semantics of the fixed function unit.

5. The computer device of claim 1, wherein the unified shader program assembly instruction set includes a flow control instruction that the target execution unit is configured to execute only when a runtime condition code test specified for the flow control instruction passes.

6. The computer device of claim 1, wherein the unified shader program assembly instruction set includes a repeat instruction configured to use a repeat count that can be computed by the target execution unit when the shader microcode is executed.

7. The computer device of claim 1, wherein the unified shader program assembly instruction set includes a repeat instruction that configures the target execution unit to execute a sequence of assembly instructions multiple times without using an upper bound specifying a maximum number of times the sequence of assembly instructions will be executed.

8. The computer device of claim 1, wherein the unified shader program assembly instruction set includes an instruction that configures the target execution unit to fetch a single texel from a texture map using four components of a single signed integer source vector as an address, wherein three of the four components provide texture coordinates and a remaining component of the four components is used to determine a texture mipmap level of detail (LOD).

9. The computer device of claim 1, wherein the unified shader program assembly instruction set includes an instruction that configures the target execution unit to return a size of a specified texture mipmap level of detail (LOD) by summing a component of an operand and a number of a base level of detail to compute a texture image level that is returned as the size of the specified texture mipmap LOD.

10. The computer device of claim 1, wherein the unified shader program assembly instruction set includes a group of instructions that configure the target execution unit to interpret operands according to a data type modifier that specifies a floating point data type, a signed integer data type, or an unsigned integer data type.

11. The computer device of claim 1, wherein the unified shader program assembly instruction set includes a group of instructions that configure the target execution unit to perform bitwise logical operations on a component of two source vectors to yield a result vector according to a specified data type modifier.

12. The computer device of claim 1, wherein the unified shader program assembly instruction set includes a group of instructions that configure the target execution unit to perform component-wise minimum and maximum operations for each component of two operands to yield a result vector according to a data type modifier that specifies a floating point data type, a signed integer data type, or an unsigned integer data type.

13. The computer device of claim 1, wherein the unified shader program assembly instruction set includes a group of instructions that configure the target execution unit to load a single vector operand and perform a data type conversion operation to generate a result vector according to a data type modifier that specifies a floating point data type, a signed integer data type, or an unsigned integer data type.

14. The computer device of claim 1, wherein the unified shader program assembly instruction set includes a group of instructions that configure the target execution unit to read a texel value from a texture map and return the texel value as a signed or an unsigned integer value.

15. The computer device of claim 1, wherein the unified shader program assembly instruction set includes an instruction that is that configures the target execution unit to write flags that correspond to a sign flag (SF), a zero flag (ZF), an overflow flag (OF), and a carry flag (CF) and are stored in a condition code register.

16. The computer device of claim 1, wherein the unified shader program assembly instruction set includes an instruction that configures the target execution unit to read texels from a one-dimensional or two-dimensional array texture by using three components of a four-component floating-point vector operand as (s,t,r) texture coordinates and computing a layer of the array by rounding a fourth floating-point component of the four-component floating-point vector operand to a nearest integer and clamping the nearest integer to a range $[0, <n>-1]$, where $<n>$ is a number of layers in the array.

17. The computer device of claim 1, wherein the unified shader program assembly instruction set includes instruction modifiers that are used to specify signed or unsigned integer multiplies of 24-bit quantities for a multiply instruction.

18. The computer device of claim 1, wherein the unified shader program assembly instruction set includes an instruction modifier that is used to specify that 32 most significant bits of a 64-bit product produced by the target execution unit for a multiply instruction are returned instead of 32 least significant bits of the 64-bit product.

19. The computer device of claim 1, wherein the unified shader program assembly instruction set includes an instruction that configures the target execution unit to add a constant 3-component signed integer vector specified as an offset operand to computed texel locations and read a texel value.

20. The computer device of claim 1, wherein the unified shader program assembly instruction set includes a shader program parameter buffer binding that accesses a bound buffer object as an array of four component vectors with a single word of integer or floating-point values corresponding to a four component vector.

21. The computer device of claim 1, wherein the unified shader program assembly instruction set includes a shader program parameter buffer binding that configures the target execution unit to broadcast an element of a bound buffer object storing a single word of integer or floating-point values to four components.

22. The computer device of claim 1, wherein variables of the shader program are considered typeless and can be used in assembly instructions that configures the target execution unit to read or write the variables as floating-point values, signed integers, or unsigned integers.

23. The computer device of claim 1, wherein the software program is further configured to perform error checking based on a data type modifier that specifies explicitly declared variable components of the shader program as signed integers, unsigned integers, or floating-point values.

24. The computer device of claim 1, wherein the processing unit further includes a geometry execution unit that comprises one of the target execution units within the processing unit, and the specific target execution unit comprises either the vertex execution unit, the fragment execution unit, or the geometry execution unit.

25. The computer device of claim 1, wherein the shader program comprises a program originally written in assembly code that includes both the assembly instructions configured to be executed by the specific target execution unit within the processing unit and including and the set of assembly instructions from the unified shader program assembly instruction set that is configured to be executed by each target execution unit within the processing unit.

26. The computer device of claim 1, wherein the shader program comprises a program originally written in a high-level shading language and then compiled to include both the assembly instructions configured to be executed by the specific target execution unit within the processing unit and including and the set of assembly instructions from the unified shader program assembly instruction set that is configured to be executed by each target execution unit within the processing unit.

27. The computer device of claim 1, wherein the software program is further configured to include within the shader microcode domain-specific interfaces corresponding to one or more inputs and one or more outputs of the specific target execution unit.

\* \* \* \* \*